United States Patent
Hunter

(10) Patent No.: US 12,299,036 B2
(45) Date of Patent: *May 13, 2025

(54) QUERYING GRAPH-BASED MODELS

(71) Applicant: Digital Asset Capital, Inc., Gaithersburg, MD (US)

(72) Inventor: Edward Hunter, Gaithersburg, MD (US)

(73) Assignee: Digital Asset Capital, Inc, Gaithersburg, MD (US)

( * ) Notice: Subject to any disclaimer, the term of this patent is extended or adjusted under 35 U.S.C. 154(b) by 615 days.

This patent is subject to a terminal disclaimer.

(21) Appl. No.: 17/015,028

(22) Filed: Sep. 8, 2020

(65) Prior Publication Data
US 2021/0073284 A1 Mar. 11, 2021

Related U.S. Application Data

(63) Continuation of application No. 16/893,318, filed on Jun. 4, 2020, now Pat. No. 10,915,578, and a
(Continued)

(51) Int. Cl.
*G06F 16/00* (2019.01)
*G06F 8/33* (2018.01)
(Continued)

(52) U.S. Cl.
CPC .......... *G06F 16/9024* (2019.01); *G06F 8/33* (2013.01); *G06F 8/65* (2013.01); *G06F 9/547* (2013.01);
(Continued)

(58) Field of Classification Search
CPC ..... G06F 8/35; G06F 8/65; G06F 8/60; G06F 8/34; G06F 8/433; G06F 8/4434;
(Continued)

(56) References Cited

U.S. PATENT DOCUMENTS 7,512,588 B2 * 3/2009 Chou ................... G06F 16/2471
707/999.005
7,634,778 B2 * 12/2009 Mosier ................ G06F 9/45516
717/148
(Continued)

FOREIGN PATENT DOCUMENTS

JP 2004-220227 A 8/2004
KR 10-2008-0021444 A 3/2008
(Continued)

OTHER PUBLICATIONS

D.R. Bull et al., "The optimisation of multiplier-free directed graphs: an approach using genetic algorithms", 1994 IEEE International Symposium on Circuits and Systems (ISCAS), Jun. 1994, pp. 197-200.*

(Continued)

*Primary Examiner* — Srirama Channavajjala
(74) *Attorney, Agent, or Firm* — Pillsbury Winthrop Shaw Pittman, LLP

(57) ABSTRACT

A process includes receiving a request via an API, determining a query based on a set of query parameters, and determining a target graph portion template based on the query, where the request includes a callback address. The process may include searching a set of directed graphs to determine a set of graph portions based on the query. Each respective directed graph of the set of directed graphs may include a set of vertices and a set of directed edges connecting respective pairs of vertices among the set of vertices, where each respective vertex of the set of vertices is associated with a respective category label of a set of mutually exclusive categories. The process may include selecting a set of event records and sending a value of the set of event records to the callback address.

17 Claims, 18 Drawing Sheets

Related U.S. Application Data continuation of application No. 16/893,295, filed on Jun. 4, 2020, now Pat. No. 10,831,452, and a continuation of application No. 16/893,290, filed on Jun. 4, 2020, now Pat. No. 11,132,403, and a continuation of application No. 16/893,299, filed on Jun. 4, 2020, now Pat. No. 10,990,879.

(60) Provisional application No. 63/056,984, filed on Jul. 27, 2020, provisional application No. 63/055,783, filed on Jul. 23, 2020, provisional application No. 63/053,217, filed on Jul. 17, 2020, provisional application No. 63/052,329, filed on Jul. 15, 2020, provisional application No. 63/034,255, filed on Jun. 3, 2020, provisional application No. 63/033,063, filed on Jun. 1, 2020, provisional application No. 63/020,808, filed on May 6, 2020, provisional application No. 62/959,481, filed on Jan. 10, 2020, provisional application No. 62/959,377, filed on Jan. 10, 2020, provisional application No. 62/959,418, filed on Jan. 10, 2020, provisional application No. 62/897,240, filed on Sep. 6, 2019.

(51) Int. Cl.
| | |
|---|---|
| *G06F 8/65* | (2018.01) |
| *G06F 9/54* | (2006.01) |
| *G06F 16/18* | (2019.01) |
| *G06F 16/21* | (2019.01) |
| *G06F 16/901* | (2019.01) |
| *G06F 17/18* | (2006.01) |
| *G06N 3/00* | (2023.01) |
| *G06N 3/048* | (2023.01) |
| *G06N 3/08* | (2023.01) |
| *G06N 3/086* | (2023.01) |
| *H04L 9/32* | (2006.01) |
| *H04L 67/133* | (2022.01) |
| *H04L 9/00* | (2022.01) |

(52) U.S. Cl.
CPC ........ *G06F 16/1858* (2019.01); *G06F 16/212* (2019.01); *G06F 17/18* (2013.01); *G06N 3/048* (2023.01); *G06N 3/08* (2013.01); *G06N 3/086* (2013.01); *H04L 9/3263* (2013.01); *H04L 67/133* (2022.05); *H04L 9/50* (2022.05)

(58) Field of Classification Search
CPC ............. G06F 11/3664; G06F 16/9024; G06F 16/1858; G06F 16/212; G06F 9/547; H04L 67/40; G06N 3/0481; G06N 3/08; G06N 3/086
See application file for complete search history.

(56) References Cited

U.S. PATENT DOCUMENTS

| | | | |
|---|---|---|---|
| 8,108,241 B2 | 1/2012 | Shukoor | |
| 8,156,134 B2* | 4/2012 | Sun | G06F 16/2452 707/706 |
| 8,312,049 B2 | 11/2012 | Chayes | |
| 8,387,000 B2 | 2/2013 | Avadhanula | |
| 8,533,182 B1 | 9/2013 | Charboneau | |
| 8,614,703 B1 | 12/2013 | Fong | |
| 8,732,685 B2 | 5/2014 | Moler | |
| 9,547,728 B2 | 1/2017 | Bornhoevd | |
| 9,836,183 B1 | 12/2017 | Love | |
| 10,169,454 B2 | 1/2019 | Ait-Mokhtar | |
| 10,320,891 B2 | 6/2019 | Agarwal | |
| 10,424,399 B2 | 9/2019 | Clark | |
| 10,496,752 B1 | 12/2019 | Crossley | |
| 10,509,844 B1 | 12/2019 | Mcintyre | |
| 10,509,863 B1 | 12/2019 | Arfa | |
| 10,515,000 B2 | 12/2019 | Moretto | |
| 10,529,137 B1 | 1/2020 | Black | |
| 10,558,759 B1 | 2/2020 | Arfa | |
| 10,558,933 B2 | 2/2020 | Bhowan | |
| 10,700,852 B2 | 6/2020 | Xie | |
| 10,705,939 B2 | 7/2020 | McChord | |
| 10,810,193 B1 | 10/2020 | Subramanya et al. | |
| 10,810,210 B2 | 10/2020 | Choudhury | |
| 11,106,458 B2 | 8/2021 | Adams | |
| 11,265,171 B2 | 3/2022 | Struttmann et al. | |
| 11,271,717 B2 | 3/2022 | Shi | |
| 2002/0087275 A1 | 7/2002 | Kim | |
| 2002/0095276 A1 | 7/2002 | Rong | |
| 2004/0019601 A1 | 1/2004 | Gates | |
| 2004/0181361 A1 | 9/2004 | Ikeda | |
| 2005/0036615 A1 | 2/2005 | Jakobsson | |
| 2005/0038533 A1* | 2/2005 | Farrell | G06F 16/9024 707/E17.011 |
| 2005/0065955 A1 | 3/2005 | Babikov | |
| 2006/0045027 A1 | 3/2006 | Galou | |
| 2006/0161560 A1 | 7/2006 | Khandelwal | |
| 2006/0195747 A1 | 8/2006 | Pramanick | |
| 2007/0239694 A1 | 10/2007 | Singh | |
| 2008/0033777 A1 | 2/2008 | Shukoor | |
| 2008/0052692 A1 | 2/2008 | Chockler | |
| 2008/0079724 A1 | 4/2008 | Isard | |
| 2008/0098375 A1 | 4/2008 | Isard | |
| 2008/0120292 A1 | 5/2008 | Sundaresan | |
| 2008/0126450 A1 | 5/2008 | O'Neill | |
| 2009/0083262 A1 | 3/2009 | Chang | |
| 2010/0153152 A1* | 6/2010 | Kind | G06Q 10/0875 705/29 |
| 2010/0312545 A1 | 12/2010 | Sites | |
| 2011/0137919 A1 | 6/2011 | Ryu | |
| 2011/0153662 A1* | 6/2011 | Stanfill | G06F 16/24532 707/774 |
| 2011/0238409 A1 | 9/2011 | Larcheveque et al. | |
| 2012/0054255 A1 | 3/2012 | Buxbaum et al. | |
| 2012/0143808 A1 | 6/2012 | Karins | |
| 2012/0253793 A1 | 10/2012 | Ghannam et al. | |
| 2012/0303358 A1 | 11/2012 | Ducatel et al. | |
| 2013/0055302 A1 | 2/2013 | De | |
| 2013/0138699 A1 | 5/2013 | Schacher | |
| 2014/0006394 A1 | 1/2014 | Kritt | |
| 2014/0189651 A1 | 7/2014 | Gounares | |
| 2014/0236965 A1 | 8/2014 | Yarmus | |
| 2015/0067644 A1* | 3/2015 | Chakraborty | G06F 11/3604 717/123 |
| 2016/0012149 A1 | 1/2016 | Muchinsky | |
| 2016/0105322 A1 | 4/2016 | Pullo | |
| 2016/0203242 A1 | 7/2016 | Henrickson | |
| 2016/0239753 A1 | 8/2016 | Loehlein et al. | |
| 2016/0350662 A1 | 12/2016 | Jin | |
| 2017/0154123 A1 | 6/2017 | Yurchenko | |
| 2017/0161121 A1 | 6/2017 | Feng | |
| 2017/0193390 A1 | 7/2017 | Weston et al. | |
| 2017/0212781 A1 | 7/2017 | Dillenberger | |
| 2017/0230791 A1 | 8/2017 | Jones | |
| 2017/0270100 A1 | 9/2017 | Audhkhasi et al. | |
| 2017/0329868 A1 | 11/2017 | Lindsley | |
| 2017/0364534 A1 | 12/2017 | Zhang | |
| 2018/0075030 A1 | 3/2018 | Gilder | |
| 2018/0129957 A1 | 5/2018 | Saxena | |
| 2018/0189294 A1 | 7/2018 | Anand | |
| 2018/0205552 A1 | 7/2018 | Struttmann | |
| 2018/0267958 A1 | 9/2018 | Danielyan | |
| 2018/0293486 A1 | 10/2018 | Bajic et al. | |
| 2019/0050854 A1 | 2/2019 | Yang et al. | |
| 2019/0095909 A1 | 3/2019 | Wright et al. | |
| 2019/0116047 A1 | 4/2019 | Struttmann | |
| 2019/0129893 A1 | 5/2019 | Baird, III | |
| 2019/0147553 A1* | 5/2019 | Reber | G06Q 20/389 705/65 |
| 2019/0164087 A1 | 5/2019 | Ghibril | |
| 2019/0164342 A1 | 5/2019 | Krs | |
| 2019/0166162 A1 | 5/2019 | Anand | |
| 2019/0180386 A1 | 6/2019 | Gandhi | |

(56) References Cited

U.S. PATENT DOCUMENTS

| | | |
|---|---|---|
| 2019/0188285 A1 | 6/2019 | Scheau |
| 2019/0197357 A1 | 6/2019 | Anderson |
| 2019/0220496 A1 | 7/2019 | Ito |
| 2019/0222597 A1 | 7/2019 | Crabtree |
| 2019/0230092 A1 | 7/2019 | Patel |
| 2019/0303579 A1 | 10/2019 | Reddy |
| 2019/0354582 A1 | 11/2019 | Schafer |
| 2020/0005117 A1 | 1/2020 | Yuan |
| 2020/0069134 A1 | 3/2020 | Ebrahimi Afrouzi |
| 2020/0082016 A1 | 3/2020 | Lassoued et al. |
| 2020/0089769 A1 | 3/2020 | Crossley |
| 2020/0110619 A1 | 4/2020 | Rajaram |
| 2020/0110882 A1 | 4/2020 | Ripolles Mateu |
| 2020/0193286 A1 | 6/2020 | Byrnes |
| 2020/0210467 A1 | 7/2020 | Ravindran |
| 2020/0249998 A1 | 8/2020 | Che |
| 2020/0334545 A1 | 10/2020 | Sinha |
| 2020/0401931 A1 | 12/2020 | Duan |
| 2021/0049700 A1 | 2/2021 | Nguyen |
| 2021/0383070 A1 | 12/2021 | Hunter |
| 2022/0027496 A1 | 1/2022 | Struttmann |
| 2022/0171984 A1 | 6/2022 | Takahashi |

FOREIGN PATENT DOCUMENTS

| | | | |
|---|---|---|---|
| KR | 10-2009-0130854 A | 12/2009 | |
| KR | 10-1565715 B1 | 11/2015 | |
| KR | 10-2018-0120570 A | 11/2018 | |
| KR | 10-2019-0092564 A | 8/2019 | |
| WO | WO2004104817 A2 | * | 12/2004 |
| WO | 2005022403 A1 | 3/2005 | |
| WO | 2007002658 A2 | 1/2007 | |
| WO | 2009014898 A2 | 1/2009 | |
| WO | 2009081212 | 7/2009 | |
| WO | 2011115679 A1 | 9/2011 | |
| WO | 2013044170 A1 | 3/2013 | |
| WO | WO2013040386 A2 | * | 3/2013 |
| WO | 2013112628 A1 | 8/2013 | |
| WO | 2015168251 A1 | 11/2015 | |
| WO | 2017011601 A1 | 1/2017 | |
| WO | 2017014744 A1 | 1/2017 | |
| WO | 2017191525 A2 | 11/2017 | |
| WO | 2017218986 A1 | 12/2017 | |
| WO | 2018098037 A1 | 5/2018 | |
| WO | 2019-060468 A1 | 3/2019 | |
| WO | 2020092900 A2 | 5/2020 | |
| WO | 2021046551 A1 | 3/2021 | |

OTHER PUBLICATIONS

Non-Final Office Action in related U.S. Appl. No. 16/893,299 issued Oct. 21, 2020 (106 pages).
Gordon, Thomas F., Guido Governatori, and Antonino Rotolo. "Rules and norms: Requirements for rule interchange languages in the legal domain." International Workshop on Rules and Rule Markup Languages for the Semantic Web. Springer, Berlin, Heidelberg, 2009. (Year: 2009).
Shen, Yelong, et al. "M-walk: Learning to walk over graphs using monte carlo tree search." Advances in Neural Information Processing Systems. 2018. (Year: 2018).
Chan, Wren, and Aspen Olmsted. "Ethereum transaction graph analysis." 2017 12th International Conference for Internet Technology and Secured Transactions (ICITST). IEEE, 2017. (Year: 2017).
Zinkevich, Martin, et al. "Regret minimization in games with incomplete information." Advances in neural information processing systems. 2008. (Year: 2008).
Silver, David, et al. "Mastering chess and shogi by self-play with a general reinforcement learning algorithm." arXiv preprint arXiv: 1712.01815 (2017). (Year: 2017).
Final Office Action in related U.S. Appl. No. 16/893,290 issued Nov. 13, 2020 (28 pages).
Allowance issued in related U.S. Appl. No. 16/893,318 dated Nov. 20, 2020 (20 pages).
International Search Report and Written Opinion in related international application PCT/US2020/049776 dated Dec. 3, 2020 (10 pages).
Julien M. Hendrickx, Graphs and Networks for the Analysis of Autonomous Agent Systems, Feb. 29, 2008.
International Search Report and Written Opinion in related international application PCT/US2020/049777 dated Dec. 8, 2020 (10 pages).
International Search Report and Written Opinion in related international application PCT/US2020/049755 dated Dec. 15, 2020 (9 pages).
International Search Report and Written Opinion in related international application PCT/US2020/049757 dated Dec. 15, 2020 (10 pages).
Notice of Allowance in related U.S. Appl. No. 16/893,299 dated Feb. 11, 2021.
Non-Final Office Action in related U.S. Appl. No. 16/893,290 dated Mar. 24, 2021.
Notice of Allowance in related U.S. Appl. No. 16/893,290 dated Aug. 11, 2021.
Notice of Allowance in related U.S. Appl. No. 17/337,239 dated Sep. 9, 2021.
International Search Report and Written Opinion in related international application PCT/US2021/035516.
International Preliminary Report on Patentability in related international application PCT/US2020/049776 mailed Mar. 17, 2022, pp. 1-6.
International Preliminary Report on Patentability in related international application PCT/US2020/049777 mailed Mar. 17, 2022, pp. 1-6.
International Preliminary Report on Patentability in related international application PCT/US2020/049755 mailed Mar. 17, 2022, pp. 1-5.
International Preliminary Report on Patentability in related international application PCT/US2020/049757 mailed Mar. 17, 2022, pp. 1-6.
Non-Final Office Action in related U.S. Appl. No. 17/015,069 dated May 12, 2022, pp. 1-26.
Phetsouvanh et al., "EGRET: Extortion Graph Exploration Techniques in the Bitcoin Network," 2018 IEEE International Conference on Data Mining Workshops (ICDMW), Nov. 2018, pp. 244-251.
Masood et al., "An Overview of Distributed Ledger Technology and its Applications," International Journal of Computer Sciences and Engineering, vol. 6, Issue 10, Oct. 2018, pp. 422-427.
Notice of Allowance in related U.S. Appl. No. 17/121,915 dated Jul. 27, 2022, pp. 1-10.
Non-Final Office Action in related U.S. Appl. No. 17/015,069 dated Sep. 2, 2022, pp. 1-32.
Non-Final Office Action in related U.S. Appl. No. 17/015,038 dated Jul. 11, 2022, pp. 1-46.
Corinna Vehlow et al., "Visualizing edge-edge relations in graphs," 2013 IEEE Pacific Visualization Symposium (PacificVis), Mar. 2013, pp. 1-8.
Non-Final Office Action in related U.S. Appl. No. 17/015,065 dated Jul. 13, 2022, pp. 1-64.
John T. Rickard et al., "Hypercube Graph Representations and Fuzzy Measures of Graph Properties," IEEE Transactions on Fuzzy Systems (vol. 15, Issue: 6, Dec. 2007), pp. 1278-1293.
Non-Final Office Action in related U.S. Appl. No. 17/015,042 dated Jul. 22, 2022, pp. 1-59.
Ali Shahaab et al., "Applicability and Appropriateness of Distributed Ledgers Consensus Protocols in Public and Private Sectors: A Systematic Review," IEEE access, vol. 7, Mar. 2019, pp. 1-15.
Non-Final Office Action in related U.S. Appl. No. 17/015,071 dated Jul. 28, 2022, pp. 1-64.
Christian Mayer et al., "ADWISE: Adaptive Window-Based Streaming Edge Partitioning for High-Speed Graph Processing," 2018 IEEE 38th International Conference on Distributed Computing Systems (ICDCS), pp. 685-695.

(56) References Cited

OTHER PUBLICATIONS

JungHyunKim et al., "Personalized p. Rankin Uncertain Grapsh with Mutually Exclusive Edges," SIGIR'17, Aug. 7-11, 2017, Shinjuku, Tokyo, Japan, pp. 525-534.
Federico Matteo Bencic et al., "Distributed Ledger Technology: Blockchain Compared to Directed Acyclic Graph," 2018 IEEE 38th International Conference on Distributed Computing Systems (ICDCS), Jul. 2018, pp. 1569-1570.
Non-Final Office Action in related U.S. Appl. No. 17/015,073 dated Aug. 5, 2022, pp. 1-65.
Wei Wang et al., "A Novel Subgraph Querying Method on Directed Weighted Graphs," 2018 14th International Conference on Computational Intelligence and Security (CIS) 2018, pp. 150-154.
Ren Liu et al., "Decentralized state estimation and remedial control action for minimum wind curtailment using distributed computing platform," 2016 IEEE Industry Applications Society Annual Meeting, Oct. 2016, pp. 1-9.
Non-Final Office Action in related U.S. Appl. No. 17/015,074 dated Aug. 18, 2022, pp. 1-67.
PavelExner et al., "Quantum graphs with vertices of a preferred orientation," Physics Letters A, vol. 382, Issue 5, Feb. 6, 2018, pp. 283-287.
Moussa Amrani et al., "SAR-Oriented Visual Saliency Model and Directed Acyclic Graph Suport Vector Metric Based Target Classification," IEEE Journal of Selected Topics in Applied Earth Observations and Remote Sensing, vol. 11, Issue 10, Oct. 2018, pp. 3794-3810.
Non-Final Office Action for related U.S. Appl. No. 17/015,069 issued on Mar. 14, 2023, 52 pages.
Achille Souili et al., "Natural Language Processing (NLP)—A solution for knowledge extraction from patent unstructured data", World Conference: Triz Future, TF 2011-2014, Procedia Engineering 131 (2015) 635-643.
Final Rejection issued in related U.S. Appl. No. 17/015,071, dated Dec. 1, 2022, pp. 1-13.
Final Rejection issued in related U.S. Appl. No. 17/015,073, dated Dec. 9, 2022, pp. 1-73.
Final Rejection issued in related U.S. Appl. No. 17/015,038, dated Dec. 9, 2022, pp. 1-51.
International Preliminary Report on Patentability issued in related International Patent Application PCT/US2021/035516, dated Dec. 15, 2022, pp. 1-8.
Final Rejection issued in related U.S. Appl. No. 17/015,042, dated Dec. 16, 2022, pp. 1-66.
Final Rejection issued in related U.S. Appl. No. 17/015,074, dated Dec. 14, 2022, pp. 1-27.
Final Rejection issued in related U.S. Appl. No. 17/015,065, dated Dec. 9, 2022, pp. 1-28.
Extended European Search Report for EP application No. 20861163.8 dated Aug. 25, 2023.
Extended European Search Report for EP application No. 20861551.8 dated Aug. 28, 2023.
Extended European Search Report for EP application No. 20861278.8 rec'd Aug. 29, 2023.
Office Action for CA application No. 3150253 dated Nov. 14, 2023.
Office Action for CA application No. 3150262 dated Nov. 21, 2023.
Office Action for CA application No. 3150320 dated Nov. 22, 2023.
Office Action for CA application No. 3150324 dated Dec. 5, 2023.
Office Action for CA application No. 3150262 dated Aug. 26, 2024.
Office Action for CA application No. 3150320 rec'd Aug. 26, 2024.
US Notice of Allowance for U.S. Appl. No. 17/015,065 dated Oct. 23, 2024.
US Notice of Allowance for U.S. Appl. No. 17/015,071 dated Oct. 23, 2024.
Christian Cachin et al.: "The Transaction Graph for Modeling Blockchain Semantics", IACR, International Association for Cryptologic Research, vol. 20171110:151455, Nov. 3, 2017 (Nov. 3, 2017), pp. 1-27, XP061034744, Retrieved from the Internet: URL:http://eprint.iacr.org/2017/1070.pdf [retrieved on Nov. 3, 2017].

* cited by examiner

QUERYING GRAPH-BASED MODELS

CROSS-REFERENCE TO RELATED APPLICATIONS

This patent claims the benefit of U.S. Provisional Patent Application 62/897,240, filed 6 Sep. 2019, titled "SMART DEONTIC DATA SYSTEMS." This patent also claims the benefit of U.S. Provisional Patent Application 62/959,418, filed 10 Jan. 2020, titled "GRAPH-MANIPULATION BASED DOMAIN-SPECIFIC ENVIRONMENT." This patent also claims the benefit of U.S. Provisional Patent Application 62/959,481, filed 10 Jan. 2020, titled "GRAPH OUTCOME DETERMINATION IN DOMAIN-SPECIFIC EXECUTION ENVIRONMENT." This patent also claims the benefit of U.S. Provisional Patent Application 62/959,377, filed 10 Jan. 2020, titled "SMART DEONTIC MODEL AND SYSTEMS." This patent also claims the benefit of U.S. Provisional Patent Application 63/020,808, filed 6 May 2020, titled "GRAPH EXPANSION AND OUTCOME DETERMINATION FOR GRAPH-DEFINED PROGRAM STATES." This patent also claims the benefit of U.S. Provisional Patent Application 63/033,063, filed 1 Jun. 2020, titled "MODIFICATION OF IN-EXECUTION SMART CONTRACT PROGRAMS." This patent also claims the benefit of U.S. Provisional Patent Application 63/034,255, filed 3 Jun. 2020, titled "SEMANTIC CONTRACT MAPS." This patent also claims the benefit of U.S. patent application Ser. No. 16/893,290, filed 4 Jun. 2020, titled "GRAPH-MANIPULATION BASED DOMAIN-SPECIFIC EXECUTION ENVIRONMENT." This patent also claims the benefit of U.S. patent application Ser. No. 16/893,318, filed 4 Jun. 2020, titled "GRAPH OUTCOME DETERMINATION IN DOMAIN-SPECIFIC EXECUTION ENVIRONMENT." This patent also claims the benefit of U.S. patent application Ser. No. 16/893,295, filed 4 Jun. 2020, titled "MODIFICATION OF IN-EXECUTION SMART CONTRACT PROGRAMS." This patent also claims the benefit of U.S. patent application Ser. No. 16/893,299, filed 4 Jun. 2020, titled "GRAPH EXPANSION AND OUTCOME DETERMINATION FOR GRAPH-DEFINED PROGRAM STATES." This patent also claims the benefit of U.S. Provisional Patent Application 63/052,329, filed 15 Jul. 2020, titled "EVENT-BASED ENTITY SCORING IN DISTRIBUTED SYSTEMS." This patent also claims the benefit of U.S. Provisional Patent Application 63/053,217, filed 17 Jul. 2020, titled "CONFIDENTIAL GOVERNANCE VERIFICATION FOR GRAPH-BASED SYSTEM." This patent also claims the benefit of U.S. Provisional Patent Application 63/055,783, filed 23 Jul. 2020, titled "HYBRID DECENTRALIZED COMPUTING ENVIRONMENT FOR GRAPH-BASED EXECUTION ENVIRONMENT." This patent also claims the benefit of U.S. Provisional Patent Application 63/056,984, filed 27 Jul. 2020, titled "MULTI-GRAPH VERIFICATION." The entire content of each aforementioned patent filing is hereby incorporated by reference.

BACKGROUND

1. Field

This disclosure relates generally to computer systems and, more particularly, to graph-manipulation based domain-specific execution environments.

2. Background

Distributed applications operating on a distributed computing platform may be useful in a variety of contexts. Such applications can store program state data on a tamper-evident ledger operating on the distributed computing platform. The use of a tamper-evident ledger or some other data systems distributed over multiple computing devices may increase the security and reliability of distributed applications. Additionally, data queried from the tamper-evident ledger may be utilized in applications related to the context in which the tamper-evident ledger is used.

SUMMARY

The following is a non-exhaustive listing of some aspects of the present techniques. These and other aspects are described in the following disclosure.

Some aspects include a process that includes receiving a request via an application program interface (API), determining a query based on a set of query parameters, and determining a target graph portion template based on the query, where the request includes a callback address. The process may include searching a set of directed graphs to determine a set of graph portions based on the query, where each of the set of graph portions match the target graph portion template. Each respective directed graph of the set of directed graphs may include a set of vertices and a set of directed edges connecting respective pairs of vertices among the set of vertices, where each respective vertex of the set of vertices is associated with a respective category label of a set of mutually exclusive categories. The process may include selecting a set of event records and sending a value of the set of event records to the callback address, where each respective event records of the set of event records is indicated to occur before or during a vertex of a respective graph portion matching the target graph portion template.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
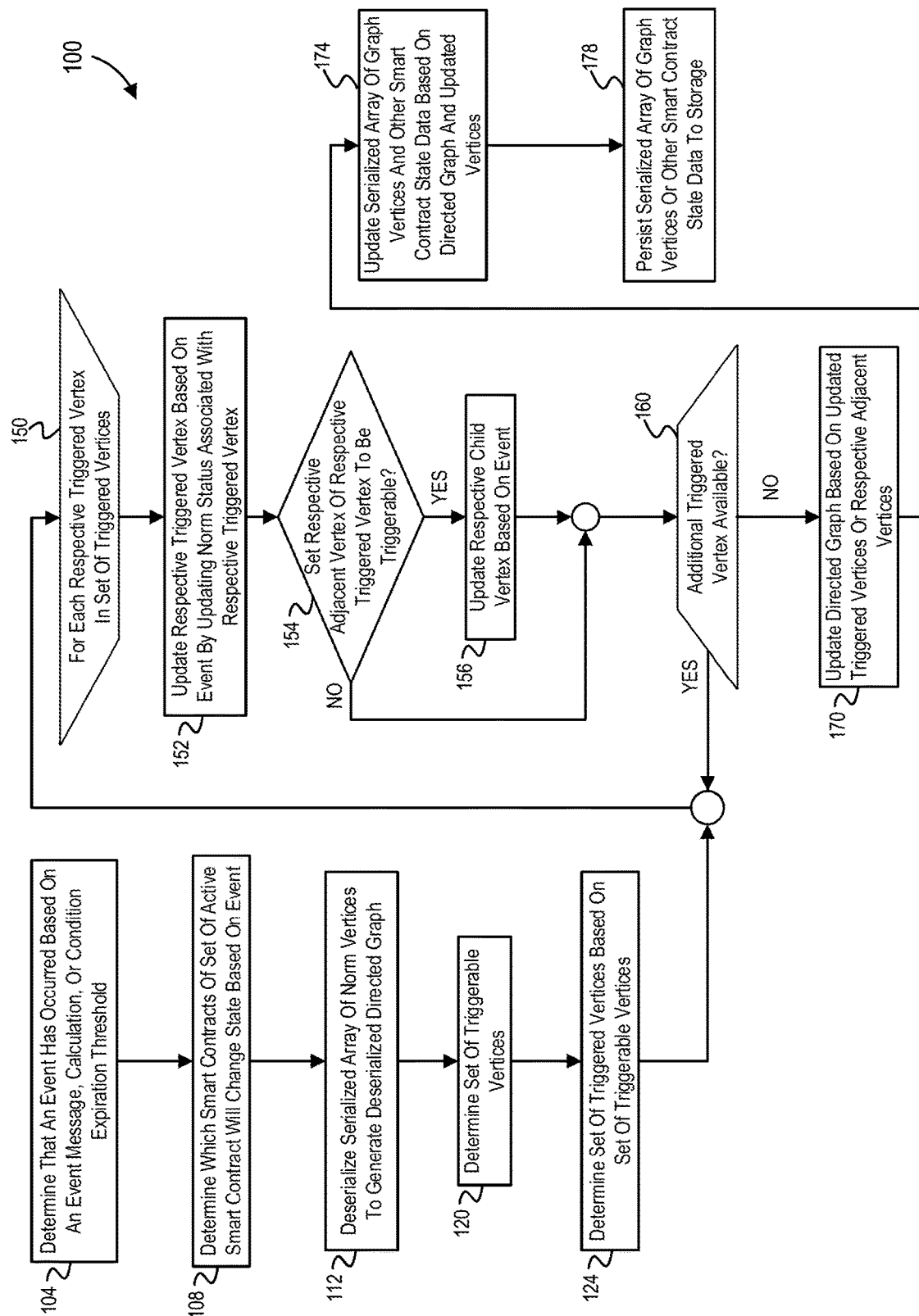
FIG. 1 is a flowchart of an example of a process by which program state data of a program may be deserialized into a directed graph, updated based on an event, and re-serialized, in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of program testing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Technology-based self-executing protocols, such as smart contracts and other programs, allow devices, sensors, and program code have seen increased use in recent years. However, some smart contracts and contract information models often rely on program instructions or industry-specific data structures, which may be difficult to generalize, use for comparison analysis, or re-use in similar contexts due to minor differences in contract details. As a result, uses of smart contracts has not extended into areas that are often the domain of natural language documents. Described herein is a process and related system to construct, interpret, enforce, analyze, and re-use terms for a smart contract in a systematic and unambiguous way across a broad range of applicable fields. In contrast, contracts encoded in natural language text often rely on social, financial, and judicial systems to provide the resources and mechanisms to construct, interpret, and enforce terms in the contracts. As contract terms increase in number or a situation within which the contract was formed evolves, such a reliance may lead to a lack of enforcement, ambiguity, and wasted resources spent on the re-interpretation or enforcement of contract terms.

Some embodiments may include smart contracts (or other programs) that include or are otherwise associated with a directed graph representing a state of the smart contract. In some embodiments, vertices of the graph may be associated with (e.g., encode, or otherwise represent) norms (e.g., as norm objects described below) of the smart contract, like formal language statements with a truth condition paired with a conditional statement (sometimes known as a "conditional") that branches program flow (and changes norm state) responsive to the whether the truth condition is satisfied, for instance, "return a null response if and only if an API request includes a reserved character in a data field." In some embodiments, norms of a smart contract may represent terms of a contract being represented by the smart contract, legal conditions of the contract, or other verifiable statements. As used herein, a smart contract may be a self-executing protocol executable as a script, an application, or portion of an application on a distributed computing platform, centralized computing system, or single computing device. Furthermore, as used herein, a graph may be referred to as a same graph after the graph is manipulated. For example, if a graph being referred to as a "first graph" is represented by the serialized array [[1,2], [2,3], [3,4]] is modified to include the extra vertex and graph edge "[1,5]" and become the modified graph represented by the serialized array "[[1,2], [2,3], [3,4], [1,5]]," the term "first graph" may be used to refer to the modified graph. Additionally, it should be understood that a data structure need not be labeled in program code as a graph to constitute a graph for the present purposes, as long as that data structure encodes the relationships between values described herein. For example, a graph may be encoded in a key-value store even if source code does not label the key-value store as a graph.

A self-executing protocol may be a program, like a smart contract. Self-executing protocols may execute responsive to external events, which may include outputs of third-party programs, and human input via a user interface. A self-executing protocol may execute on a computing substrate that involves human intervention to operate, like turning on a computer and launching an event listener.

A norm of a smart contract may be encoded in various formal languages (like programming languages, such as data structures encoding statements in a domain-specific programming language) and may include or otherwise be associated with one or more conditional statements, a set of norm conditions of the one or more conditional statements, a set of outcome subroutines of the one or more conditional statements, a norm status, and a set of consequent norms. In some embodiments, satisfying a norm condition may change a norm status and lead to the creation or activation of the consequent norms based on the actions performed by the system when executing the outcome subroutines corresponding to the satisfied norm condition. In some embodiments, a norm may be triggered (i.e. "activated") when an associated norm condition is satisfied by an event, as further described below. Alternatively, some types of norms may be triggered when a norm condition is not satisfied before a condition expiration threshold is satisfied. As used herein, a triggerable norm (i.e. "active norm") is a norm having associated norm conditions may be satisfied by an event. In contrast, a norm that is set as not triggerable (i.e. "inactive") is a norm is not updated even if its corresponding norm conditions are satisfied. As used herein, deactivating a norm may include setting the norm to not be triggerable.

A smart contract and its norms may incorporate elements of a deontic logic model. A deontic logic model may include a categorization of each of the norms into one of a set of deontic primitive logical categories. A deontic primitive logical category ("logical category") may include a label such as "right," "obligation," or "prohibition." The logical category may indicate a behavior of the norm when the norm is triggered. In addition, a norm of the smart contract may have an associated norm status such as "true," "false," or "unrealized," where an event may trigger a triggerable norm by satisfying a norm condition (and thus "realizing" the norm). These events may be collected into a knowledge list. The knowledge list may include an associative array of norms, their associated states, an initial norm status during the initial instantiation of the associated smart contract, their norm observation times (e.g., when a norm status was changed, when an event message was received, or the like), or other information associated with the norms. The smart contract may also include a set of consequent actions, where a consequent action may include an association between a triggered norm and any respective consequent norms of the smart contract. As further discussed below, the set of consequent actions may be updated as events occur and the smart contract state is updated, which may result in the formation of a history of previous consequent actions. It should be understood that the term "norm" is used for illustrative purposes and that this term may have different names in other references and contexts. The labeling of norms may also be used for symbolic artificial intelligence (AI) systems. As described further below, the use of these symbolic AI systems in the context of a smart contract may allow for sophisticated verification and predictive techniques that may be impractical for pure neural network systems which do not use symbolic AI systems. It should be understood that, while the term "logical category" is used in some embodiments, other the terms may be used for categories or types of categories without loss of generality. For example, some embodiments may refer to the use of a "category label" instead of a logical category.

Some embodiments may store a portion of the smart contract state in a data serialization format ("serialized smart contract state data"). For example, as further described below, some embodiments may store a vertices of a directed graph (or both vertices and edges) in a data serialization format. In response to determining that an event has occurred, some embodiments may deserialize the serialized smart contract state data into a deserialized directed graph. In some embodiments, a vertex (a term used interchangeably with the term node) of the directed graph may be associated with a norm from a set of norms of the smart contract and is described herein as a "norm vertex," among other terms, where a norm vertex may be connected one or more other norm vertices via graph edges of the directed graph. Some embodiments may then update the directed graph based on a set of consequent norms and their associated consequent norm vertices, where each of the consequent norms are determined based on which norms were triggered by the event and what norm conditions are associated with those active norms. The updated directed graph may then be reserialized to update the smart contract. In some embodiments, a norm vertex may not have any associated conditions. In some embodiments, the amount of memory used to store the serialized smart contract state data may be significantly less than the memory used by deserialized smart contract state data. During or after the operation to update the smart contract, some embodiments may send a message to entities listed in a list of entities (such as an associative array of entities) to inform the entities that the smart contract has been updated, where the smart contract includes or is otherwise associated with the list of entities. Furthermore, it should be understood in this disclosure that a vertex may include (or comprise) a condition by being associated with the condition. For example, a norm vertex may include a first norm condition by including a reference pointer to the first norm condition.

In some embodiments, generating the smart contract may include using an integrated development environment (IDE) and may include importing libraries of provisions re-used across agreements. Furthermore, some embodiments may generate a smart contract based on the use of natural language processing (NLP), as further described below. For example, some embodiments may apply NLP operations to convert an existing prose document into a smart contract using operations similar to those described for patent application 63/034,255, titled "Semantic Contract Maps," which is herein incorporated by reference. For example, some embodiments may apply a set of linear combinations of feature observations and cross observations across first order and second orders in feature space to determine a smart contract program or other symbolic AI program. Alternatively, or in addition, some embodiments may include constructing a smart contract from a user interface or text editor without using an existing prose document. In some embodiments, the smart contract may be encoded in various forms, such as source code, bytecode, or machine code encodings. In some embodiments, a smart code may be generated or modified in one type of encoding and be converted to another type of encoding before the smart code is used. For example, a smart contract may be edited in a source code encoding, and the smart contract may be executed by converting the smart contract into a bytecode encoding executing on a distributed computing platform. As used herein, a smart contract may be referred to as a same smart contract between different encodings of the smart contract. For example, a smart contract may be written in source code and then converted to a machine code encoding, may be referred to as a same smart contract.

Furthermore, as used herein, the sets of items of a smart contract data model may be encoded in various formats. A set of items be encoded in an associative array, a b-tree, a R-tree, a stack, or various other types of data structures. As used herein, the sets of items in the data model may be determined based on their relationships with each other. For example, a set of entities may be encoded as an associative array of entities or may be encoded as an entities b-tree, and elements of a knowledge list may include references to an entity in the set of entities for either type of encoding. In some embodiments, sets of items in their respective data models may be based on the underlying relationships and references between the items in the sets of items, and embodiments should not be construed as limited to specific encoding formats. For example, while some embodiments may refer to an associative array of norms, it should be understood that other embodiments may use a b-tree to represent some or all of the set of norms.

A smart contract may be stored on different levels of a memory hierarchy. A memory hierarchy of may include (in order of fastest to slowest with respect to memory access speed) processor registers, Level 0 micro operations cache, Level 1 instructions cache, Level 2 shared cache, Level 3 shared cache, Level 4 shared cache, random access memory (RAM), a persistent flash memory, hard drives, and magnetic tapes. For example, a Level 1 cache of a computing device may be faster than a RAM of the computing device, which in turn may be faster than a persistent flash memory of the computing device. In some embodiments, the memory of a computing device at a first layer of the memory hierarchy may have a lower memory capacity than a memory of the computing device at a slower layer of the memory hierarchy. For example, a Level 0 cache may memory capacity of 6 kibibytes (KiB), whereas a Level 4 cache may have a memory capacity of 128 mebibytes (MiB). In some embodiments, memory may be further distinguished between persistent storage and non-persistent storage (i.e. "non-persistent memory"), where persistent storage is computer memory that may retain the values stored in it without an active power source. For example, persistent storage may include persistent flash memory, hard drives, or magnetic tape, and non-persistent memory may include processor registers, cache memory, or dynamic RAM. In some embodiments, a smart contract may be stored on memory at different levels of the memory hierarchy to increase storage efficiency of the smart contract. For example, serialized smart contract state data of the smart contract may be stored on RAM of a computing device while the deserialized smart contract state data may be stored on a cache of the computing device.

In some embodiments, the smart contract may update infrequently, such as less than once per hour, less than once day, less than once per month, or the like. The relative infrequency of the updates can mean that the relative computing resources required to deserialize and reserialize data be significantly less than the computing resources required to maintain deserialized data in higher-speed memory. In some embodiments, the dynamic program state By serializing a portion of the smart contract data and persisting the serialized data instead of the corresponding deserialized data to a persistent storage, a computing system may use reduce the memory requirements of storing and executing the smart contract. In addition, the computing system may also increase the number of smart contracts being executed concurrently by a distributed computing platform or single computing device. Furthermore, as used herein, updating a value may include changing the value or generating the value.

As described herein, some embodiments may store smart contract data in other forms. For example, while some embodiments may temporarily store a directed graph in non-persistent storage, some embodiments may store the directed graph on a persistent storage. In some embodiments, various other types of information such as norm statuses (e.g. "triggered," "failed," "satisfied," etc.) or logical categories (e.g. "rights," "obligation," "prohibition," etc.) may be included in or otherwise associated with some or all of the vertices of the directed graph. Furthermore, some embodiments may generate visual display representing of the program state data to show the directed graph and its associated statuses, categories, or other information. For example, as further described below, some embodiments may display the directed graph as a hierarchical visual element such as a hierarchy tree in a web application.

A smart contract may be implemented in various ways. For example, some embodiments may construct, enforce, or terminate the smart contract using a distributed ledger or distributed computing system. Alternatively, some embodiments may implement the smart contract using a request-response system over a public or private internet protocol (IP) network. Use of the methods described herein may increase the efficiency of smart contract enforcement by advancing the state of complex multi-entity agreements in a fast and unambiguous way. Furthermore, implementing and using smart contracts with the embodiments described herein may allow for the comparison, quantification, and reuse of smart contracts in a way that would be inapplicable to custom-coded smart contracts.

In some embodiments, the smart contract may be stored in a tamper-evident data-store. As discussed below, tamper-evident data stores (e.g., repositories rendering data tamper-evident with one or more tamper-evident data structures) afford desirable properties, including making it relatively easy to detect tampering with entries in the data store and making it relatively difficult or impossible to tailor entries to avoid such detection. Furthermore, various smart contracts may be operating across one or more nodes of the tamper-evident data store, reducing the susceptibility of the smart contract to regional disturbances.

None of the preceding should be taken to suggest that any technique is disclaimed or that the approaches described herein may not be used in conjunction with other approaches having these or other described disadvantages, for instance, some embodiments may use a custom-written smart-contract that includes one or more of the norms, data structures, or graphs described herein. Or some embodiments may store a directed graph without serialization or deserialization operations. Or some embodiments may be implemented on a centralized server without storing smart contract state data on a distributed computing system such as a decentralized computing system. Further, it should be emphasized that the data structures, concepts, and instructions described herein may bear labels different from those applied here in program code, e.g., a data structure need not be labeled as a "node" or a "graph" in program code to qualify as such, provided that the essential characteristics of such items are embodied.

In some embodiments, the processes and functionality described herein may be implemented as computer code stored on a tangible, non-transitory, machine-readable medium, such that when instructions of the code are executed by one or more processors, the described functionality may be effectuated. For example, the processes 100, 300, 1400, 1500, 1600, 2100, 2300, 2400, 2600, 2800, 2900, 3100, 3300, 3600, 3900, 4000, 4200, or 4300 of FIG. 1, 3, 14, 15, 16, 21, 23, 24, 26, 28, 29, 31, 33, 36, 39, 40, 42, or 43 may be implemented as computer code stored on a non-transitory machine-readable medium. like Instructions may be distributed on multiple physical instances of memory, e.g., in different computing devices, or in a single device or a single physical instance of memory (e.g., non-persistent memory or persistent storage), all consistent with use of the singular term "medium." In some embodiments, the operations may be executed in a different order from that described, some operations may be executed multiple times per instance of the process's execution, some operations may be omitted, additional operations may be added, some operations may be executed concurrently and other operations may be executed serially, none of which is to suggest that any other feature described herein is not also amenable to variation.

FIG. 1 is a flowchart of an example of a process by which program state data of a program may be deserialized into a directed graph, updated based on an event, and re-serialized, in accordance with some embodiments of the present techniques. In some embodiments, the process 100, like the other processes and functionality described herein, may be implemented by a system that includes computer code stored on a tangible, non-transitory, machine-readable medium, such that when instructions of the code are executed by one or more processors, the described functionality may be effectuated. Instructions may be distributed on multiple physical instances of memory, e.g., in different computing devices, or in a single device or a single physical instance of memory, all consistent with use of the singular term "medium." In some embodiments, the operations may be executed in a different order from that described. For example, while the process 100 may be described as performing the operations of block 112 before block 124, the operations of block 124 may be performed before the operations of block 112. As another example, while the process 3600 may be described as performing operations of block 3602 before performing operations of block 3604, the operations of block 3604 may be performed before the operations of block 3602. Some operations may be executed multiple times per instance of the process's execution, some operations may be omitted, additional operations may be added, some operations may be executed concurrently and other operations may be executed serially, none of which is to suggest that any other feature described herein is not also amenable to variation.

In some embodiments, the process 100 includes determining that an event has occurred based on an event message, a calculation, or a condition expiration threshold, as indicated by block 104. In some embodiments, the system may determine that an event has occurred after receiving an event message at an API of the system indicating that the event has occurred. As used herein, an event message may be transmitted across or more packets over a wired or wireless connection, where a system may continuously, periodically, or be activated to listen for an event message. In some embodiments, as described further below, an event message may be transmitted over a public or private IP network. Alternatively, or in addition, the event message may be transmitted via the channels of a distributed computing system. For example, the event message may be transmitted from a first node of a distributed computing system (e.g., a blockchain platform) to a second node of the distributed computing system, where the first node and second node may be at different geographic locations (e.g., different nodes executing on different computing devices) or share a same geographic location (e.g., different nodes executing on a same computing device). Furthermore, an event message may be sent by a first smart contract executing on a first computing distributed platform to a second smart contract executing on a same or different distributed computing platform. In some embodiments, determining than event has occurred does not require verification that the event has occurred. For example, in some embodiments, receiving an event message indicating an event has occurred may be sufficient for the system to determine that the event occurred. Furthermore, in some embodiments, a norm vertex may be triggered based on an event satisfying a subset of its associated norm conditions. Alternatively, a norm vertex may be triggered only after an event satisfies all of its associated norm conditions.

In some embodiments, the event may include satisfying a condition expiration threshold associated with a triggerable norm vertex (herein "triggerable vertex") without satisfying a norm condition associated with the triggerable vertex, where a norm condition may be various types of conditions implemented in a computer-readable form to return a value (e.g., "True," "False," set of multiple binary values, or the like). For example, a norm condition may include an "if" statement to test whether a payload containing a set of values was delivered to an API of the system by a specific date, where a condition expiration threshold is associated with the norm condition. After the specific date is reached, the system may determine that the condition expiration threshold is satisfied and determine whether the associated norm condition is satisfied. In response to a determination that the norm condition is not satisfied, the system may determine that an event has occurred, where the event indicates that a condition expiration threshold associated with a triggered norm vertex (herein "triggered vertex") is satisfied and that an associated norm condition of the triggered vertex is not satisfied. As further stated below, such an event may trigger the associated norm vertex and result in the activation of a set of norms, where the activation of the set of norms may be represented by the generation or association of an adjacent vertex to the triggered vertex, where the adjacent vertex may be updated to be triggerable. As used in this disclosure, it should be understood that satisfying the condition expiration threshold of a triggerable vertex does satisfy a condition associated with the triggerable vertex.

In some embodiments, the event message may include a publisher identifier to characterize a publisher of the event message. As used herein, a publisher may be an entity and may include various sources of an event message. For example, a publisher may include a publisher in a publisher-subscriber messaging model or a sender of a response or request in a response-request messaging model. In some embodiments, the publisher identifier may be an entity identifier that is a specific name unique to a source of the event message. For example, a publisher identified by the publisher identifier "BLMBRG" may be transmitted in the event message, where "BLMBRG" is unique to a single publisher. Alternatively, or in addition, a publisher identifier may include or be otherwise associated with an identifier corresponding to an entity type that may be assigned to one or more sources of event messages. For example, the publisher identifier may include or otherwise be associated with an entity type such as "TRUSTED-VENDOR," "ADMIN", or the like.

After receiving a publisher identifier, the system may determine whether the publisher identifier is associated with one of a set of authorized publishers with respect to the event indicated by the event message. In some embodiments, the system may refer to a set of authorized publishers corresponding to the event indicated by the event message. For example, the event message may indicate that an event associated with the event message "PAY DELIVERED" has occurred. In in response, the system may determine that the event satisfies an condition threshold, where satisfying the condition threshold may include a determination that the event satisfies one or more norm conditions in an associative array of conditions and that the associated publisher is authorized to deliver the message. The associative array of conditions may include a list of norm conditions that, if satisfied, may result in triggering at least one triggerable vertex of the smart contract. For example, the system may determine that the event "PAY DELIVERED" is a direct match with the norm condition "if(PAY DELIVERED)" of the associative array of conditions. In some embodiments, the system may then refer to the set of authorized publishers associated with the event "PAY DELIVERED." The system may then determine whether the publisher identifier is in the set of authorized publishers or otherwise associated with the set of authorized publishers, such as by having an entity type representing the set of authorized publishers. In some embodiments, if the system determines that the event message is not authorized, the event message may be rejected as not authorized.

In some embodiments, the operation to authorize the event may include a operations represented by Statement 1 or Statement 2 below, where "prop" may be a string value including an event and "pub" may be a string value representing a publisher identifier or entity type. In some embodiments, Statement 1 below may represent an authorization operation that includes the arrival of an event E[pub] from publisher pub. The system may then compare the publisher "P[E[pub]]" of the event "E[pub]" with each of a set of authorized publishers "D[E[prop]][pub]", where each of the set of authorized publishers is authorized to publish the event "E[prop]". In some embodiments, the set of entities may include or otherwise be associated with the set of authorized publishers. Statement 2 may represent the situation which a plurality of entities may publish a valid event and the systems authorizes a message based on the entity type "P[E[pub]][role]" being in the set of authorized publishers "D[E[prop]][pub]," where the set of authorized publishers "D[E[prop]][pub]" may include authorized publisher type:

$$D[E[prop]][pub]==P[E[pub]] \quad (1)$$

$$D[E[prop]][pub]==P[E[pub]][role] \quad (2)$$

In some embodiments, the set of authorized publishers may include a set of publisher identifiers, and the publisher identifier may in the set of publisher identifiers. For example, if the publisher identifier is "BLMBRG" and the set of authorized publishers include "BLMBRG," the system may determine that an event message including the publisher identifier "BLMBRG" is authorized. Alternatively, or in addition, the set of authorized publishers may include one or more authorized entity types and a respective publisher may be an authorized publisher if the respective publisher identifier is associated with the authorized entity type. For example, if the publisher identifier is "BLMBRG," and if the set of authorized publishers include the entity type "AUTH_PROVIDERS," and if "BLMBRG" is associated with "AUTH_PROVIDERS" via an associative array, then the system may determine that the publisher identifier is associated with the set of authorized publishers. In response, the system may determine that the event message including the publisher identifier "BLMBRG" is authorized. In some embodiments, the system may determine that one or more events indicated by the event message has occurred only after determining that the event message is authorized.

In some embodiments, the event message may include a signature value usable by the system to compute a cryptographic hash value. Furthermore, some event messages may include the event payload with the signature value (e.g., via string concatenation) to compute the cryptographic hash value. The system may use various cryptographic hashing algorithms such as SHA-2, Bcrypt, Scrypt, or the like may be used to generate a cryptographic hash value. In some embodiments, the system may use salting operations or peppering operations to increase protection for publisher information. In some embodiments, the system may retrieve a cryptographic certificate based on a publisher identifier as described above and authenticate the event message after determining that on the cryptographic hash value satisfies one or more criteria based on the cryptographic certificate. A cryptographic certificate may include a cryptographic public key used to compare with the cryptographic hash value, as further discussed below. In addition, the cryptographic certificate may also include one or more second cryptographic values indicating a certificate issuer, certificate authority private key, other certificate metadata, or the like.

In some embodiments, a smart contract may include or be associated with a plurality of cryptographic certificates. The system may determine of which cryptographic certificate to use may be based on a map of entities of the smart contract. In some embodiments, the operation to authenticate the event may include a statement represented by Statement 3 below, where "v" may represent a signature verification algorithm, E[sig] may represent a signature value of an event object "E," "P[E[pub]]" may represent a data structure that includes the entity that had published the event E, and P[E[pub]][cert] may represent a cryptographic certificate value such as cryptographic public key:

$$v(E[sig],P[E[pub]][cert])==True \quad (3)$$

Various signature verification algorithms may be used to authenticate an event message based on a signature value of the event message. For example, the system may determine that the cryptographic hash value is equal to the cryptographic certificate, and, in response, authenticate the event message. In some embodiments, the system may determine that one or more events indicated by the event message has occurred only after authenticating the event message.

In some embodiments, the system may determine that an event has occurred based on a determination that a condition expiration threshold has been reached. One or more norms represented by norm vertices in the smart contract may include a condition expiration threshold such as an obligation that must be fulfilled by a first date or a right that expires after a second date. For example, a smart contract instance executing on the system may include a set of condition expiration thresholds, where the set of condition expiration thresholds may include specific dates, specific datetimes, durations from a starting point, other measurements of time, other measurements of time intervals, or the like. The system may check the set of condition expiration thresholds to determine if any of the condition expiration thresholds have been satisfied.

An event message may be transmitted under one of various types of messaging architecture. In some embodiments, the architecture may be based on a representational state transfer (REST) system, where the event message may be a request or response. For example, a system may receive a request that includes the event message, where the request includes a method identifier indicating that the event message is stored in the request. As an example, the system may receive a request that includes a "POST" method indicator, which indicates that data is in the request message. In addition, the request my include a host identifier, where the host identifier indicates a host of the smart contract being executed by the system. For example, the host identifier may indicate a specific computing device, a web address, an IP address, a virtual server executing on a distribute computing platform, a specific node of a decentralized computing system, or the like.

In some embodiments, the architecture may be based on a publisher-subscriber architecture such as the architecture of the advanced message queuing protocol (AMQP), where the event message may be a either a publisher message or subscriber message. For example, using the AMQP, a client publisher application may send an event message over a TCP layer to an AMQP server. The event message may include a routing key, and the AMQP server may act as a protocol broker that distributes the event message to the system based on the routing key after storing the event message in a queue. In some embodiments, the system may be a subscriber to the client publisher application that sent the event message.

In some embodiments, the process 100 includes determining which smart contracts of a set of active smart contracts that will change state based on the event, as indicated by block 108. As discussed above, in some embodiments, the system may determine that the event satisfies one or more norm conditions, and, in response, determine that the instance of the smart contract will change state. For example, as further discussed below, the system may determine that the event indicated "PAYLOAD 0105 PROVIDED" satisfies the norm condition represented by the condition "IF DELIVERED(PAYLOAD)," In response, the system may determine that the smart contract will change state. Alternatively, or in addition, as discussed above, the system may determine that the event does not satisfy one or more norm conditions but does satisfy a condition expiration threshold. In response, the system may determine that the instance of the smart contract will change state based on the event not satisfying one or more norm conditions while having satisfied the condition expiration threshold. Furthermore, while this disclosure may recite the specific use of a smart contract program in certain sections, some embodiments may use, modify, or generate other symbolic AI programs in place of a smart contract, where symbolic AI programs are further discussed below.

In some embodiments, the system may include or otherwise have access to a plurality of smart contracts or smart contract instances. The system may perform a lookup operation to select which of the smart contracts to access in response to determining that an event has occurred. In some operations, the smart contract may compare an event to the associative array of conditions corresponding to each of a set of smart contracts to select of the set of smart contracts should be updated and filter out smart contracts that would not change state based on the event. The system may then update each of the smart contract instances associated with a changed norm status, as discussed further below. Furthermore, the system may then update the respective associative array of conditions corresponding to the set of smart contracts. In some embodiments, an associative array of conditions may include only a subset of norm conditions associated with a smart contract, where each the subset of norm conditions is associated with a triggerable vertex of the smart contract. In some embodiments, the system may first deduplicate the norm conditions before performing a lookup operation to increase performance efficiency. For example, after determining that an event has occurred, some embodiments may search through a deduplicated array of norm conditions. For each norm condition that the event would trigger, the system may then update the one or more smart contracts associated with the norm condition in the deduplicated array of norm conditions. By selecting smart contracts from a plurality of smart contracts based on an array of norm conditions instead of applying the event to the norm conditions associated with the norm vertices of each of the set of smart contracts, the system may reduce computations required to update a set of smart contracts.

The smart contract or associated smart contract state data may be stored on various types of computing systems. In some embodiments, the smart contract state data may be stored in a centralized computing system and the associated smart contract may be executed by the centralized computing system. Alternatively, or in addition, the smart contract or associated smart contract state data may be stored on a distributed computing system (like a decentralized computing system) and the associated smart contract may be executed using a decentralized application. Fore example, the smart contract may be stored on and executed by a Turing-complete decentralized computing system operating on a set of peer nodes, as further described below.

In some embodiments, the smart contract data may include or be otherwise associated with a set of entities, such as a set of entities encoded as an associative array of entities. The associative array of entities that may include one or more entities that may interact with or view at least a portion of the data associated with the smart contract. In some embodiments, the associative array of entities may include a first associative array, where keys of the first associative array may indicate specific smart contract entities (e.g. data observers, publishers, or the like), and where each of the keys may correspond with a submap containing entity data such as a full legal name, a legal identifier such as a ISIN/CUSIP and an entity type of the entity such as "LENDER," "BORROWER", "AGENT," "REGULATOR," or the like. In some embodiments, one or more entities of the associative array of entities may include or be associated with a cryptographic certificate such as a cryptographic public key. As described above, the cryptographic certificate may be used to authenticate an event message or other message. By including authorization or authentication operations, the system may reduce the risk that an unauthorized publisher sends an event message or that the event message from a publisher is tampered without the system determining that tampering had occurred. In addition, authorization or authentication operations increase the non-repudiation of event messages, reducing the risk that a publisher may later disclaim responsibility for transmitting an event message.

In some embodiments, the smart contract may also include or otherwise be associated a set of conditions, such as a set of conditions encoded as an associative array of conditions. In some embodiments, the associative array of conditions may include a set of norm conditions and associated norm information. In some embodiments, the set of norm conditions may be represented by an associative array, where a respective key of the associative array may be a respective norm condition or norm condition identifier. The corresponding values of the associative array may include a natural language description of the corresponding condition and one or more publisher identifiers allowed to indicate that an event satisfying the respective norm condition has occurred. In some embodiments, the publisher identifier may indicate a specific entity key or an entity type. Furthermore, the smart contract may also include or otherwise be associated with a set of norm vertices or a set of graph edges connecting the vertices, as further described below.

In some embodiments, the process 100 includes deserializing a serialized array of norm vertices to generate a deserialized directed graph, as indicated by block 112. In some embodiments, the smart contract may include or otherwise be associated with a set of norm vertices encoded as a serialized graph in various data serialization formats, where the smart contract may encode a part or all the norm vertices by encoding the graph edges connecting the norm vertices The serialized graph may include a representation of an array of subarrays. A data serialization format may include non-hierarchical formats or flat-file formats, and may be stored in a persistent storage. In some embodiments, a serialized array of norm vertices may include numeral values, strings, strings of bytes, or the like. For example, the array of norm vertices (or other data structures in program state) may be stored in a data serialization format such as JSON, XML, YAML, XDR, property list format, HDF, netCDF, or the like. For example, an array may be decomposed into lists or dictionaries in JSON amenable to serialization. Each subarray of an array of subarrays may include a pair of norm vertices representing a directed graph edge. For example, a subarray may include a first value and a second value, where the first value may represent a tail vertex of a directed graph edge, and where the second value may represent a head vertex of the directed graph edge. For example, a subarray may include the value "[1,5]" where the first value "1" represents a tail vertex indicated by the index value "1" and "5" represents a head vertex indicated by the index value "5." While in serialized form, the array of norm vertices may reduce memory requirements during data storage operations and bandwidth requirements during data transfer operations.

In some embodiments, the serialized array of norm vertices may be used to construct an adjacency matrix or an index-free adjacency list to represent a deserialized directed graph during a deserialization operation. In some embodiments, an adjacency matrix or adjacency list may increase efficient graph rendering or computation operations. In some embodiments, the deserialized directed graph may be stored in a faster layer of memory relative to the serialized graph, such as in a non-persistent memory layer. For example, the system may deserialize a serialized array of vertices stored in flash memory to a deserialized directed graph stored in Level 3 cache. In some embodiments, as further described below, instead of forming a directed graph that includes all of the norm vertices included in the serialized array of norm vertices, the system may instead form a directed graph from a subset of the serialized array of norm vertices. As described above, each norm vertex may have an associated norm status indicating whether the norm vertex is triggerable. In response, the system may form a directed graph of the triggerable vertices without rendering or otherwise processing one or more norm vertices not indicated to be triggerable. Using this method, a vertex that is included in the serialized array of vertices may be absent in the directed graph stored in non-persistent memory. By reducing the number of number of vertices in a deserialized directed graph, the efficiency of querying and updating operations of the smart contract may be increased.

In some embodiments, the system may include an initial set of norm vertices that is distinct from the array of norm vertices. For example, some embodiments may determine that the smart contract had made a first determination that an event had occurred. In some embodiments, the system may search the data associated with the smart contract to find an initial set of norm vertices representing an initial state of the smart contract. The system may then deserialize the initial set of norm vertices when executing the smart contract and perform the operations further described below. The system may then deserialize a different array of norm vertices during subsequent deserialization operations.

In some embodiments, the process 100 includes determining a set of triggerable vertices based on the directed graph, as indicated by block 120. In some embodiments, the system may determine the set of triggerable vertices based on the directed graph stored in non-persistent memory by searching through the vertices of the directed graph for each of the head vertices of the directed graph and assigning these vertices as a set of head vertices. The system may then search through the set of head vertices and filter out all head vertices that are also tail vertices of the directed graph, where the remaining vertices may be the set of leaf vertices of the directed graph, where each of the leaf vertices represent a triggerable vertex. Thus, the set of leaf vertices determined may be used as the set of triggerable vertices.

Alternatively, in some embodiments, a vertex of the set of norm vertices may include or otherwise be associated with a norm status indicating whether the vertex is triggerable or not. In some embodiments, the system may search through the directed graph for vertices that have an associated norm status indicating that the respective vertex is triggerable. Alternatively, or in addition, the system may search through a list of norm statuses associated with the vertices of the serialized array of norm vertices to determine which of the vertices is triggerable and determine the set of triggerable vertices. For example, in some embodiments, each norm vertex of a smart contract may have an associated norm status indicating whether the vertex is triggerable or not triggerable, where the vertices and their associated statuses may be collected into a map of vertex trigger states. The system may then perform operations to traverse the map of vertex trigger states and determine the set of triggerable vertices by collecting the vertices associated with a norm status indicating that the vertex is triggerable (e.g. with a boolean value, a numeric value, a string, or the like). For example, the system may perform operations represented by Statement 4 below, where G may represent a graph and may be an array of subarrays g, where each subarray g may represent a norm vertex and may include a set of values that include the value assigned to the subarray element g[4], where the subarray element g[4] indicates a norm status, and "Active" indicates that the norm vertex associated with subarray g is triggerable, and A is the set of triggerable vertices:

$$A \leftarrow \{g \in G | g[4] = \text{"Active"}\} \qquad (4)$$

In some embodiments, the process 100 includes determining a set of triggered vertices based on the set of triggerable vertices, as indicated by block 124. In some embodiments, the system may compare determine the set of triggered vertices based on which the norm conditions associated with the vertices of the directed graph are satisfied by the event. In some embodiments, a norm condition may directly include satisfying event. For example, a norm condition may include "IF DELIVERED(PAYMENT)," where the function "DELIVERED" returns a boolean value indicating whether a payment represented by the variable "PAYMENT" is true or false. The system may then determine that the norm condition is satisfied if "DELIVERED (PAYMENT)" returns the boolean value "True." The system may then add the vertex associated with the norm condition to the set of triggered vertices. For example, the system may perform operations represented by Statement 5 below, where "A" is the set of triggerable vertices determined above, and where each subarray "a" may represent a triggerable vertex and may include a set of values that include the value assigned to the subarray element a[1], where the subarray element a[1] indicates a condition, and "U" is the set of triggered vertices, and "N" is an associative array that describes the possible graph nodes that may be triggered, such that, for an event prop, N[prop] may return a structure that contains defining details of the vertices associated with the event prop:

$$U \leftarrow \{a \delta A | N[a[1]][prop] = E[prop]\} \quad (5)$$

In some embodiments, the determination that an event satisfies a norm condition may be based on a categorization of a norm into logical categories. As further described below in FIG. 5, logical categories may include values such as a "right," "obligation," "prohibition," "permission," or the like. In some embodiments, after a determination that an event triggers a norm condition, the generation of consequent norms or norm status changes associated with a triggered vertex may be based on the logical category.

In some embodiments, a snapshot contract status may be associated with the smart contract and may be used to indicate a general state of the smart contract. The snapshot contract status may indicate whether the obligations of a contract are being fulfilled or if any prohibitions of the contract are being violated. For example, in some embodiments, satisfying an obligation norm condition may result in an increase in the snapshot contract status and triggering a prohibitions norm may result in a negative change to the snapshot contract status.

In some embodiments, the process 100 includes performing one or more operations indicated by blocks 152, 154, 156, and 160 for each of the respective triggered vertex of the set of triggered vertices, as indicated by block 150. In some embodiments, the process 100 includes updating respective triggered vertex based on an event by updating a norm status associated with the respective triggered vertex, as indicated by block 152. Updating a respective triggered vertex may include updating one or more norm statuses or other status values associated with the respective triggered vertex. For example, a norm status of the respective triggered vertex may be updated to include one of the strings "SATISFIED," "EXERCISED," "FAILED," or "CANCELED," based on the norm conditions associated with the respective triggered vertex having been satisfied, exercised, failed, or canceled, respectively. In some embodiments, the system may update a norm status to indicate that the respective triggered vertex is not triggerable. For example, an obligation norm of a smart contract may be required to be satisfied only once. In response, after determining that the norm condition associated with the obligation has been satisfied by an event, the system may update a first status value associated with the respective triggered vertex to "false," where the first status value indicates whether the respective triggered vertex is triggerable. In some embodiments, the one or more status values may include a valence value indicating the number of connections from the respective triggered vertex to another vertices, the number of connections to the respective triggered vertex from other vertices, or the like. As further described below, in some embodiments, the valence value or other status value associated with the respective triggered vertex may be updated after performing operations associated with the adjacent vertices of the respective triggered vertex.

In some embodiments, the process 100 includes determining whether a respective adjacent vertex of the respective triggered vertex should be set to be triggerable, as indicated by block 154. In some embodiments, the respective triggered vertex may include a pointer to or otherwise be associated with a set of adjacent vertices, where each of the set of adjacent vertices represent a norm of the smart contract that are set to occur after the respective triggered vertex is triggered. In some embodiments, the system may determine whether an adjacent vertex of a respective triggered vertex should be set as triggerable based on specific conditions associated with the adjacent vertex. For example, a respective triggered vertex may include program code instructing that a first set of adjacent vertices should be set to be triggerable if a first set of conditions are satisfied and that a second set of adjacent vertices should be set to be triggerable if a second set of conditions are satisfied, where the first set of adjacent vertices are distinct from the second set of adjacent vertices. Alternatively, or in addition, the respective triggered vertex may include program instructing that a third set of adjacent vertices should be set to be triggerable if the first set of conditions are not satisfied but an associated condition expiration threshold is satisfied.

In some embodiments, the process 100 includes updating the respective adjacent vertex based on the event, as indicated by block 156. Updating the respective adjacent vertex based on the event may include setting one or more norm statuses associated with the adjacent vertex to indicate that the respective adjacent vertex is triggerable. For example, after a determination that a respective adjacent vertex associated with a permission norm is to be set to be triggerable, a norm status associated with the respective adjacent vertex may be updated to the value "triggerable."

In some embodiments, the process 100 includes determining whether any additional triggered vertices are available, as indicated by block 160. In some embodiments, the system may determine that additional triggered vertices are available based on a determination that an iterative loop used to cycle through each the triggered vertices has not reached a termination condition. In response to a determination that additional triggered vertices are available, the process 100 may return to the operations of block 150. Otherwise, operations of the process 100 may proceed to block 164.

In some embodiments, the process 100 includes updating the directed graph based on the updated triggered vertices or the respective adjacent vertices, as indicated by block 170. In some embodiments, updating the directed graph may include updating an adjacency matrix or adjacency list representing the directed based on each of the triggered vertices or their respective adjacent vertices. In some embodiments, instead of looping through each updated vertex and then updating the directed graph, the system may update the directed graph during or after each update cycle. For example, after updating the respective triggered vertex as described in block 156, the system may update the deserialized directed graph.

In some embodiments, the process 100 includes updating the serialized array of norm vertices or other smart contract state data based on the directed graph and updated vertices, as indicated by block 174. In some embodiments, updating the serialized array of norm vertices may include serializing the directed graph into a data serialization format, as described above. In some embodiments, the data serialization format may be the same as the data serialization format used when performing operations described for block 112. For example, the system may implement a depth-first search (DFS) over the deserialized directed graph to record distinct edge pairs and update the serialized array of norm vertices by either modifying or replacing the serialized array of norm vertices.

In some embodiments, the system may update a knowledge set based on the event and smart contract state changes that occurred in response to the event. In some embodiments, the knowledge set may include a set of previous events. The set of previous events may be encoded as a list of previous events. The list of previous events may include a subarray, where each subarray includes an event identifier of a recorded event or information associated with the recorded event. For example, the list of previous events may include a date and time during which an event occurred, an event identifier, one or more norm conditions satisfied by the event, or the like. In some embodiments, a norm condition may be based on the list of previous events. For example, a norm condition may include a determination of whether an event type had occurred twice within a time duration based on the list of previous events. In some embodiments, the knowledge set may include a set of previously-triggered vertices, where the set of previously-triggered vertices may be encoded as an array of previously-triggered vertices. In some embodiments, the system may further update the knowledge set by updating the array of previously-triggered vertices based on the triggered vertices described above. For example, after updating a respective triggered vertex as described above, the system may update the array of previously-triggered vertices to include the respective triggered vertex. The array of previously-triggered vertices may include a vertex identifier associated with the respective triggered vertex, an event identifier associated with the event that triggered the respective triggered vertex, and a set of values identifying the vertices that are set to be triggerable after triggering the respective triggered vertex.

In some embodiments, the process 100 includes persisting the updated serialized array of norm vertices or other smart contract data to storage, as indicated by block 178. In some embodiments, persisting the smart contract data to storage may include updating the memory storage in a single computing device or a computing device of a centralized computing system. Alternatively, or in addition, persisting the smart contract data to storage may include storing the smart contract data to a decentralized tamper-evident data store. In some embodiments, by storing the serialized array of norm vertices in a decentralized tamper-evident data store instead of storing a deserialized directed graph in the decentralized tamper-evident data store, the system may increase the efficiency and performance of the data distribution amongst the nodes of the decentralized tamper-evident data store. Furthermore, in some embodiments, triggering a norm vertex may include triggering a smart contract termination action. When a smart contract termination action is triggered, vertices other than the respective triggered vertex may be updated to set the statuses of each vertex of these other vertices as not triggerable, even if these other vertices are not directly connected to the triggered vertex.

In some embodiments, the system may display a visualization of the smart contract state. For example, the system may display a visualization of smart contract state as a directed graph, such as (though not limited to) those shown in FIG. 5-10, 17-18, or 20 below, where the vertices may have different colors based on norm status and/or logical category. Alternatively, or in addition, the system may generate other types of visualizations of the smart contract state. For example, the system may display a pie chart representing of a plurality of smart contract types that indicate which type of the smart contracts have the highest amount of associated cost.

In some embodiments, the process 100 or other processes described in this disclosure may execute on a decentralized computing platform capable of persisting state to a decentralized tamper-evident data store. Furthermore, in some embodiments, the decentralized computing platform may be capable of executing various programs, such as smart contracts, on the computing platform in a decentralized, verifiable manner. For example, each of a set of peer nodes of the computing platform may perform the same computations, and a consensus may be reached regarding results of the computation. In some embodiments, various consensus algorithms (e.g., Raft, Paxos, Helix, Hotstuff, Practical Byzantine Fault Tolerance, Honey Badger Byzantine Fault Tolerance, or the like) may be implemented to determine states or computation results of the various programs executed on the decentralized computing platform without requiring that any one computing device be a trusted device (e.g., require an assumption that the computing device's computation results are correct). The one or more consensus algorithms used may be selected or altered to impede an entity from modifying, corrupting, or otherwise altering results of the computation by peer nodes not under the entity's control. Examples of a decentralized tamper-evident data store may include Interplanetary File System, Blockstack, Swarm, or the like. Examples of a decentralized computing platform may include Hyperledger (e.g., Sawtooth, Fabric, or Iroha, or the like), Stellar, Ethereum, EOS, Bitcoin, Corda, Libra, NEO, or Openchain.

Figure 2:
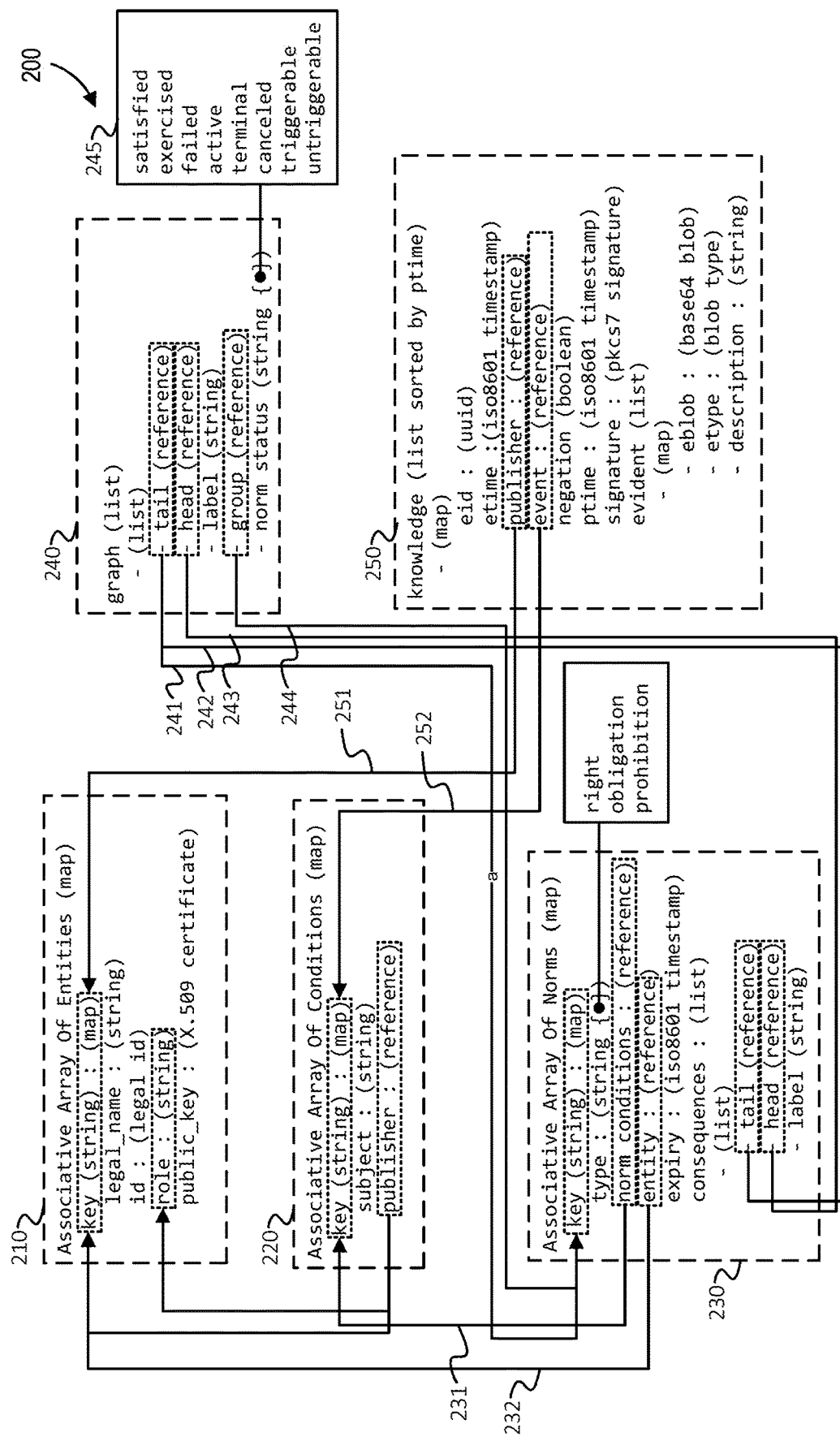
FIG. 2 depicts a data model of program state data, in accordance with some embodiments of the present techniques.

FIG. 2 depicts a data model of program state data, in accordance with some embodiments of the present techniques. In some embodiments, a smart contract may include or otherwise be associated with program state data such as smart contract state data 200. The smart contract state data 200 includes an associative array of entities 210, an associative array of conditions 220, an associative array of norms 230, a graph list 240, and a knowledge list 250. The associative array of entities 210 may include a set of keys, each key representing an entity capable of interacting with or observing smart contract data. For example, a publisher providing an event message to the smart contract may be an entity. The corresponding value of a key of the associative array of entities 210 may include a submap that includes values for a name, a legal identifier value (e.g., a ISIN/CUSIP identifier), an entity type for authorization operations, and a public key for authentication operations (e.g., a cryptographic public key). In some embodiments, the name, identifier value, entity type, or public keys may be used in the authorization and authentication operations discussed for block 104.

The associative array of conditions 220 may include a set of keys, where each key represents an event that may trigger at least one triggerable vertex that would result in a change in norm status, and where a corresponding value of each key includes an events submap. The events submap may include a publisher identifier. As shown by the link 221, the publisher identifier may be used as a reference to the key of the associative array of entities. Alternatively, or in addition, the events submap may include a subject identifier, which may include natural text language to provide a context for the corresponding event.

The associative array of norms 230 may include a set of keys, where each key may represent a norm of the smart contract, which may be associated with as a norm vertex in a graph, norm conditions and consequent norms. In some embodiments, the consequent norms may themselves be associated with their own norm vertices. Each value corresponding to the norm may include a norms submap that includes one or more norm conditions that may be used to trigger the norm by satisfying a norm condition, or by not satisfying the norm condition after satisfying condition expiration threshold associated with the norm. As shown by the link 231, the norm conditions may include a norm identifier that may be used as a reference to a key of the associative array of conditions 220. The norms submap may also include an entity identifier, where the entity identifier may be used as reference to a key of the associative array of entities 210, as shown by the link 232. The norm may also include a condition expiration threshold, which may be represented by the "expiry" field shown in the associative array of norms 230. As discussed above, some embodiments may result in a norm status change or trigger other updates to a vertex if a norm condition is not satisfied but the condition expiration threshold is satisfied. The norm submap may also include a consequences list, where the consequences list may include set of sublists that includes a tail vertex representing a consequent norm that become triggerable, a head vertex of the new norm (which may be the triggered norm), and a label.

In some embodiments, a smart contract state may initially construct the graph list 240 in a first iteration based on the associative array of norms 230 and update the graph list 240 based on a previous iteration of the graph list 240. As described above, the graph list may be in a serialized form, such as a serialized array of norm vertices written in the YAML markup language. As discussed above, the graph list 240 may be a list of graph sublists, where each sublist includes a tail vertex value, a head vertex value, a label associated with the graph edge connecting the tail vertex with the head vertex, a group identifier, and a norm status value. In some embodiments, the norm status may include values such as "satisfied," "exercised," "failed," "active," "terminal," "canceled," "triggerable," or "untriggerable." In some embodiments, a norm vertex may be associated with more than one norm status. As shown by link 241, a tail vertex of the graph may be linked to a norm in the associative array of norms 230. Similarly, as shown by the links 242-243, the tail and head vertices of the graph list 240 may be associated with a listed tail norm or head norm in the associative array of norms 230 for a respective norm. Furthermore, as shown by the link 244, the group identifier listed in a graph sublist may also be associated with a value in the associative array of norms 230, such as with a key in the associative array of norms 230.

In some embodiments, a smart contract state may initially construct the knowledge list 250 in a first iteration based on the associative array of norms 230 and update the knowledge list 250 based on smart contract state changes. The knowledge list 250 may be sequentially ordered in time (e.g. a time when a norm status changes, a time when an event is received, or the like). In some embodiments, each entry of the knowledge list 250 may include an identifier "eid," an event time "etime," a publisher identifier associated with an event that triggered a norm vertex, the event that triggered the norm vertex. In addition, the knowledge list 250 may include various other data related to the smart contract state change, such as a field "negation" to indicate whether an event is negated, a field "ptime" in ISO8601 format to represent an sub-event time (e.g. for event that require multiple sub-events to trigger a norm vertex), a field "signature" to provide a signature value that allows authentication against the public key held by a publisher for later data authentication operations or data forensics operations. In some embodiments, the knowledge list 250 may include an evidence list, where the evidence list may include a base64 encoded blob, an evidence type containing a string describing the file type of the decoded evidence, and a field for descriptive purposes. In some embodiments, the evidence list may be used for additional safety or verification during transactions.

As described above, some embodiments may efficiently store or update program state data using a set of serialization or deserialization operations. Some embodiments may assign outcome scores to possible outcomes of an update operation, which may then be used to predict future states of a program. Some embodiments may perform operations, such as those described further below, to predict an outcome score using data encoded in a directed graph with greater efficiency or accuracy.

Graph Outcome Determination in Domain-Specific Execution Environment

In some embodiments, outcomes of symbolic AI models (like the technology-based self-executing protocols discussed in this disclosure, expert systems, and others) may be simulated and characterized in various ways that are useful for understanding complex systems. Examples of symbolic AI systems include systems that may determine a set of outputs from a set of inputs using one or more lookup tables, graphs (e.g. a decision tree), logical systems, or other interpretable AI systems (which may include non-interpretable sub-components or be pipelined with non-interpretable models). The data models, norms, or other elements described in this disclosure constitute an example of a symbolic AI model. Some embodiments may use a symbolic AI model (like a set of smart contracts) in order to predict possible outcomes of the model and determine associated probability distributions for the set of possible outcomes (or various population statistics). Features of a symbolic AI model that incorporates elements of data model described in this disclosure may increase the efficiency of smart contract searches. In addition, the use of logical categories (e.g., "right," "permission," "obligation") describing the relationships between conditional statements (or other logical units) of a smart contract may allow the accurate prediction of (or sampling of) outcomes across a population of differently-structured smart contracts without requiring a time-consuming analysis of each of the contexts of individual smart contracts from the population of differently-structured smart contracts. Furthermore, the operations of a symbolic AI model may be used to predict outcomes (e.g., of a smart contract, or call graph of such smart contracts) and may be tracked to logical units (like conditional statements, such as rules of a smart contract). These predicted outcomes may be explainable to an external observer in the context of the terms of the logical units of symbolic AI models, which may be useful in medical fields, legal fields, robotics, dev ops, financial fields, or other fields of industry or research.

In some embodiments, the symbolic AI model may include the use of scores for a single smart contract or a plurality of smart contracts, where the score may represent various values, like a range of movement along a degree of freedom of an industrial robot, an amount of computer memory to be allocated, an amount of processing time that a first entity owes a second entity, an amount to be changed between two entities, a total amount stored by an entity, or the like. A symbolic AI model may include scores of different type. Changes in scores of different type may occur concurrently when modeling an interaction between different entities. For example, a first score type may represent an amount of computer memory to be stored within a first duration and a second score type may represent an amount of computer memory to stored within a second duration that occurs after the first duration. A smart contract may be used to allocate computer memory across two different entities to optimize memory use across the entity domains. Possible outcomes and with respect to memory allocation across the two domains may be simulated. Alternatively, or in addition, exchanges in other computing resources of the same type or different types may be simulated with scores in a symbolic AI model. For example, a symbolic AI model may include a first score and as second score, where the first score may represent an amount of bandwidth available for communication between a first entity or second entity and a third entity, and where the second score may represent an amount of memory available for use by the first or second entity. The outcome of an exchange negotiated via a smart contract between the first and second entity for bandwidth and memory allocation may then be simulated to predict wireless computing resource distribution during operations of a distributed data structure across a wireless network or other computing operations.

In some embodiments, simulating outcomes of may include processing one or more norm vertices representing one or more norms of a smart contract as described in this disclosure. For example, the symbolic AI model may include an object representing a norm vertex, where the object includes a first score representing an amount owed to a first entity and a second score representing an amount that would be automatically transferred to the first entity (e.g., as a down payment). In some embodiments, the symbolic AI model may incorporate the entirety of a smart contract and its associated data model when performing simulations based on the smart contract. For example, a symbolic AI model may include one or more directed graphs of to represent the state of a data model. Alternatively, or in addition, some embodiments may include more data than the smart contract being simulated or less data than the smart contract be simulated.

In some embodiments, the symbolic AI system (a term used interchangeably with symbolic AI model) may process the conditional statements (or other logical units) associated with each of the norms of a smart contract to increase simulation efficiency by extracting only quantitative changes and making simplifying assumptions about score changes. For example, a system may collect the norm conditions and associated outcome subroutines associated with each of a set of norm vertices and extract only the changes in an amount of currency owed as a first score and changes in an amount of currency transferred as a seconds score when incorporating this information into the conditions of the symbolic AI model. In some embodiments, the information reduction may increase computation efficiency by removing information from the analysis of a smart contract determined to be not pertinent to a selected score. Some embodiments simulate outcomes across a plurality of smart contracts using a standardized search and simulation heuristic, and the system described herein may provide a population of scores, where the population of scores may be the plurality of outcome scores determined from a simulation of each of the smart contracts or values computed from the plurality of outcome scores. For example, values determined based on the population of scores may include parameters of a probability distribution of the scores, a total score value, a measure of central tendency (e.g. median score value, mean score value, etc.), or the like.

In some embodiments, the symbolic AI model may be an un-instantiated smart contract or may be a transformation thereof, e.g., approximating the smart contract. For example, as further described below, the system may instantiate a program instance that includes a symbolic AI model based on a selected smart contract that is not yet instantiated. Alternatively, a symbolic AI model may be determined based on an instantiated smart contract. For example, the system may select an instantiated smart contract with a program state that has already changed from its initial program state in order to determine future possible outcomes in the context of the existing changes. The system may then copy or otherwise use a simulated version of the changed program state when simulating the instantiated smart contract. For example, the system may select an instantiated smart contract for simulation with a symbolic AI system and deserialize a directed graph of the instantiated smart contract. The symbolic AI system may copy the deserialized directed graph to generate a simulation of the directed graph, where the nodes of the simulated directed graph are associated with simplified conditional statements that convert quantifiable changes into scores and are stripped of non-quantifiable changes in comparison to the conditional statements of the smart contract.

Figure 3:
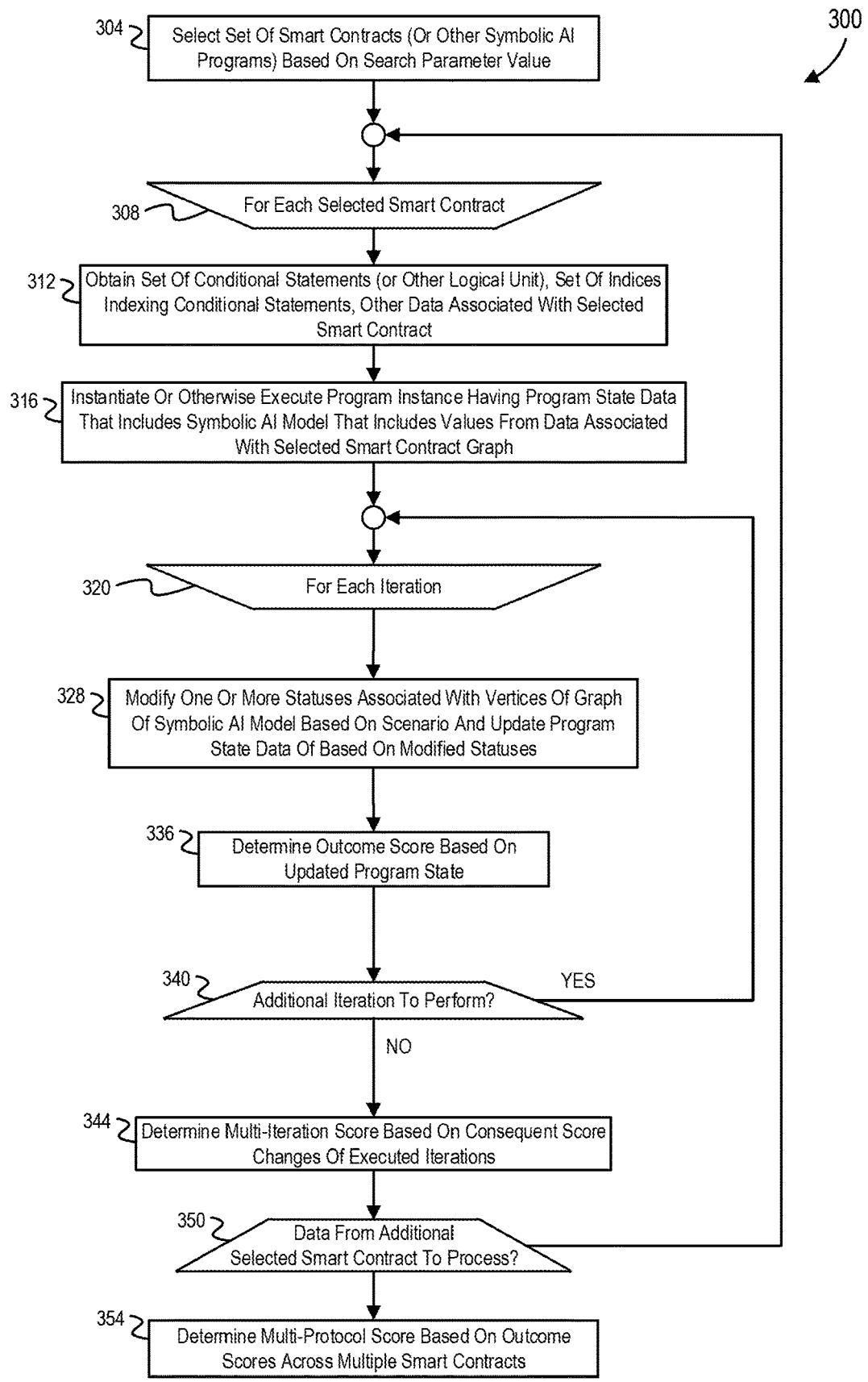
FIG. 3 is flowchart of an example of a process by which a program may simulate outcomes or outcome scores of symbolic AI models, in accordance with some embodiments of the present techniques.

FIG. 3 is flowchart of an example of a process by which a program may simulate outcomes or outcome scores of symbolic AI models, in accordance with some embodiments of the present techniques. In some embodiments, a process 300 includes selecting a set of smart contracts (or other symbolic AI models) based on a search parameter, as indicated by block 304. In some embodiments, a system may include or otherwise have access to a plurality of smart contracts or smart contract instances, and the system may select a set of smart contracts from the plurality based on a specific search parameter, such as an entity, entity type, event, event type, or keyword. For example, the system may perform a lookup operation to select which of the smart contracts to access based an event. During the lookup operation, the system may compare an event to the associative arrays of conditions corresponding to each of a plurality of smart contracts and select a set of smart contracts based on which of the smart contracts would change state in response to receiving the event. Some embodiments may crawl a call graph (of calls between smart contracts, or other symbolic AI models) to select additional smart contracts.

In addition, or alternatively, the system may perform a lookup operation to select which of the smart contracts to access based on an entity or entity type. For example, the system may compare an entity to the associative arrays of entities corresponding to each of a plurality of smart contracts and select a set of smart contracts based on which of the corresponding arrays of entities include the entity. An entity identifier may be in an array of entities or some other set of entities if an entity type associated with the entity identifier is in the array of entities. For example, if the entity "BLMBRG" has an associated entity type of "trusted publisher," some embodiments may determine that "BLMBRG" is in the set of entities of a smart contract if the entity type "trusted publisher" is listed in the set of entities. Alternatively, some embodiments may require that the exact entity identifier be listed in a set of entities before determining that the entity identifier in the set of entities. For example, some embodiments may determine that "BLMBRG" is in a set of entities of a smart contract only if "BLMBRG" is one of the elements of the set of entities. Furthermore, in some embodiments, the search may include intermediary entities between two different entities, where intermediary smart contract may be a smart contract (other than the first or second smart contract) that has relationships with both the first and second entities. For example, a search for smart contracts relating a first entity and a second entity may return a set smart contracts that include a first smart contract and a second smart contract, where the array of entities of the first smart contract includes the first entity and an intermediary entity, and where the array of entities of the second smart contract includes the second entity and the intermediary entity.

In some embodiments, an intermediary entity for a first entity and a second entity may be found by determining the intersection of entities between a first set of smart contracts associated with the first entity and a second set of smart contracts associated with the second entity. For example, the system may select a first set of smart contracts from a plurality of smart contracts based on which sets of entities associated with plurality of smart contracts include the first entity. Similarly, the system may select a second set of smart contracts from a plurality of smart contracts based on which sets of entities associated with plurality of smart contracts include the second entity. The system may then determine the intersection of entities by searching through the sets of entities of the first and second set of smart contracts to collect the entities that appear in both the first set and second set and determine that these collected entities are intermediary entities. In some embodiments, as further described below, additional methods are possible to determine a set of smart contracts associating a first entity with a second entity in order to quantify a relationship between the first entity and the second entity.

As discussed in this disclosure, some embodiments may crawl a call graph to select additional smart contracts based on possible relationships between a first entity and a second entity. The call graph may be a privity graph, which may track privity relations between the first entity and entities other than the second entity in order to determine or quantify relations between the first entity and the second entity. if For example, some embodiments may crawl through a privity graph of possible score changes across multiple contracts and determine a quantitative score relationship between a first entity and a second entity based on a first transaction between the first entity and a third entity, a second transaction between the third entity and a fourth entity, a third transaction between the fourth entity and a fifth entity, and a fourth transaction between the fifth entity and the second entity.

In some embodiments, the process 300 includes performing one or more operations indicated by blocks 312, 316, 320, 324, 328, 336, 340, 344, and 350 for each of the respective smart contracts or other programs of the selected set of smart contracts or other programs, as indicated by block 308. As further discussed below, the one or more outputs from executing each of the smart contracts may be used to determine a population of scores of multiple smart contracts. As used herein, the population of scores of multiple smart contracts may represent one or more population metric values calculated from scores of the smart contract. For example, the population of scores of multiple smart contracts may include a measure of central tendency, a measure of dispersion, a kurtosis value, a parameter of a statistical distribution, one or more values of histogram, or the like. Furthermore, in some embodiments, the process 300 may include performing one or more operations in parallel using multiple processor cores, where performing multiple operations in parallel may include performing the multiple operations concurrently. For example, some embodiments may perform the operations of the blocks 312, 316, 320, 324, 328, 336, 340, 344, and 350 for a plurality of smart contracts in parallel by using one or more processors for each of the plurality of smart contracts. By performing operations in parallel, computation times may be significantly reduced.

In some embodiments, the process 300 includes acquiring a set of conditional statements (or other logical units), set of entities, set of indices indexing the conditional statements, or other data associated with the selected smart contract, as indicated by block 312. Each of the set of conditional statements may be associated with an index value and may include or be otherwise associated with a respective set of conditions and a respective set of outcome subroutines, where a computing device may execute the respective set of outcome subroutines in response to an event satisfying the respective set of conditions. In some embodiments, the set of conditional statements may form a network, like a tree structure, with respect to each other. For example, an outcome subroutine of one the conditional statements may include a reference to or otherwise use an index value associated with another conditional statement. In some embodiments, the set of conditional statements and set of indices may be acquired from a data model, where the index values may be or otherwise correspond to the identifiers for norm vertices of a directed graph. For example, the set of conditional statements and set of indices may be acquired from the associative array of norms 230, the associative array of conditions 220, and the graph list 240. Alternatively, the system may acquire the conditional statements and indices from data stored using other data models. For example, the system may acquire the conditional statements from an indexed array of objects, where each object may include a method that can take an event as a parameter, test the event based on a condition of the method, and return a set of values or include a reference to another object of the array. The system may use the indices of the indexed array as the indices of the conditional statements and parse the methods to provide the set of conditional statements.

In some embodiments, the process 300 includes instantiating or otherwise executing a program instance having program state data that includes a symbolic AI model that includes values from the data associated with the selected smart contract, as indicated by block 316. In some embodiments, the symbolic AI model may include graph vertices associated with the set of conditional statements described in this disclosure and may also include directed graph edges connecting the graph vertices. In addition, or alternatively, the symbolic AI model may include a set of tables, decision trees, graphs, or logical systems to provide a predicted value as an output based on one or more inputs corresponding to real or simulated events. For example, the system may traverse the directed graph of a symbolic AI model to determine which nodes of the directed graph to visit based on a decision tree of the symbolic AI model. Furthermore, in some embodiments, the symbolic AI system may be re-instantiated or be modified in real-time in response to a particular event message updating a smart contract being simulated. For example, an instantiated smart contract may be executing and concurrently being simulated by a symbolic AI system. In response to the smart contract receiving an event message, the symbolic AI system may determine a new set of events based on the event message and update its own program state such that its new initial state is based on the smart contract program state after the smart contract program state has been updated by the events of the event message.

In some embodiments, the symbolic AI model may include a graph. In some embodiments, the system may generate a graph list such as the graph list 240 using the methods discussed in this disclosure. In some embodiments, the program instance may be a local version of a selected smart contract and have program state data identical to program state data in the selected smart contract. Alternatively, the program instance may include program data not included in the smart contract or exclude data included in the smart contract. In some embodiments, the graph of the symbolic AI model may include a set of graph vertices and a set of directed graph edges connecting the graph vertices, where each of the graph vertices may be identified by an identifier and corresponds to a conditional statement of a smart contract. In some embodiments, the identifier may be the set of index values associated with the conditional statements of the smart contract. Alternatively, the identifier may be different from the set of index values associated with the conditional statements of the smart contract. For example, the system may choose a set of identifiers that are different from the set of index values to increase system efficiency or reduce memory use.

In some embodiments, the directed graph edges may be structured to provide directional information about the graph vertices of a symbolic AI model. For example, a directed graph edge may be represented as an array of identifier pairs. The first element of each of the identifier pairs may be treated as a tail vertex by the symbolic AI system and the second element of the identifier pairs may be treated as a head vertex by the symbolic AI system. In some embodiments, the selected smart contract may already be in the process of being executed and the program state data of the program instance may include the norm statuses and scores of the smart contract state. For example, the program state data may be copied directly from the state data of a selected smart contract, where the changes effected by the outcome subroutines may be treated as scores.

A smart contract score may represent one of various types of values. For example, a smart contract score may represent a reputation score of an entity in a social network, a cryptocurrency value such as an amount of cryptocurrency, an amount of electrical energy, an amount of computing effort such as Ethereum's Gas, an amount of computing memory, or the like. A smart contract score may represent an objective value associated with an entity, such as an available amount of computing memory associated with the entity. Alternatively, a smart contract score may represent an amount by which a stored value is to be changed, such as a credit amount transferred from a first entity to a second entity.

In some embodiments, a program state may keep track of a plurality of scores. For example, a vertex of a directed graph of a symbolic AI model may include or otherwise be associated with a first score representing an amount of possessed by a first entity, a second score representing an amount owed to or owed by the first entity, a third score representing an amount possessed by a second entity, and a fourth score representing an amount owed to or owed by the second entity. In some embodiments, a conditional statement may be parsed to determine outcome scores. For example, an outcome subroutine associated with a vertex of a graph of the symbolic AI model may include instructions that a first entity is obligated provide 30 cryptocurrency units to a second entity and that the second entity is obligated to send a message to the first entity with an electronic receipt, and the system may determine that an associated score of the first vertex is equal to 30 and also determine that no score value is needed for the sending of the message. As further discussed below, by keeping track of scores and score changes, entire populations of smart contracts may be analyzed with greater accuracy without requiring a deep understanding of the specific terms or entity behaviors of any specific contract.

In some embodiments, a symbolic AI model may include statuses corresponding to each of a set of vertices representing the norms of a smart contract. The symbolic AI model statuses may use the same categories as the norm statuses of a smart contract. Furthermore, the symbolic AI model status for a vertex may be identical to or be otherwise based on the status for the corresponding norm vertex being simulated. For example, if a norm status for a first norm vertex of a smart contract is "triggered—satisfied," the symbolic AI model status for a first symbolic AI model vertex corresponding to the first norm vertex may also be "triggered—satisfied." Alternatively, the system may select a different categorical value for a symbolic AI model vertex status that is still based on the corresponding norm status. Similarly, the symbolic AI model may include vertex categories similar to or identical to the logical categories associated with of the set of norm vertices of a smart contract. Furthermore, the symbolic AI model vertex category may be identical to or be otherwise based on the logical for the corresponding norm vertex being simulated. For example, if a logical category for a first norm vertex of a smart contract is "Rights" the symbolic AI model category for a first symbolic AI model vertex ("vertex category") corresponding to the first norm vertex may also be "Rights." Alternatively, the system may select a different categorical value for a vertex category that is still based on the corresponding logical category.

In some embodiments, the instantiated program may be a smart contract that may use or otherwise process events. Alternatively, or in addition, the program instance may be a modeling application and not an instance of the selected smart contract itself. For example, a symbolic AI system may be a modeling application that determines the values of a corresponding symbolic AI model based on the conditional statements of a smart contract without requiring that an event message be sent to an API of the modeling application. In some embodiments, the program instance of the symbolic AI system may change program state without performing one or more operations used by the smart contract that the program instance is based on. For example, the program instance of the symbolic AI system may change its program state data without deserializing serialized smart contract data, even if the smart contract that the program instance is based on includes operations to deserialize serialized smart contract data. In some embodiments, the program state data may be stored using a data model similar to that described in this disclosure for FIG. 2. Alternatively, or in addition, the program state data may be stored in various other ways. For example, instead of storing values in separate arrays, the program instance may store the norm conditions, norm outcome actions, and their relationships to each other as part of a same array.

In some embodiments, the process 300 includes performing one or more iterations of the operations indicated by blocks 320, 324, 328, 332, 336, and 340 for each of the respective smart contracts or other programs of the selected set of smart contracts or other programs, as indicated by block 320. Furthermore, in some embodiments, the process 300 may include performing the one or more iterations in parallel using multiple processor cores. For example, some embodiments may include performing multiple iterations of the operations of the blocks 320, 324, 328, 332, 336, or 340 for multiple iterations in parallel using a plurality of processor cores. By performing the multiple iterations of the operations in parallel, computation times may be significantly reduced.

In some embodiments, the system may perform one or more iterations of operations to modify the statuses of a first set of vertices and then update the program state data based on the modified statuses in order to acquire a plurality of outcomes. The program state data or a portion of the program state data may be in a same state at the start each iteration, where two states of program state data are identical if both states have the same set of values. For example, if a first state of program state data is [1,2,3], and if a second state of program state data is [1,2,4], and if the program state data is reverted to [1,2,3], the reverted program state data may be described as being in the first state. In some embodiments, the system may execute the smart contract or smart contract simulation for a pre-determined number of iterations. Alternatively, or in addition, as further recited below, the smart contract or smart contract simulation may be repeatedly executed until a set of iteration stopping criteria are achieved. As further discussed below, the plurality of outcomes corresponding to the plurality of iterations may be used to provide one or more multi-iteration scores usable for decision-support systems and for determining multi-protocol scores.

In some embodiments, the system may modify one or more statuses associated with the vertices of the graph of the symbolic AI model based on a scenario and update the program state data based on the modified statuses, as indicated by block 328. In some embodiments, the scenario may be a set of inputs based on events. For example, a scenario may include simulated events or simulated event messages that may be testable by the conditions of a conditional statement. In response, a first vertex of the program instance may compare the simulated event to a condition and determine that a second vertex of the symbolic AI model of the should be activated. For example, an input may include an event "entity A transmitted data 0x104ABC to entity C," which may satisfy a condition and change a status associated with a first vertex associated with the conditional statement to "satisfied." As discussed below, the system may then update the symbolic AI model based on the status change by activating an adjacent vertex to the first vertex.

Alternatively, or in addition, an input may include a message to change a program state without including an event that satisfies the norm conditions associated with the norm. For example, the input may include direct instructions interpretable by a symbolic AI system to set a vertex status to indicate that the corresponding vertex is triggered and direct which of a set of outcome subroutines to execute. The system may then update the symbolic AI model by activating one or more adjacent vertices described by the subset of outcome subroutines to execute.

In some embodiments, the scenario may include a single input. Alternatively, the scenario may include a sequence of inputs. For example, the scenario may include a first event, second event, and third event in sequential order. In some embodiments, the set of events may be generated using a Monte Carlo simulator. Some embodiments may randomly determine subsequent states from an initial state based on one or more probability distributions associated with each state of a set of possible subsequent states with respect to a previous state, where the probability distributions may be based on scores and logical categories associated with the set of possible states. For example, the program state may be in a state where only two subsequent possible states are possible, where the first subsequent possible state includes triggering a rights norm and a second subsequent possible state includes triggering an obligations norm.

In some embodiments, one or more inputs of a scenario may be determined using a decision tree. In some embodiments, a decision tree may be used to provide a set of decision based on scores, logical categories, statuses, and other factors associated with the active vertices of a simulated smart contract state. For example, a symbolic AI system may determine that the two possible states for a smart contract may result from either exercising a first rights norm or exercising of a second rights norm. A decision tree may be used to compare the logical categories, the scores associated with each norm, and the other information related to the active norms to determine which rights norm an entity would be most likely to exercise. In some embodiments, the symbolic AI system may compare a first score associated with a possible state represented by a first tree node with a second score of a different possible state represented by a second tree node. In response to the first score being greater than the second score, the symbolic AI system may determine a simulated input that will result in the future state represented by the first tree node. Furthermore, in some embodiments, the decision tree may incorporate probability distributions or other decision-influencing factors to more accurately simulate real-world scenarios.

Alternatively, or in addition, some embodiments may include a Monte Carlo Tree Search (MCTS) method to generate a random sequence of events based on a set of possible events and a probability distribution by which the events may occur. The operations of the simulation may be made more efficient by selecting events that known to satisfy at least one condition of the set of conditional statements of the smart contract being simulated. In some embodiments, a symbolic AI system may determine a set of events for a smart contract simulation by determining a first simulated input based on a set of weighting values assigned to vertices of a graph of a symbolic AI model associated with norms of the smart contract. In some embodiments, the system may further determine a simulated input based on a count of the number of iterations of the simulation performed so far.

The system may then update the symbolic AI model based on the first simulated input, advancing the symbolic AI model to a second state. For example, after changing the status of a first vertex associated with an obligations norm from "unrealized" to "failed," the symbolic AI model may then activate a first adjacent vertex representing a rights norm and a second adjacent vertex representing an prohibitions norm, where both adjacent vertices are adjacent to the first vertex. The symbolic AI system may then determine a second simulated input, wherein the second simulated input may be selected based on weighting value corresponding to each of the first adjacent vertex and second adjacent vertex, where the weighting value may be a score of the smart contract. For example, the weighting value of the first adjacent vertex may be ⅔ and the weighting value of the second adjacent vertex may be ⅙. Some embodiments may then update the symbolic AI model when it is in the second state based on the second simulated input in order to advance the second model to a terminal state, where a terminal state is one that satisfies a terminal state criterion. Once in a terminal state, the symbolic AI system may update the weighting values associated with the symbolic AI model before performing another iteration of the simulation.

Various terminal state criteria may be used. For example, a terminal state criterion may be that there is no further state change possible. Alternatively, a terminal state criterion may be that the smart contract is cancelled. The system may then update each of the weighting values associated with each of the nodes after reaching a terminal state before proceeding to perform another iteration. In some embodiments, the symbolic AI system may set a status of a vertex to "failed" to simulate the outcomes of a first entity failing to transfer a score (e.g. failure to pay) a second entity.

In some embodiments, the determination of an input may be based on the type of conditional statement being triggered. As further discussed below, one or more of the conditional statements may be non-exclusively classified as one or more types of norms. Example of norm types include rights norms, obligations norms, or prohibition norms. As further discussed below, norm types may also include associations as being part of a pattern, such as a permission pattern. For example, a vertex may include or be otherwise associated with the label "consent or request." By determining activities based on logical categories associated with the conditional statements instead of specific events, predictive modeling may be performed using globalized behavior rules without interpreting each of the globalized behavior rules for each specific contract. For example, a sequence of event may be generated a based on a first probability distribution that approximates an obligation of a first entity as having a 95% chance of being fulfilled and a 5% chance of being denied and a second probability distribution that approximates that a second entity has a 10% chance of cancelling a smart contract before the first entity exercises a right to cure the failure to satisfy the obligation. Using these rules, population scores associated with the population of smart contracts between a first entity and a second entity that consist of obligations norms to pay, rights norms to cure, and rights norms to cancel may be determined without regards to the specific structure of individual smart contracts in the population of smart contracts.

The system may then update each of the smart contract instances associated with a changed norm status, as discussed further below. Furthermore, the system may then update the respective associative array of conditions corresponding to the set of smart contracts. In some embodiments, an associative array of conditions may include only a subset of norm conditions associated with a smart contract, where each the subset of norm conditions is associated with a triggerable vertex of the smart contract. In some embodiments, the system may first deduplicate the norm conditions before performing a lookup operation to increase performance efficiency. For example, after determining that an event has occurred, some embodiments may search through a deduplicated array of norm conditions. For each norm condition that the event would trigger, the system may then update the one or more smart contracts associated with the norm condition in the deduplicated array of norm conditions.

Some embodiments may obtain a sequence of inputs instead of a single input. In some embodiments, the system may use a neural network to generate the sequence of inputs. In some embodiments, the neural network may determine a state value s based on the program state data and provide a vector of probabilities associated with for each of a set of possible changes in the program state. The neural network may also determine a state value to estimate the expected value of the program state after system applies the scenario to the program. In some embodiments, the neural network may use a MCTS algorithm to traverse a tree representing possible future states of the smart contract from a root state. The system may determine a next possible state $s_{+1}$ for each state s by selecting a state with a low visit count, high predicted state value, and high probability of selection. The parameters (e.g. weights, biases, etc.) of the neural network making the state value determination may be represented by $\theta$. After each iteration ending in a terminal state, the system may adjust the values $\theta$ to increase the accuracy of the neural network's predicted state value in comparison to the actual state value assessed whenever a terminal state is reached. Furthermore, a symbolic AI model may have a total score value, and the system may update the total score value based on the state value.

In some embodiments, the process 300 includes determining an outcome score based on the updated program state data, as indicated by block 336. In some embodiments, as stated in this disclosure, a set of scores may be associated with one or more of the outcome states. For example, an outcome of a first norm may include a transfer of currency values from a first entity to a second entity. The symbolic AI system may record this score and combine it with other scores in the same iteration in order to determine a net score for that score type. For example, the symbolic AI system may record each currency change based on inputs and outcomes in order to determine a net currency change, where a score of the smart contract may be the net currency change. Alternatively, or in addition, the symbolic AI system may record scores across different iterations to determine a multi-iteration score, as described further below. Example outcome scores may include a net amount of currency exchanged, a net amount of computing resources consumed, a change in the total cryptocurrency balance for an entity, or the like.

The process 300 may execute a number of iterations of smart contract state change simulations to determine possible outcomes and outcome scores. In some embodiments, there may be one or more criteria to determine if an additional iteration is needed, as indicated by block 340. In some embodiments, the one or more criteria may include whether or not a pre-determined number of iterations of simulations have been executed. For example, some embodiments may determine that additional iterations are needed if the total number of executed iterations is less than an iteration threshold, where the iteration threshold may be greater than five iterations, greater than ten iterations, greater than 100 iterations, greater than 1000 iteration, greater than one million iterations, greater than one billion iterations, or the like. Alternatively, or in addition, the one or more criteria may include determining whether a specific outcome occurs. For example, the one or more criteria may include determining whether the outcome score is less than zero after a terminal state is reached. If the additional iterations are needed, operations of the process 300 may return to block 320. Otherwise, operations of the process 300 may proceed to block 344.

In some embodiments, the process 300 includes determining a multi-iteration score based on the outcome scores of executed iterations, as indicated by block 344. The multi-iteration score may be one of various types of scores and may include values such as a net change in score across multiple iterations, a probability distribution parameter, a measure of central tendency across multiple iterations, a measure of dispersion, or a measure of kurtosis. For example, the system may use a first outcome score from a first iteration, a second outcome score from a second iteration, or additional outcome scores from additional iterations to determine an average outcome score. The system may determine additional multi-iteration scores in the form of probability distribution parameters to determine a probability distribution. As used herein, a measure of kurtosis value may be correlated with a ratio of a first value and a second value, wherein the first value is based on a measure of central tendency, and wherein the second value is based on a measure of dispersion. For example, the measure of kurtosis may equal to $\mu^4/\sigma^4$, where $\mu$ may be a fourth central moment of a probability distribution and $\sigma$ may be a standard deviation of the probability distribution.

In some embodiments, the multi-iteration score may be used to provide one or more predictions using Bayesian inference methods. In some embodiments, the multi-iteration score may be used to generate a probability distribution for the probability that a particular event or event type occurred based on a score, such as a change in currency value or an amount of computing resources consumed. For example, the system may calculate a mean average cryptocurrency amount determined across multiple iterations as a first multi-iteration score and a standard deviation of the cryptocurrency amount as the second multi-iteration score while tracking the number of payment delays associated with the respective cryptocurrency amounts. The system may then use the first and second multi-iteration scores to generate a gaussian distribution, where the system may use the gaussian distribution to perform Bayesian inferences in order to determine a probability that a payment delay occurred after obtaining the value of a new cryptocurrency amount.

In some embodiments, the multi-iteration score may be a weight, bias, or other parameter of a neural network. For example, some embodiments may use a set of multi-iteration scores as weights of a neural network, where the training inputs of the neural network may be outcome scores and the training outputs of the neural network may be events, indicators representing activated outcome subroutines, or activated patterns. Once trained, the neural network may determine the probability of events, triggered conditional statements, or triggered patterns based on observed scores. In some embodiments, the parameters of the neural network may be transferred to other neural networks for further training. For example, a first neural network may be trained using the outcome scores as inputs and sets of events as outputs, and the weights and biases of the training may be transmitted to a second neural network for further training. The second neural network may then be used to indicate whether a particular event had a sufficiently high possibility of occurring based on a score or score change. In addition, the multi-iteration score may include outputs of a convolutional neural network, which may be used to determine behavior patterns across multiple smart contracts.

In some embodiments, the symbolic AI system may use a fuzzy logic method to predict the occurrence of an event based on the outcomes of a smart contract. A fuzzy logic method may include fuzzifying inputs by using one or more membership functions to determine a set of scalar values for each of a set of inputs, where the set of scalar values indicate the degree of membership of the inputs of a set of labels for each of the inputs of a smart contract being simulated by a symbolic AI system. For example, the system may use a membership function to determine a percentage values between 0% and 100% for a set of labels such as "profitable," "risky," or the like. The percentage values may indicate, for each of the smart contracts, a degree of membership to each of the labels. The symbolic AI system may then determine an fuzzified outcome score based on the set of fuzzified data by first using a set of rules in combination with an inference engine to determines the degree of match associated with the fuzzy input and determine which of the set of rules to implement. As used herein, an inference engine may be a system that applies a set of pre-defined rules. For example, an inference engine may include a set of "if-then" expressions that provided responses to particular inputs. By using the inference engine in combination with the set of rules, the fuzzified outcome score may provide an indication of a broader label for the smart contract, such as "unconventional," "risk too high," or the like. In some embodiments, the symbolic AI system may defuzzify the fuzzified outcome score using various methods such as centroid of area method, bisector of area method, mean of maximum method, or the like. The defuzzifying process may result in a defuzzified outcome score that may also be used to determine a label.

In some embodiments, each of the scenarios may have an associated scenario weight, where the associated scenario may be a numeric value representing a normalized or nonnormalized probability of occurrence. For example, a smart contract may be processed based one of three possible scenarios, where the first scenario may have a weighting value equal to 0.5, the second scenario may have a weighting value equal to 0.35, and the third scenario may have a weighting value equal to 0.15. The system may use the associated scenario weights when determining a multi-iteration score. For example, if the first, second, and third scenarios results in allocating, respectively, 100, −10, or −100 computing resource units to a first entity, the system may determine that the expectation resource units allocated to the first entity is equal to 31.5 computing resource units and use the expectation resource units as the allocation value. While the above described using a scalar value as a weighting value, some embodiments may instead use a probability distribution as an associated scenario weight for each of the scenarios and determine the weighting value.

In some embodiments, the system may determine if data from an additional smart contract is to be processed, as indicated by block 350. As discussed in this disclosure, the process 300 may execute a number of simulations of different smart contracts to simulate possible outcomes and score changes. In some embodiments, each of the set of selected smart contracts may be simulated using a symbolic AI simulator. Furthermore, each of the set smart contracts may use the same set of weights/probability values to determine unique scenarios. For example, using the same set of weights corresponding to different combinations of available vertices, the system may determine a first scenario for a first symbolic AI model and a second scenario for a second symbolic AI model, where the first and second symbolic AI models have directed graphs that are different from each other. In some embodiments, the same weights may be used because the plurality of symbolic AI models may include vertices based on the same set of statuses and same set of logical categories. If the additional iterations are needed, operations of the process 300 may return to block 308. Otherwise, operations of the process 300 may proceed to block 354.

In some embodiments, the process 300 includes determining a multi-protocol score based on the outcome scores across multiple smart contracts, as indicated by block 354. A multi-protocol score may be any score that is determined based on a plurality of outcomes from simulating different smart contracts, where the plurality of outcomes may include either or both multi-iteration scores or scores determined after a single iteration. In some embodiments, the multi-protocol score may be determined by determining a population of scores associated with a given entity. For example, a population of scores may be a population of expected income across a population of 500 instantiated smart contracts. The multi-protocol score may be a total income value, average income value, kurtosis income value, or the like.

In some embodiments, one or more methods to determine a multi-iteration score may be used to determine a multi-protocol score. For example, use of fuzzy logic, Bayesian inference, or neural networks may be used to predict multi-protocol scores. For example, some embodiments may use a first set of multi-iteration scores from a plurality of smart contract simulations as inputs and a second set of multi-iteration scores from the same plurality of smart contract simulations as outputs when training a neural network, where a set of multi-protocol score may be one or more the parameters of the trained neural network. For example, some embodiments may include a neural network trained to predict the probability that a specific type of smart contract was used based on multi-iteration scores such as an average payment duration and an average payment amount.

In some embodiments, multiple multi-protocol scores may be used to determine risk between a first entity and a second entity. For example, operations of the process 300 may be performed to determine a list of smart contracts shared by a first entity and a second entity and predict possible risks to the first entity in scenarios resulting from the incapability of the second entity to fulfill one or more norms in the list of smart contracts. In some embodiments, the risk posed to a first entity by a second entity may include considerations for intermediate relationships. For example, a first entity may be owed multiple amounts from a plurality of entities other than a second entity, and a second entity may owe multiple amounts to the plurality of entities. In some embodiments, a risk associated with the total amount of a score value to be collected by the first entity from the plurality of entities may be assessed based on the risk of the second entity failing to fulfill one or more obligations to transfer score values to one or more of the plurality of entities. While the relationship between the first entity and the second entity may be difficult to determine using conventional smart contract systems if no explicit privity relations are listed in the smart contracts, the symbolic AI models described in this disclosure allow these relationships to be determined by searching through entity lists or crawling through one or more privity graphs.

FIGS. 4-9 below show a set of directed graphs that represent examples of program state of a smart contract or a simulation of a smart contract. Each vertex of the directed graph may represent conditional statements that encode or are otherwise associated with norm conditions and outcome subroutines that may be executed when a norm condition is satisfied. Each directed graph edge of the directed graph may represent a relationship between different conditional statements. For example, the tail vertex of a directed graph edge may represent a norm vertex that, if triggered, will activate the respective head vertex of the directed graph edge. As used in this disclosure, the direction of a directed graph edge points from the tail vertex of the directed graph edge to the head vertex of the directed graph edge. Furthermore, the direction of the of the directed graph edge may indicate that the respective head vertex to which the directed graph edge points is made triggerable based on a triggering of the respective tail vertex. In some embodiments, a norm vertex may be triggered if the trigger direction is the same as the directed graph edge direction for each directed graph edge. In some embodiments, the direction of a directed graph edge associated with norm condition may be used to categorize a norm or norm vertex.

Figure 4:
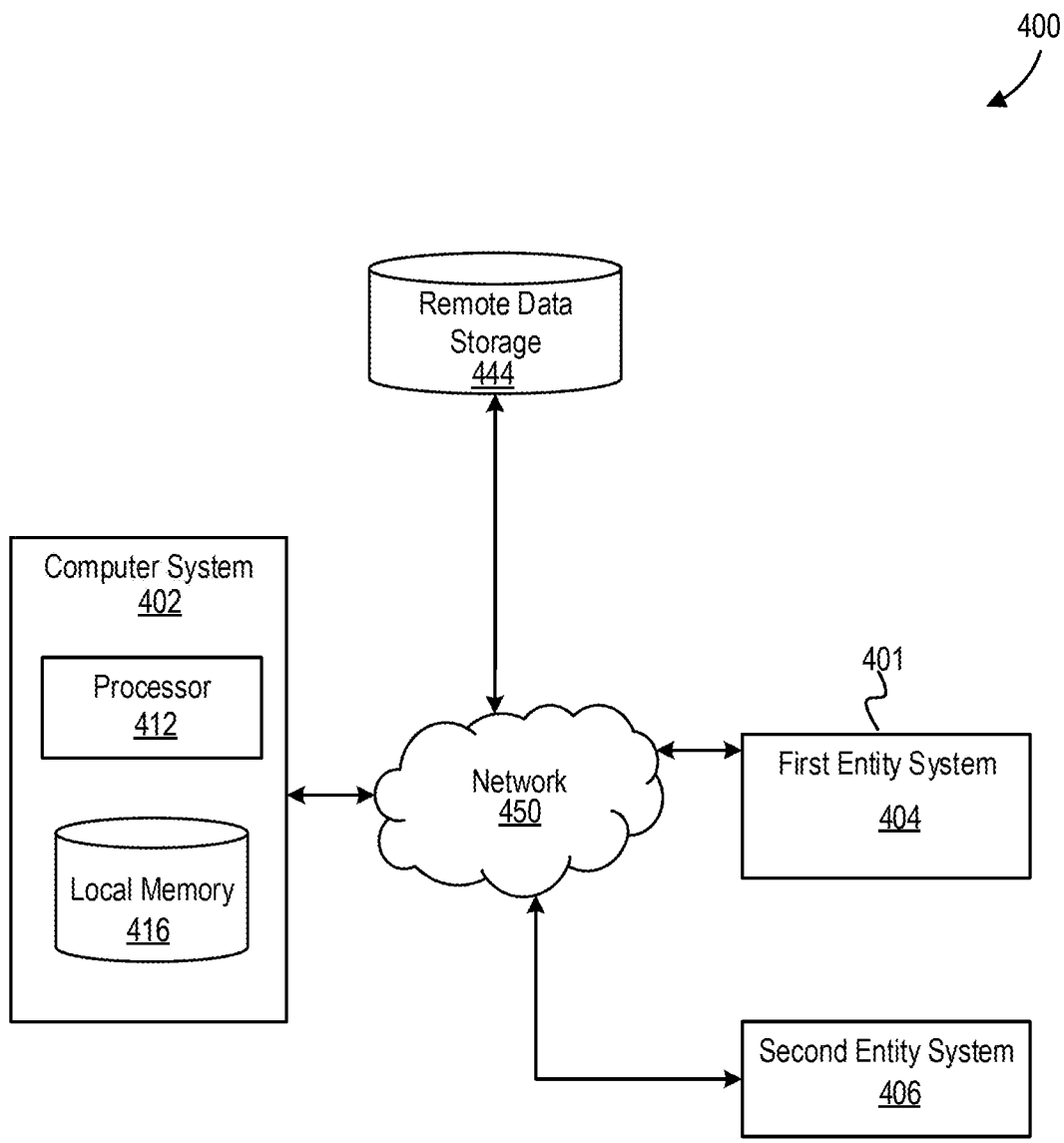
FIG. 4 show a computer system for operating one or more symbolic AI models, in accordance with some embodiments of the present techniques.

FIG. 4 shows a computer system for operating one or more symbolic AI models, in accordance with some embodiments of the present techniques. As shown in FIG. 4, a system 400 may include computer system 402, first entity system 404, second entity system 406 or other components. The computer system 402 may include a processor 412 and a local memory 416, or other components. Each of the first entity system 404 or second entity system 406 may include any type of mobile computing device, fixed computing device, or other electronic device. In some embodiments, the first entity system 404 may perform transactions with the second entity system 406 by sending messages via the network 450 to the computer system 402. In some embodiments, the computer system 402 may execute one or more applications using one or more symbolic AI models with a processor 412. In addition, the computer system 402 may be used to perform one or more of the operations described in this disclosure for the process 100 or the process 300. Parameters, variables, and other values used by a symbolic AI model or provided by the symbolic AI model may be retrieved or stored in the local memory 416. In some embodiments, parameters, variables, or other values used or provided by the computer system 402, entity systems 404-406, or other systems may be sent to or retrieved from the remote data storage 444 via the network 450.

Figure 5:
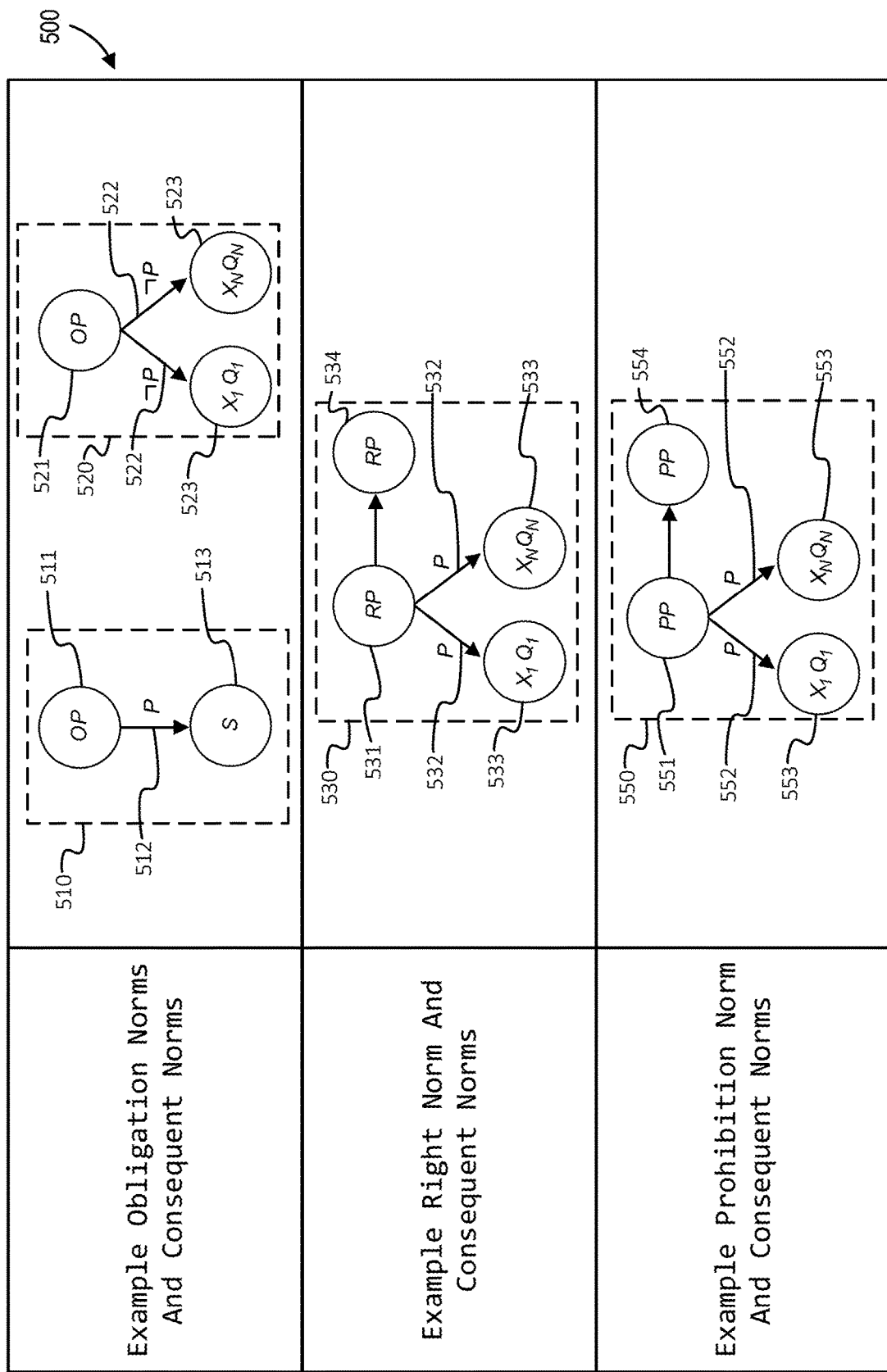
FIG. 5 includes a set of directed graphs representing triggered norms and their consequent norms, in accordance with some embodiments of the present techniques.

FIG. 5 includes a set of directed graphs representing triggered norms and their consequent norms, in accordance with some embodiments of the present techniques. The table 500 shows various triggered vertices and their respective consequent vertices in the form of directed graphs. In some embodiments, the system may include categories for norms of a smart contract based on a deontic logic model, where the categories may include obligation norms, rights norms, or prohibition norms. In addition to various contract-specific ramifications of these categories, norms within each category may share a common set of traits with respect to their transiency and possible outcomes. As shown in table 500, the relationship between a triggered norm and its consequent norms may be represented as a directed graph, where each of the norms may be represented by a vertex of the directed graph and where each triggering event may be used to as a label associated with a graph edge.

Box 510 includes a directed graph representing a smart contract state (or simulation of the smart contract state) after an event satisfying a norm condition of the obligation norm represented by the norm vertex 511. As shown in box 510, after a determination that the norm condition P associated with the norm vertex 511 is satisfied by an event (indicated by the directed graph edge 512), the system may generate an adjacent vertex 513 indicating that the norm vertex 511 is satisfied, where a norm status of the adjacent vertex 513 may be set as "terminal" to indicate that the adjacent vertex is terminal. In some embodiments, a determination that the state of the smart contract or simulation thereof is terminal may be made if a vertex of the smart contract or simulation thereof indicated to be terminal. In some embodiments, instead of generating the adjacent vertex 513, the system may update a norm status associated with the norm vertex 511 to indicate that the norm vertex 511 is satisfied. For example, the system may update a norm vertex associated with the obligation norm by setting a norm status associated with the norm vertex to "satisfied," "terminal," or some other indicator that the obligation norm has been satisfied by an event. In some embodiments, updating a norm vertex associated with the obligation norm may be represented by the statement 6, where $$\xrightarrow{P}$$

represents a result of the norm condition associated with the obligation norm "OP" being satisfied, and S represents the generation of a norm vertex indicating that the conditions of the obligation norm have been satisfied:

$$\ln OP \xrightarrow{P} S \qquad (6)$$

As shown in box 520, an norm condition P may end up not satisfying a norm condition associated with the norm vertex 521 after satisfying a condition expiration threshold, where the norm vertex 521 is associated with an obligation norm. In response, the system may update the norm vertex 521 by setting a norm status associated with the norm vertex 521 to "failed" or some other indicator that the norm condition associated with the norm vertex 521 has been not satisfied. For example, an event may indicate that a condition expiration threshold has been satisfied without an obligation norm condition being satisfied. In response, the system may generate or otherwise set as triggerable the set of consequent norms associated with adjacent vertices 523, where the relationship between a failure to satisfy a norm condition P of the norm vertex 521 and the adjacent vertices 523 is indicated by the directed graph edges 522. In some embodiments, the generation of the adjacent vertices may be represented by the statement 7, where $$\xrightarrow{\neg P}$$

indicates that the instructions to the right of the symbol $$\xrightarrow{\neg P}$$

are to be performed if a norm condition "OP" is not satisfied, and the instructions represented by the symbolic combination $\Lambda_i X_i Q_i$ represents the generation or activation of the consequent norms that result from the failure of OP:

$$OP \xrightarrow{\neg P} \Lambda_i X_i Q_i \qquad (7)$$

In some embodiments, in response to an event satisfying a norm condition of a rights norm, the system may update a norm vertex associated with the rights norm by setting a norm status associated with the norm vertex to "exercised" or some other indicator that the rights norm has been triggered based on an event. For example, as shown in box 530, in response to an event satisfying a norm condition associated a rights norm represented by the norm vertex 531, the system may update a norm vertex associated with the norm vertex 531 by setting a norm status associated with the norm vertex 531 to "exercised" or some other indicator that the rights norm has been exercised. In response, the system may generate or otherwise set as triggerable the set of consequent norms associated with adjacent vertices 533, where the relationship between satisfying a norm condition P associated with the norm vertex 531 and the set of consequent norms associated with adjacent vertices 533 is indicated by the directed graph edges 532. Furthermore, in some embodiments, a rights norm may be contrasted with an obligation norm by allowing a rights norm to remain triggerable after triggering. This may be implemented by further generating or otherwise setting as triggerable the rights norm associated with the rights norm vertex 534. In some embodiments, a rights norm may expire after use. For example, some embodiments may not generate the rights norm vertex 534 after triggering the norm vertex 531. In some embodiments, the operation described above may be represented by statement 8 below, where the result of triggering a rights norm $RP_1$ by satisfying the norm condition P may result in a conjunction of newly-triggerable consequent norms $\Lambda_i X_i Q_i$ and a rights norm $RP_2$ that is identical to the rights norm $RP_1$, where $\Lambda$ represents a mathematical conjunctive operation:

$$RP_1 \xrightarrow{P} \Lambda_i X_i Q_i \wedge RP_2 \qquad (8)$$

In some embodiments, in response to an event satisfying the norm condition of a "prohibition" norm, the system may update a norm vertex associated with the "prohibition" norm by setting a norm status associated with the norm vertex to "violated" or some other indicator that the "prohibitions"" norm has been triggered based on an event. For example, as shown in box 550, an event may satisfy a norm condition P associated with the prohibition norm represented by a norm vertex 551. In response, the system may update the norm vertex 551 by setting a norm status associated with the norm vertex 551 to "violated" or some other indicator that the associated prohibitions norm condition has been satisfied. In response, the system may generate or otherwise set as triggerable the set of consequent norms associated with adjacent vertices 553, where the relationship between satisfying a norm condition P associated with the norm vertex 551 and the set of consequent norms associated with adjacent vertices 553 is indicated by the directed graph edges 552. Furthermore, in some embodiments, a prohibitions norm may be contrasted with an obligation norm by allowing a prohibitions norm to survive triggering. In addition, in some embodiments, triggering a prohibitions norm may result in the system decreasing a value representing the state of the smart contract. This may be implemented by further generating or otherwise setting as triggerable the prohibitions norm associated with the prohibitions norm vertex 554 after triggering the norm vertex 551. In some embodiments, the operation described above may be represented by statement 9 below, where the result of triggering a prohibition norm $PP_1$ by satisfying the norm condition P may result in a conjunction of newly-triggerable consequent norms $\Lambda_i X_i Q_i$ and a prohibition norm $PP_2$ that is identical to the prohibition norm $PP_1$, where $\Lambda$ represents a mathematical conjunctive operation:

$$PP_1 \xrightarrow{P} \Lambda_i X_i Q_i \wedge PP_2 \qquad (9)$$

Figure 6:
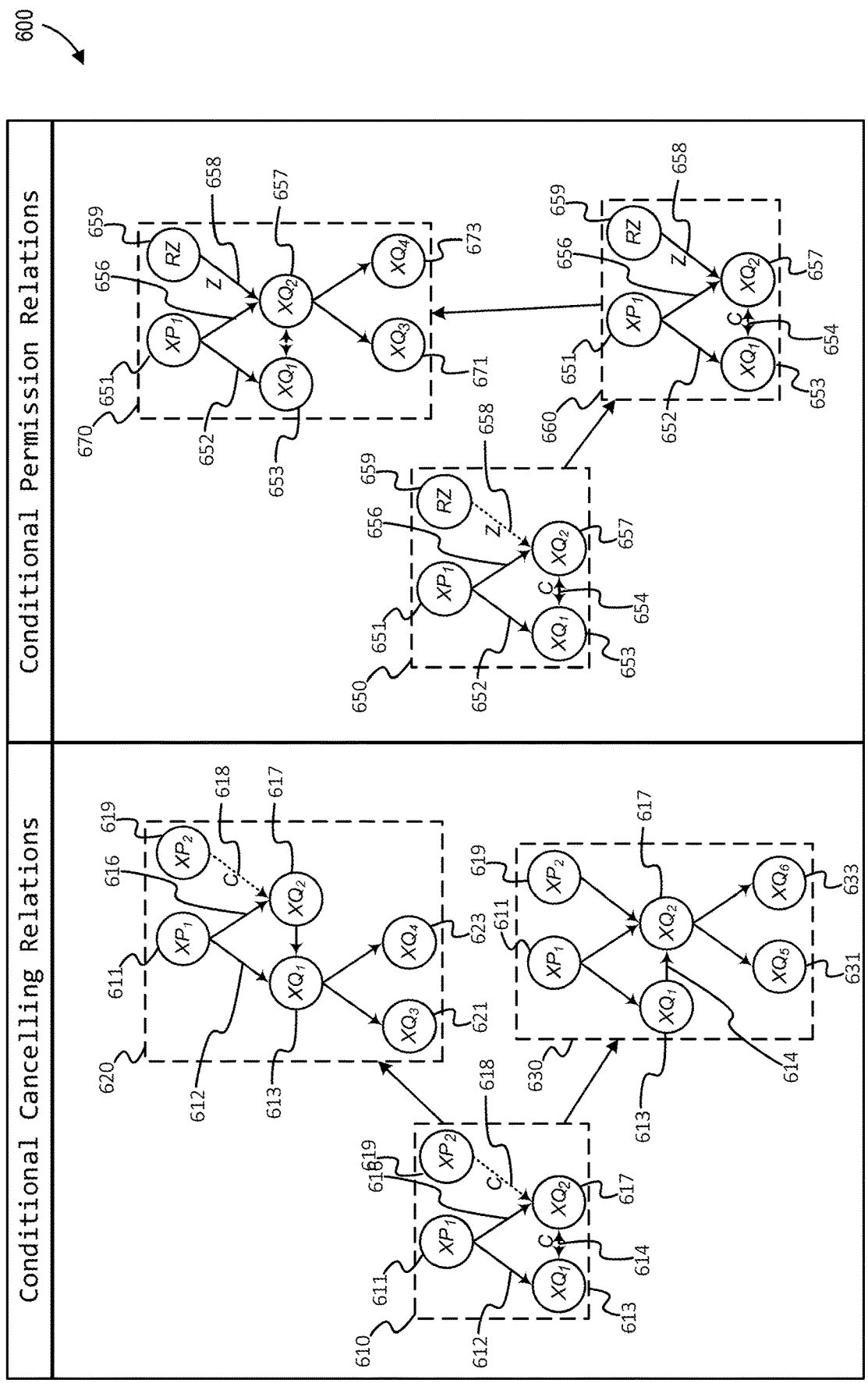
FIG. 6 includes a set of directed graphs representing possible cancelling relationships and possible permissive relationships between norms, in accordance with some embodiments of the present techniques.

FIG. 6 includes a set of directed graphs representing possible cancelling relationships and possible permissive relationships between norms, in accordance with some embodiments of the present techniques. The table 600 includes a left column that includes a directed graph 610 representing an initial state and a directed graph 620 that represents a first possible outcome state of the initial state and a directed graph 630 that represents a second possible outcome state of the initial state. In some embodiments, a norm condition may be a cancellation condition, where satisfying a cancellation condition results in the cancellation of one or more norms. Cancelling a norm may include deactivating a norm, deleting the norm, deleting graph edges to the norm, or otherwise or otherwise setting the norm as not triggerable. For example, an obligations norm may include a cancellation outcome subroutine, where triggering the obligations norm may result in the cancellation of one or more norms adjacent to the obligations norm. In some embodiments, the effect of satisfying a cancellation norm may be represented by statement 10 below, where XP may represent an obligations norm, $$\xrightarrow{P, \neg P}$$

may indicate that the event which triggers the norm XP occurs when the norm condition P is either satisfied or failed, $\wedge_i X_i Q_i$ represents the set of consequent norms that are set to be triggerable based on the event triggering XP, and $X_j U_j$ may represent the set of consequent norms that cancelled based on event triggering XP:

$$XP \xrightarrow{P, \neg P} \wedge_i X_i Q_i \wedge \wedge_j \neg X_j U_j \tag{10}$$

As shown by statement 10 above, one or more norms may be cancelled. In some embodiments, a cancellation may be implemented as an inactive graph edge between the norm XP and the norms $X_j U_j$, where the graph edge representing the conditional relationship between the norm XP and the norms $X_j U_j$ are directed towards the norm XP. In some embodiments, the cancellation of a norm may be implemented by setting an indicator to indicate that a norm or condition associated with the cancelled norm is no longer triggerable.

The directed graph 610 may represent a state of a start contract and may include the first vertex 611, second vertex 613, third vertex 617, and fourth vertex 619, each of which are associated with a norm of a smart contract. The directed graph 610 also depicts a mutual cancellation relationship between the norm associated with the second vertex 613 and the third vertex 617 represented by the XQ1-XQ2 graph edge 614, where a mutual cancellation relationship of a pair of norm vertices may include a cancellation of one norm vertex of the pair upon triggering of the other norm vertex of the pair. The directed graph 610 also depicts a unidirectional cancellation relationship between the norm associated with the fourth vertex 619 and the third vertex 617 as represented by the XP2-XQ2 graph edge 618. In some embodiments, satisfying or otherwise triggering the norm associated with the third vertex 617 may instantiate the RZ-XQ2 graph edge 618 and cancel the fourth vertex 619. In some embodiments, each of vertices and graph edges shown in FIG. 5 may be represented using a protocol simulation program. For example, the first vertex 611 may be modeled in a simulation program and may be associated with a conditional statement of a smart contract.

In some embodiments, the state represented by the directed graph 610 may advance to the state represented by the directed graph 620. The state represented by the directed graph 620 may be achieved by triggering the norm associated with the second vertex 613, which may result in the cancellation of the norm associated with the third vertex 617. Furthermore, as illustrated by the directed graph 620, triggering the norm associated with the second vertex 613 may also result in the activation of fifth vertex 621 and sixth vertex 623. In addition, triggering the norm associated with the third vertex 617 may result in the cancellation of the norm associated with the fourth vertex 619. Furthermore, as illustrated by the directed graph 630, triggering the norm associated with the third vertex 617 may also result in the activation of a seventh vertex 631 and eighth vertex 633. Each of these triggering behaviors may be implemented directly by a smart contract.

In some embodiments, the triggering relationship described in this disclosure may be modeled using a symbolic AI system that may keep track of any scores associated with events that trigger the norms and the outcomes of triggering the norms. For example, a first probability value may be assigned to the state represented by the directed graph 620 and a second probability value may be assigned to the state represented by the directed graph 630 during a simulation of the smart contract. The symbolic AI system may use the first and second probability values to advance the state represented by either the directed graph 620 or the directed graph 630 over multiple iterations to compute a multi-iteration score using the methods described in this disclosure. For example, if the first probability value is 20% and the second probability value is 80%, and a first score represented by the directed graph 620 is equal to 100 cryptocurrency units and a second score represented by the directed graph 630 is equal to 1000 cryptocurrency units, a multi-iteration score may be equal to 820 cryptocurrency units.

The right column of table 600 includes a directed graph 650, which may represent an initial state of a smart contract (or simulation thereof). The right column of table 600 also includes a directed graph 660 that represents a first possible outcome state of the initial state and a directed graph 670 that represents a subsequent possible outcome state of the first possible outcome state. The initial state represented by the directed graph 650 may include a permissive condition of a permission norm, where satisfying a permissive condition may result in the activation of one or more norms. For example, after being activated, a rights norm RP may include a set of permissions $\{RV_k\}$ that are triggered after satisfying an norm condition associated with the rights norm RP, where the rights norm RP may also be described as a permission norm. Triggering the set of permissions $\{RV_k\}$ may either set the norm XP to be triggerable or otherwise prevent an outcome subroutine of the norm XP from being executed until the set of permissions $\{RV_k\}$ are triggered. This relationship may be represented by statement 11 below, where XP may represent an obligations norm, $RV_k$ represents the permissions that must be triggered before XP may be triggered, $$\xrightarrow{P, \neg P}$$

may indicate that the event which triggers the norm XP occurs when the norm condition P is either satisfied or failed, $\wedge_i X_i Q_i$ represents the set of consequent norms that are set to be triggerable based on the event triggering XP after the permissions $RV_k$ are triggered, and $X_jU_j$ may represent the set of consequent norms that cancelled based on event triggering XP after the permissions $RV_k$ are triggered:

$$XP \mid RV_k \xrightarrow{P_i \to P} \wedge_i X_i Q_i \wedge \wedge_j \neg X_j U_j \qquad (11)$$

As shown by statement 11 above, XP may be set to be triggerable upon triggering of the permission $RV_k$. Triggering XP after the permissions $RV_k$ are triggered results in activation of the consequent norms $\wedge_i X_i Q_i$ and cancels the norms $X_j U_j$. In some embodiments, the conditions needed to trigger permissions may be activated in conjunction with rights norms dependent on the permissions, and thus XP and $RV_k$ may be activated as a result of triggering the same triggered norm. In some embodiments, permission behavior may be performed by a smart contract or a simulation thereof by modifying a first status of a first vertex and a second status of a second vertex to indicate that the first and second vertices are triggered, where the first vertex may represent a first rights norm such as XP and the second vertex may represent a permission norm such as a norm having outcome permissions $RV_k$. The smart contract, or a simulation thereof, may trigger a third vertex that is adjacent to the first vertex and the second vertex such as a vertex in $\wedge_i X_i Q_i$ in response to the first and second statuses now being triggered.

The directed graph 650 may include a first vertex 651, second vertex 653, third vertex 657, and fourth vertex 659. The directed graph 650 also depicts a mutual cancellation relationship between the norm associated with the second vertex 653 and the third vertex 657 represented by the XQ1-XQ2 graph edge 654. The directed graph 650 also depicts a permission relationship between the norm associated with the fourth vertex 659 and the third vertex 657 as represented by the RZ-XQ2 graph edge 658, where the fourth vertex 659 may include or otherwise be associated with permission conditions that must be satisfied in order to trigger the third vertex 657. In some embodiments, satisfying or otherwise triggering the norm associated with the fourth vertex 659 may instantiate the RZ-XQ2 graph edge 658 and allow the outcome subroutines of the third vertex 657 to be executed.

In some embodiments, the program state represented by the directed graph 650 may produce an outcome state represented by the directed graph 660. The outcome state represented by the directed graph 660 may be achieved by satisfying a norm condition associated with the fourth vertex 659. In some embodiments, after the XQ1-XQ2 graph edge 654 becomes instantiated, an event satisfying a norm condition associated with the third vertex 657 may result in the program state represented by the directed graph 670. The directed graph 670 may represent a program state where the norm associated with the third vertex 657 is triggered, resulting in the activation of additional norms associated with the fifth vertex 671 and sixth vertex 673.

In some embodiments, a symbolic AI system may be used to generate a scenario that includes a sequence of inputs having a first input and a second input. The first input may advance the state represented by the directed graph 650 to the state represented by the directed graph 660 and the second input may advance the state represented by the directed graph 660 to the state represented by the directed graph 670. The sequence of inputs may be determined using any of the methods described in this disclosure. For example, the sequence of inputs may be determined using a Monte Carlo method, a neural network, or the like.

Figure 7:
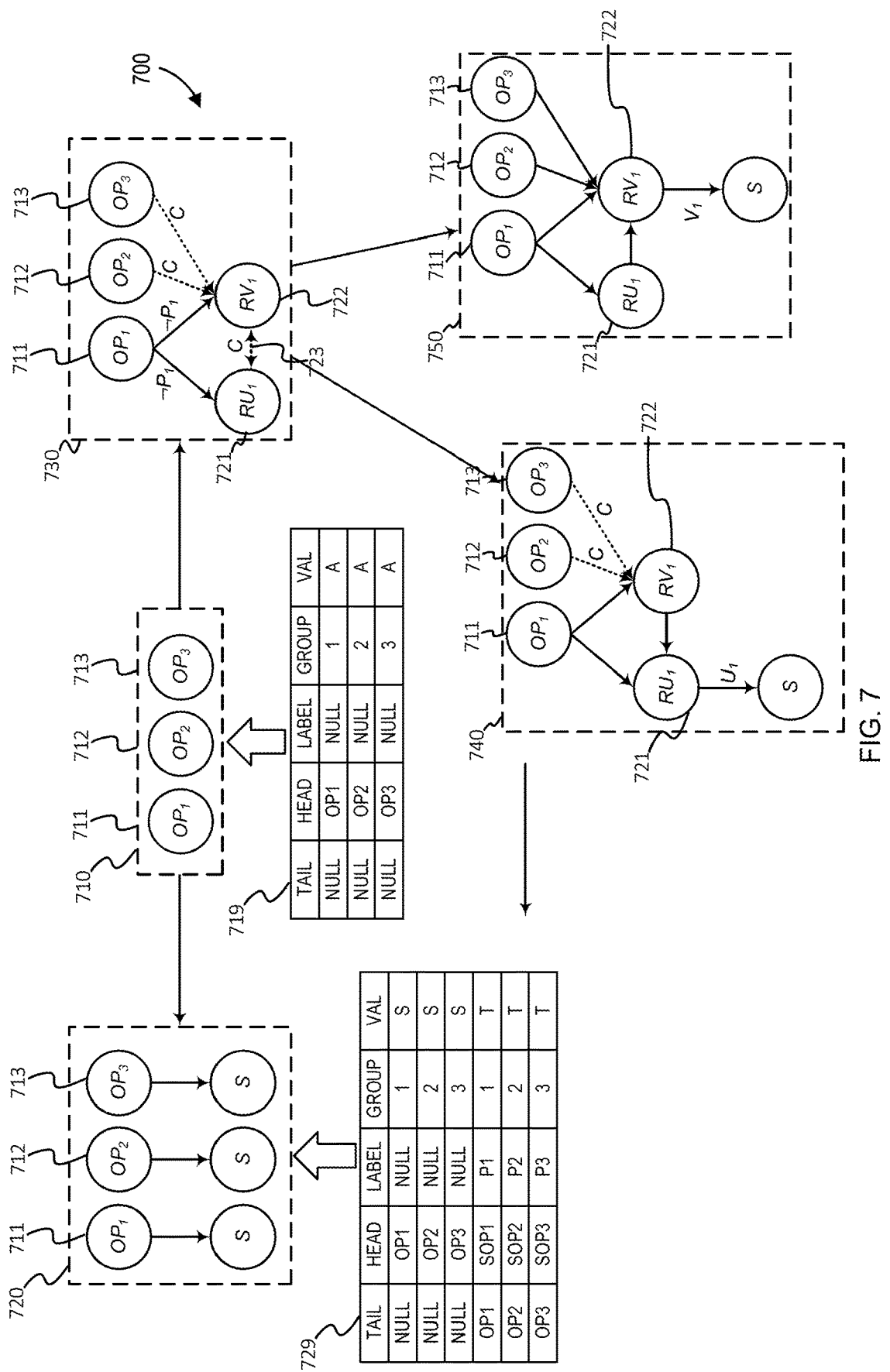
FIG. 7 includes a set of directed graphs representing a set of possible outcome states based on events corresponding to the satisfaction or failure of a set of obligations norms, in accordance with some embodiments of the present techniques.

FIG. 7 includes a set of directed graphs representing a set of possible outcome states based on events corresponding to the satisfaction or failure of a set of obligations norms, in accordance with some embodiments of the present techniques. The set of directed graphs 710 includes a set of three vertices 711-713, each representing an obligation norm to perform a set of related tasks. In some embodiments, the obligation norm may represent an obligation to transmit digital assets, deliver a data payload, or perform a computation. For example, the obligation norm represented by the first vertex 711 may be associated with an obligation for a first entity to transmit a down payment to a second entity, where a determination that the down payment occurred may be based on an event message sent by the second entity confirming that payment was delivered. The obligation norm represented by the second vertex 712 may be associated with an obligation for the second entity to deliver an asset to the first entity, where a determination that the asset was delivered may be based on an event message sent by the second entity confirming that the asset was delivered. The obligation norm represented by the third vertex 713 may be associated with an obligation for the first entity to pay a balance value to the second entity.

The set of directed graphs 720 may represent a first outcome state that may result from the program state represented by the set of directed graphs 710, where each of the obligation norms represented by the three vertices 711-713 are satisfied. In some embodiments, a smart contract simulation system such as a symbolic AI system may assign a probability value to the possibility the state represented by the set of directed graphs 710 is advanced to the outcome state represented by the set of directed graphs 720. For example, a symbolic AI system may assign a probability for the outcome state represented by the set of directed graphs 720 to be equal to 82% when starting from the state represented by the set of directed graphs 710. The symbolic AI system may then perform a set of simulations based on this probability value using a Monte Carlo simulator.

The set of directed graphs 730 may represent a second outcome state that may result from the program state represented by the set of directed graphs 710, where the first obligation is not satisfied and the time has exceeded a condition expiration threshold associated with the first vertex 711. As shown in the set of directed graphs 730, a failure to meet the first obligation represented by the first vertex 711 may result in a system generating or otherwise activating norms associated with a fourth vertex 721 and a fifth vertex 722. In some embodiments, the norm associated with the fourth vertex 721 may represent a first entity's right to cure the payment failure and the norm associated with the fifth vertex 722 may represent a second entity's right to terminate the smart contract. The bidirectional graph edge 723 indicates that triggering one of the pair of vertices 721-722 will cancel or otherwise render as inactive the other of the pair of vertices 721, which may indicate that curing a failed obligation and terminating the smart contract may be mutually exclusive outcomes. In some embodiments, a symbolic AI system (or other modeling system) may assign a probability value to the possibility the state represented by the set of directed graphs 710 is advanced to the outcome state represented by the set of directed graphs 720. For example, the symbolic AI system may assign a probability for the outcome state represented by the set of directed graphs 720 to be equal to 6% when performing a simulation based on the smart contract program state represented by the set of directed graphs 710.

In some embodiments, the state represented by the set of directed graphs 730 may be advanced to the state represented by a set of directed graphs 740. In some embodiments, the state represented by a set of directed graphs 740 may be an outcome state after the norm associated with the fourth vertex 721 is triggered. As shown in the set of directed graphs 740, triggering the norm associated with the fourth vertex 721 may result in cancelling the norm associated with fifth vertex 722. In some embodiments, a symbolic AI system may use probability value representing the probability of the state represented by the set of directed graphs 730 advancing to the state represented by a set of directed graphs 740. For example, a symbolic AI system may use 50% as the probability that the state represented by the set of directed graphs 730 advances to the state represented by a set of directed graphs 740. If the probability of the state represented by the set of directed graphs 720 advancing to the state represented by a set of directed graphs 730 is equal to 6%, this would mean that the probability of the state represented by the set of directed graphs 710 advancing to the state represented by a set of directed graphs 740 is equal to 3% by applying the multiplication rule for the probability of independent events.

In some embodiments, the state represented by the set of directed graphs 730 may be advanced to the state represented by a set of directed graphs 750. In some embodiments, the state represented by a set of directed graphs 750 may be an outcome state after the norm associated with the fifth vertex 722 is triggered. As shown in the set of directed graphs 750, triggering the norm associated with the fifth vertex 722 may result in cancelling the norm associated with second vertex 712, third vertex 713, and fourth vertex 721. In some embodiments, a symbolic AI system may assign a probability value to the possibility of a smart contract state being in the outcome state represented by the set of directed graphs 750 when starting from the program state represented by the set of directed graphs 730. In some embodiments, the probability values associated with each state may be updated after each iteration in a set of simulated iterations using one or more of the methods in this disclosure. For example, some embodiments may apply a MCTS method to explore the program states represented by the sets of directed graphs 710, 720, 730, and 740 across multiple iterations while keeping track of scores for each iteration in order to determine outcome scores for each iteration and multi-iteration scores.

Figure 8:
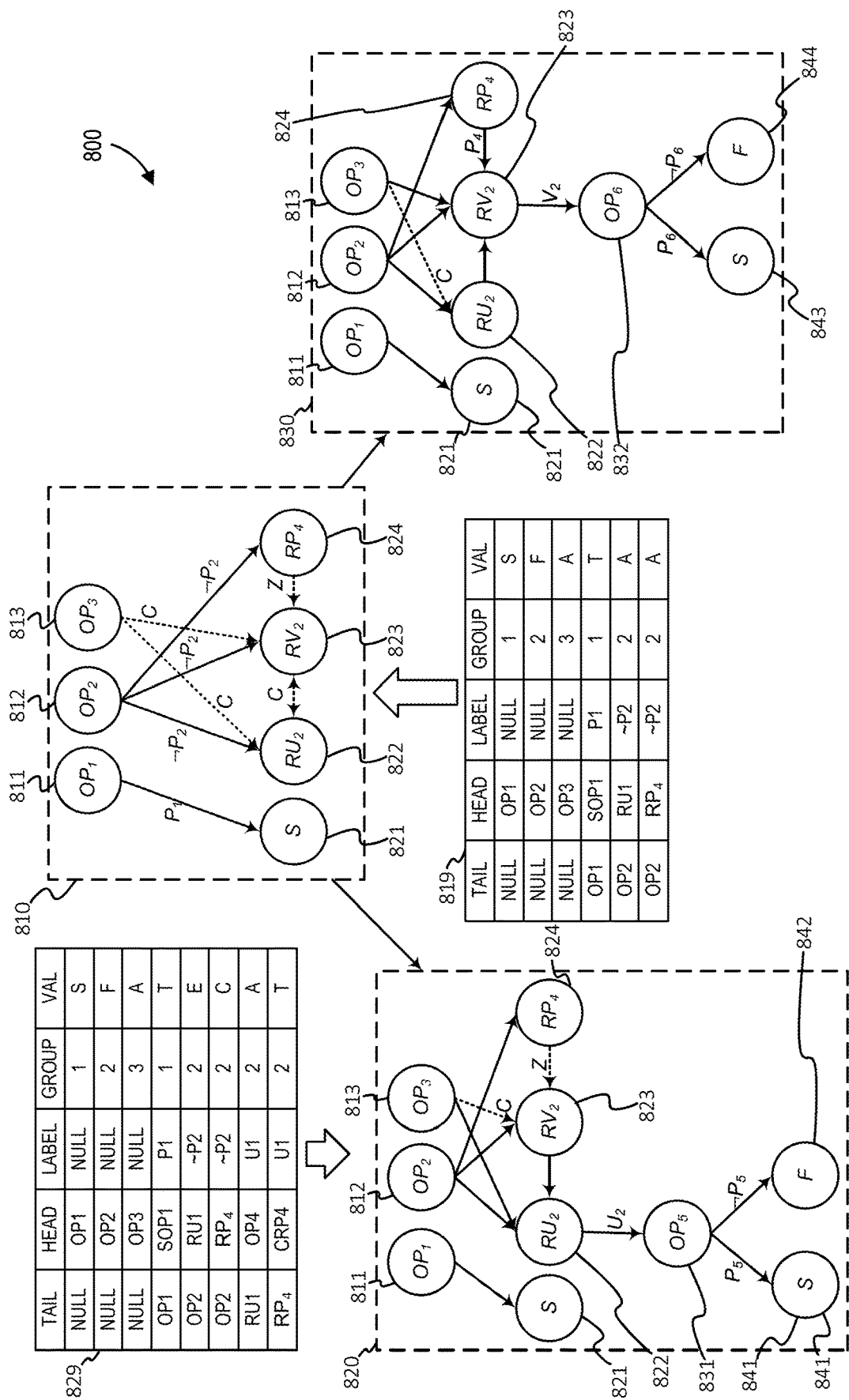
FIG. 8 includes a set of directed graphs representing a set of possible outcome states after a condition of a second obligations norm of a set of obligations norms is not satisfied, in accordance with some embodiments of the present techniques.

FIG. 8 includes a set of directed graphs representing a set of possible outcome states after a condition of a second obligations norm of a set of obligations norms is not satisfied, in accordance with some embodiments of the present techniques. In some embodiments, the set of directed graphs 810 may represent an initial state of a smart contract. Alternatively, the set of directed graphs 810 may represent an outcome state. For example, the program state represented by the set of directed graphs 810 may be an outcome state of the program state represented by the set of directed graphs 710, with an associated occurrence probability equal to 6%. The set of directed graphs 810 may represent a failure to satisfy a norm condition associated with the second vertex 812. In some embodiments, the second vertex 812 may represent an obligation norm indicating an obligation for a second entity to deliver an asset, such as a schematic, to the first entity.

In some embodiments, the state represented by the set of directed graphs 810 may be advanced to the state represented by a set of directed graphs 820. In some embodiments, the state represented by a set of directed graphs 820 may be an outcome state after the norm associated with the fifth vertex 822 is triggered. As shown in the set of directed graphs 820, triggering the norm associated with the fifth vertex 822 may result in cancelling the norm associated with sixth vertex 823. In some embodiments, the fifth vertex 822 may represent a first entity's right to terminate the order and obtain a refund. This outcome may be represented by the eighth vertex 831, which may represent an obligation norm indicating that the second entity has an obligation to pay the first entity, and that this obligation may either be satisfied or failed, as indicated by vertices 841 and 842, respectively.

In some embodiments, the state represented by the set of directed graphs 810 may be advanced to the state represented by a set of directed graphs 830. In some embodiments, the state represented by a set of directed graphs 820 may be an outcome state after the norm associated with the sixth vertex 823 is triggered. As shown in the set of directed graphs 830, triggering the norm associated with the sixth vertex 823 may result in cancelling the norm associated with sixth vertex 823. In some embodiments, the sixth vertex 823 may represent a first entity's right to cure the failure to satisfy the norm represented by the second vertex 812. This outcome may be represented by the ninth vertex 832, which may represent an obligation norm indicating that the second entity has an obligation to deliver an asset to the first entity, and that this obligation may either be satisfied or failed, as indicated by vertices 843 and 844, respectively.

In some embodiments, a symbolic AI system may assign a probability value to the possibility of a smart contract state being in the outcome state represented by the set of directed graphs 820 or set of directed graphs 830 when starting from the program state represented by the set of directed graphs 810. For example, a symbolic AI system may determine that the probability that the outcome state represented by the set of directed graphs 820 is equal to 40%. Similarly, the symbolic AI system may determine that the probability that the outcome state represented by the set of directed graphs 830 is equal to 60%. In some embodiments, the symbolic AI system may use a Bayesian inference to determine if an obligation norm was failed was failed based on a probability distribution computed from the scores associated with program states such as those states represented by the sets of directed graphs 820 or 830. For example, the symbolic AI system may acquire a new score value and, based on the score value, predict whether an obligation represented by the second vertex 812 was failed.

Figure 9:
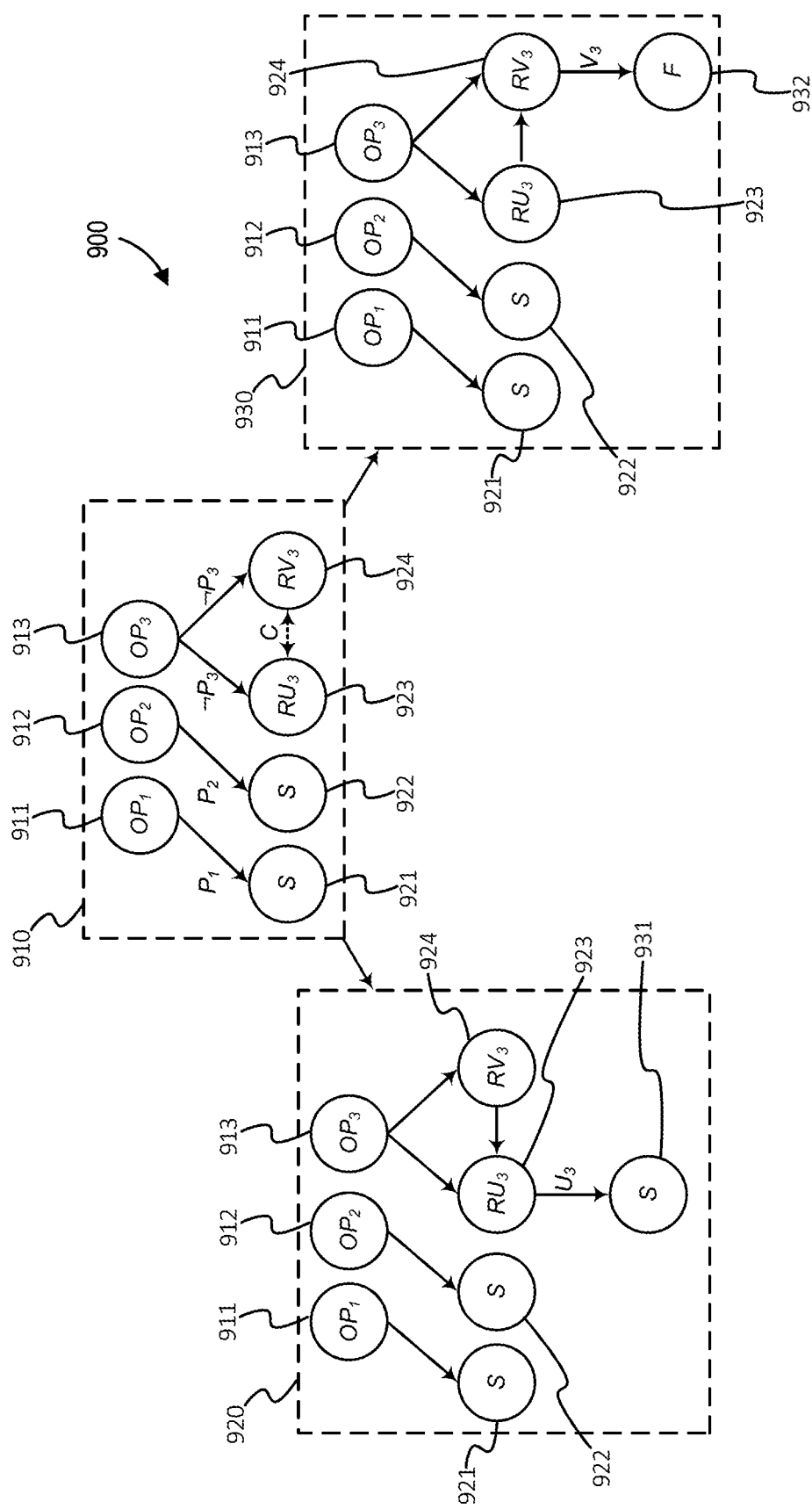
FIG. 9 includes a set of directed graphs representing a set of possible outcome states after a condition of a third obligations norm of a set of obligations norms is not satisfied, in accordance with some embodiments of the present techniques.

FIG. 9 includes a set of directed graphs representing a set of possible outcome states after a condition of a third obligations norm of a set of obligations norms is not satisfied, in accordance with some embodiments of the present techniques. In some embodiments, the set of directed graphs 910 may represent an initial state of a smart contract. Alternatively, the set of directed graphs 910 may represent an outcome state. For example, the program state represented by the set of directed graphs 910 may be an outcome state of the program state represented by the set of directed graphs 810, with an associated occurrence probability equal to 6%. The set of directed graphs 910 may represent a failure to satisfy a norm condition associated with the third vertex 913. In some embodiments, the third vertex 913 may represent an obligation norm indicating an obligation for a first entity to pay a balance value to the second entity. Triggering the norm associated with third vertex 913 by failing to satisfy an associated obligation condition may result in activating norms associated with a sixth vertex 923 and a seventh vertex 924. In some embodiments, the norm associated with the sixth vertex 923 may represent a first entity's right to cure the payment failure and the norm associated with the seventh vertex 924 may represent a second entity's right to declare a breach and flag the first entity for further action (e.g. initiate arbitration, incur a reputation score decrease, or the like).

In some embodiments, the state represented by the set of directed graphs 910 may be advanced to the state represented by a set of directed graphs 920. In some embodiments, the state represented by a set of directed graphs 920 may be an outcome state after the norm associated with the sixth vertex 923 is triggered. In some embodiments, the norm associated with the sixth vertex 923 may represent a first entity's right to cure the payment failure, and thus triggering the rights norm associated with the sixth vertex 923 may represent a first entity's right to cure the failure. As indicated by the satisfaction vertex 931, curing the payment failure may end all outstanding obligations of the smart contract.

In some embodiments, the state represented by the set of directed graphs 910 may be advanced to the state represented by a set of directed graphs 930. In some embodiments, the state represented by a set of directed graphs 930 may be an outcome state after the norm associated with the seventh vertex 924 is triggered. In some embodiments, the norm associated with the seventh vertex 924 may represent a second entity's right to declare a breach, and thus triggering the rights norm associated with the seventh vertex 924 may represent a second entity's declaration of contract breach. This may result in the activation of the failure vertex 932, which may include outcome subroutines that sends a message indicating that the smart contract is in breach to a third party or sends instructions to an API of another application.

Figure 10:
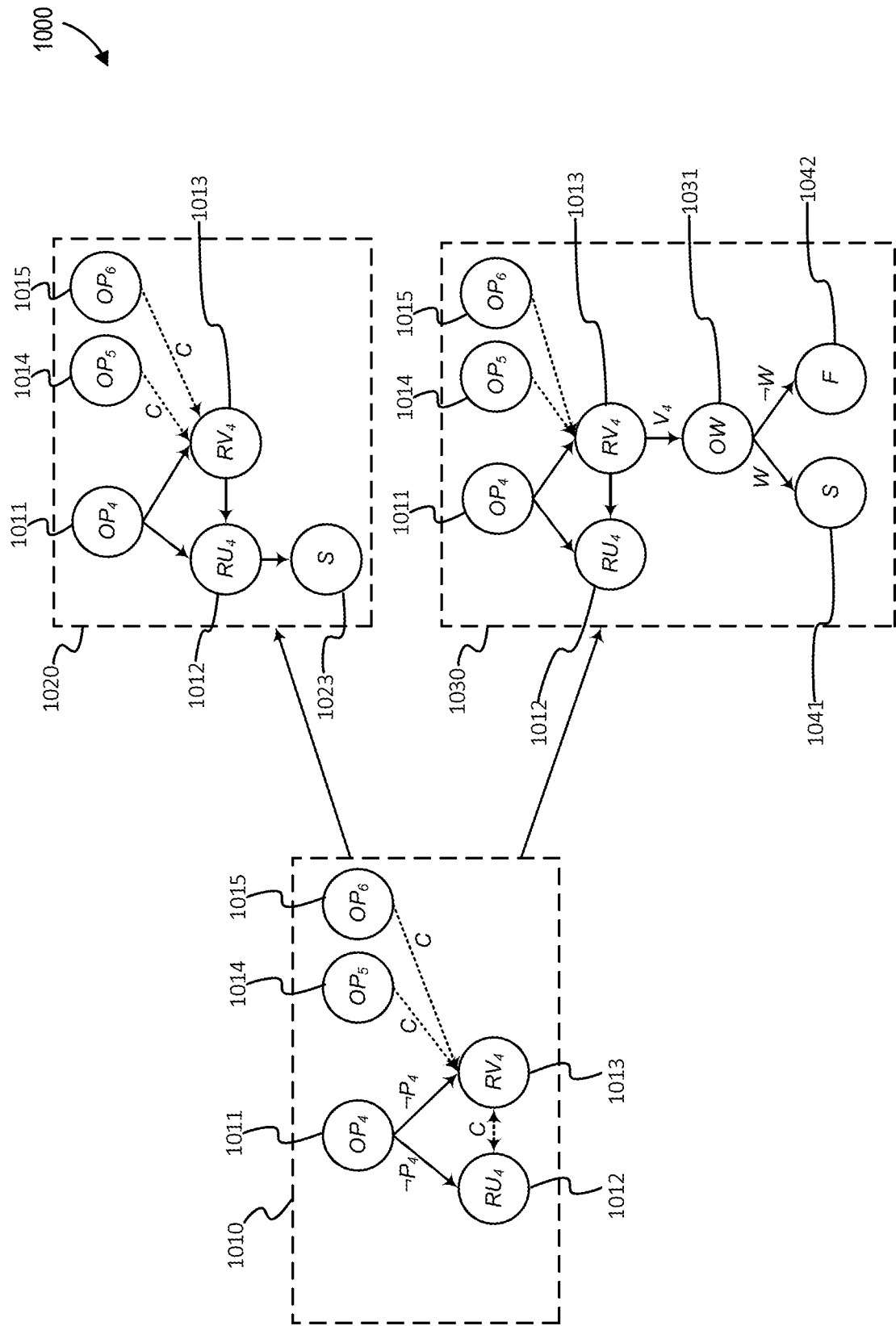
FIG. 10 includes a set of directed graphs representing a pair of possible outcome states after a condition of a fourth obligations norm of a set of obligations norms is not satisfied, in accordance with some embodiments of the present techniques.

FIG. 10 includes a set of directed graphs representing a pair of possible outcome states after a condition of a fourth obligations norm of a set of obligations norms is not satisfied, in accordance with some embodiments of the present techniques. FIG. 10 includes a directed graph 1010 representing a first program state of a smart contract or a symbolic AI simulation thereof. The program state represented by the directed graph 1010 may be changed to the program state represented by a directed graph 1020. Alternatively, the program state represented by the directed graph 1010 may be changed to the program state represented by a directed graph 1030. The directed graph 1010 includes a first vertex 1011 that may represent an obligations norm. In some embodiments, the first vertex 1011 may represent an obligation norm reflecting an obligation to pay by the time a condition expiration threshold is satisfied. If the obligation to pay is failed, the obligation norm associated with the first vertex 1011 may be triggered and the rights norms associated with the second vertex 1012 and the third vertex 1013 may be activated. The second vertex 1012 may represent a rights norm to cure the failure to satisfy the obligations norm represented by the first vertex 1011, and the third vertex 1013 may represent a rights norm to accelerate the payments the smart contract. The directed graph 1010 also includes a pair of vertices 1014-1015 representing future obligations to pay, where exercising the rights norm represented by the third vertex 1013 may cancel the future obligations to pay.

In some embodiments, the state represented by the directed graph 1010 may be advanced to the state represented by the directed graph 1020. In some embodiments, the state represented by the directed graph 1020 may be an outcome state after the norm associated with the second vertex 1012 is triggered. In some embodiments, the norm associated with the second vertex 1012 may represent a right to cure the failure to satisfy the norm condition associated with the first vertex 1011. As indicated by the directed graph 1020, exercising the rights norm associated with the second vertex 1012 may satisfy the norm and activate the vertex 1023, which may indicate that the rights norm associated with the second vertex 1012 has been satisfied.

In some embodiments, the state represented by the directed graph 1010 may be advanced to the state represented by the directed graph 1030. In some embodiments, the state represented by the directed graph 1030 may be an outcome state after the norm associated with the third vertex 1013 is triggered. In some embodiments, the rights norm associated with the third vertex 1013 may represent a right to accelerate payment. Triggering the rights norm associated with the third vertex 1013 may cancel the rights norm associated with the second vertex 1012. In addition, triggering the rights norm associated with the third vertex 1013 may also cancel the obligation norms associated with the vertices 1014-1015. Triggering the rights norm associated with the third vertex 1013 may cause the system to activate a new obligation norm associated with the fourth vertex 1031. In some embodiments, the new obligation norm may include norm conditions to determine whether a first entity transmits a payment amount to the second entity. For example, the new obligation norm may determine whether the first entity transmitted the entirety of a principal payment of a loan to the second entity. The obligation norm associated with the fourth vertex 1031 may be associated to a satisfaction norm represented by a fifth vertex 1041 or a failure norm represented by a sixth vertex 1042.

In some embodiments, advancement of the state represented by the directed graph 1010 to the state represented by the directed graph 1020 or the state represented by the directed graph 1030 may be simulated using a symbolic AI system. For example, the state represented by the directed graph 1010 may be copied into a symbolic AI model, where both the conditional statements associated with the nodes and of the directed graph the edges connecting the nodes of the directed graph may be copied. A symbolic AI system may then simulate state changes using the symbolic AI model to determine an expected value for a smart contract that has already reached the state represented by the directed graph 1010, where the expected value may be a multi-iteration score.

In some embodiments, each of the smart contracts represented by the directed graphs 610, 650, 710, and 1010 may be analyzed using a symbolic AI system to determine one or more multi-protocol scores. For example, each of the smart contracts represented by the directed graphs 610, 650, 710, and 1010 may be analyzed to produce multi-iteration scores such as average scores for each smart contract and a kurtosis value of expected scores. In some embodiments, the analysis may use the same rules to govern the behavior entities in the smart contract by basing the rules on logic types and vertex statuses instead of the contexts of specific agreements. For example, each smart contract simulation may be simulated with a set of rules that include a rule that the probability that a rights norm to cure is triggered instead of a rights norm to accelerate being triggered is equal to 90%. The multi-iteration scores may then be further analyzed to determine a multi-protocol score. For example, based on a multi-iteration score representing a risk score associated with each of the smart contracts, the total exposed risk of a first entity with respect to a second entity may be determined, where the total exposed risk may be a multi-protocol score.

Figure 11:
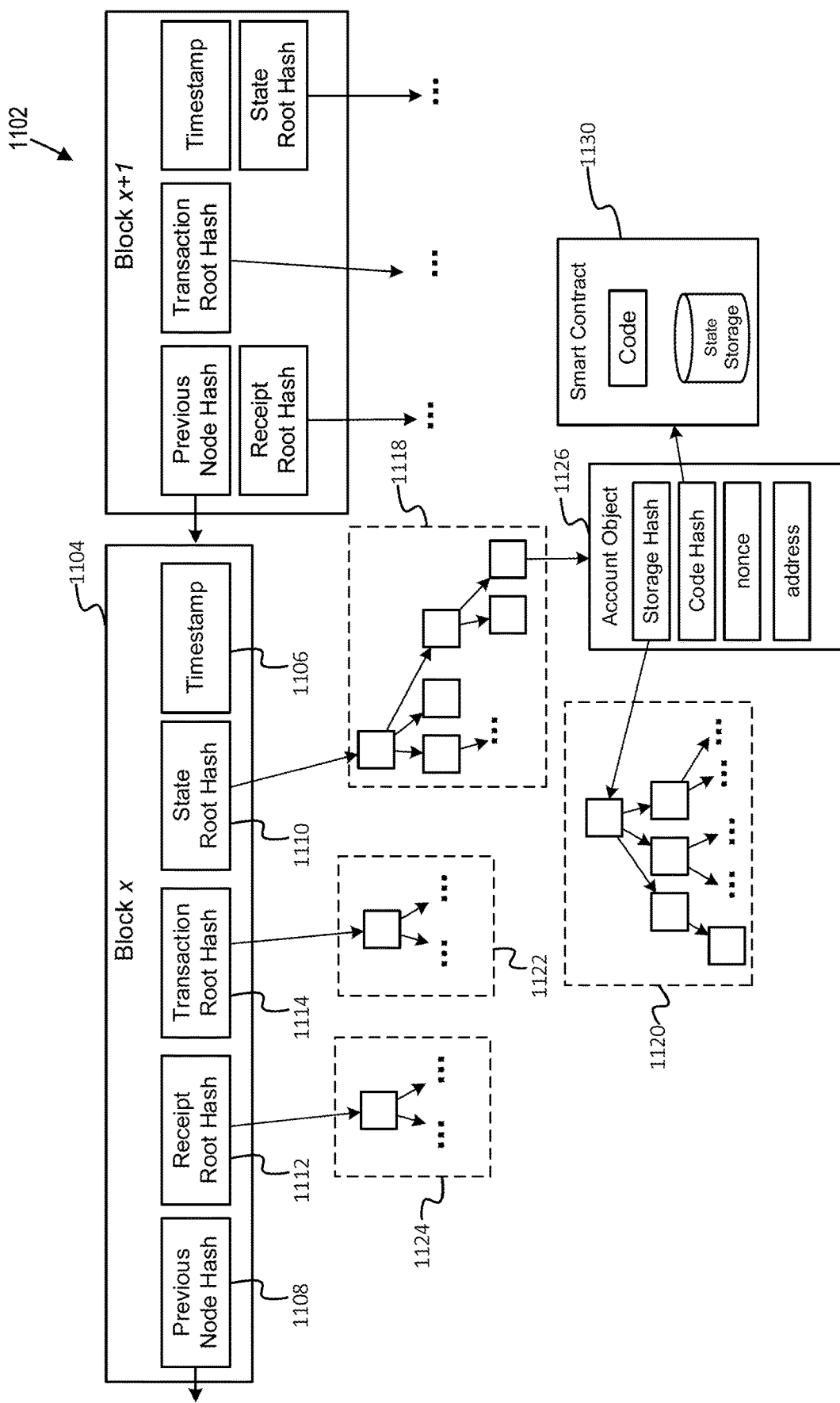
FIG. 11 is a block diagram illustrating an example of a tamper-evident data store that may used to render program state tamper-evident and perform the operations in this disclosure, in accordance with some embodiments of the present techniques.

FIG. 11 is a block diagram illustrating an example of a tamper-evident data store that may used to render program state tamper-evident and perform the operations in this disclosure, in accordance with some embodiments of the present techniques. In some embodiments, the tamper-evident data store may be a distributed ledger, such as a blockchain (or other distributed ledger) of one of the blockchain-based computing platforms described in this disclosure. FIG. 11 depict two blocks in a blockchain, and also depicts tries of cryptographic hash pointers having root hashes stored in the two blocks. The illustrated arrows may represent pointers (e.g., cryptographic hash). For example, the arrow 1103 may represent a pointer from a later block to block 1104 that joints the two blocks together. In some embodiments, blocks may be consecutive. Alternatively, the data from the use of a smart contract may skip several blocks between uses of the smart contract. As shown in FIG. 11, a tamper-evident data store 1102 may include a linked list of blocks that includes the block 1104 and other blocks, where the linked list of blocks may be connected by cryptographic hash pointers.

In some embodiments, a directed acyclic graph of cryptographic hash pointers may be used to represent the tamper-evident data store 1102. Some or all of the nodes of the directed acyclic graph may be used to form a skip list or linked list, such as the node corresponding to or otherwise representing as block 1104. In some embodiments, each block represented by a node of this list may include multiple values as content. For example, each respective block may include a timestamp of creation 1106, a cryptographic hash of content of the previous node pointed to by an edge connecting those nodes 1108, a state root value 1110 for a trie of cryptographic hash values that may be referred to as a state trie 1118, a cryptographic hash 1112 that is a root value of a receipt trie 1124 of cryptographic hash values referred to as a receipt trie, and a cryptographic hash value 1114 that is a root value of a trie of cryptographic hash values referred to as a transaction trie 1122. In some embodiments, the block 1104 may be connected to a plurality of tries (e.g., three or more tries) via cryptographic hash pointers. For example, the block 1104 may be connected to Merkle roots (or other roots) of the plurality of tries of cryptographic hash values.

In some embodiments, the state trie 1118 may include multiple levels of cryptographic hash pointers that expand from a root to leaf nodes through 2 or more (e.g. 3, 11, 5, 6, etc.) hierarchical levels of branching. In some embodiments, an account address of a smart contract or instance of invocation thereof may correspond to a leaf nodes, where the smart contract may be an instance of the smart contract described in one or more operations of one or more processes described in this disclosure. In some embodiments, leaf nodes or paths to the leaf nodes of the state trie 1118 may include the fields in the account object 1126. The address may be a smart contract address or instance of invocation of the smart contract, the nonce value may be a count of the times that the smart contract was invoked, the code hash value may be or otherwise include a cryptographic hash of a bytecode representation of the smart contract 1130, the storage hash may be a root (e.g. Merkle root) of a trie of cryptographic hash pointers 1120. In some embodiments, the trie of cryptographic hash pointers 1120 may store key-value pairs encoding a transient program state of the smart contract that changes or is not needed between invocations of the smart contract. In some embodiments, the fields of the account object 1126 may include a predecessor pointer that points to a previous entry of an earlier state trie corresponding to a previous invocation of the smart contract and associated information or hashes.

Figure 12:
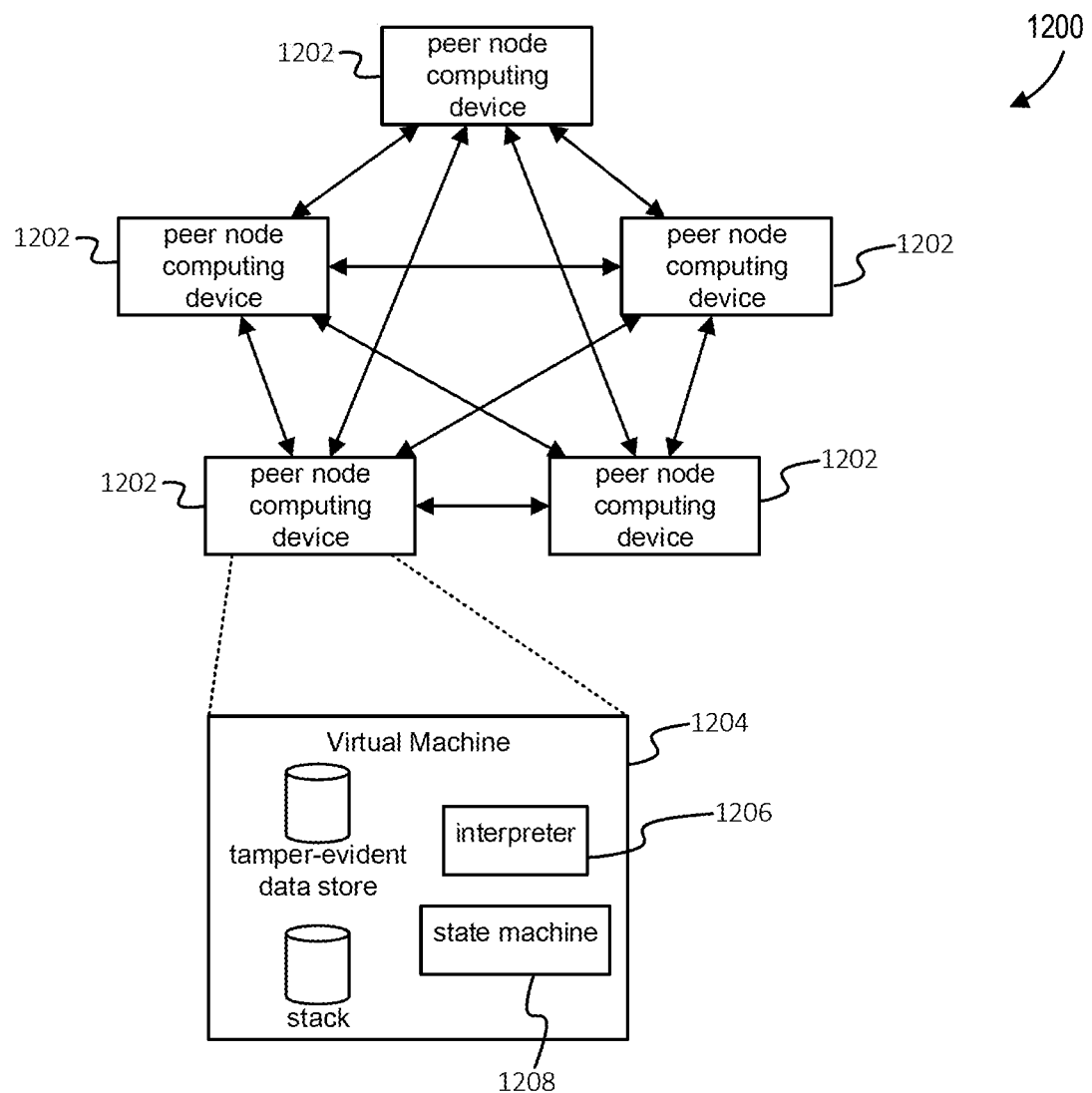
FIG. 12 depicts an example logical and physical architecture of an example of a decentralized computing platform in which a data store of or process of this disclosure may be implemented, in accordance with some embodiments of the present techniques.

FIG. 12 depicts an example logical and physical architecture of an example of a decentralized computing platform in which a data store of or process of this disclosure may be implemented, in accordance with some embodiments of the present techniques. In some embodiments, there may be no centralized authority in full control of a decentralized computing platform 1200. The decentralized computing platform 1200 may be executed by a plurality of different peer computing nodes 1202 via the ad hoc cooperation of the peer computing nodes 1202. In some embodiments, the plurality of different peer computing nodes 1202 may execute on a single computing device, such as on different virtual machines or containers of a single computing device. Alternatively, or in addition, the plurality of different computing nodes 1202 may execute on a plurality of different computing devices, where each computing device may execute one or more of the peer computing nodes 1202. In some embodiments, the decentralized computing platform 1200 may be a permissionless computing platform (e.g., a public computing platform), where a permissionless computing platform allows one or more various entities having access to the program code of the peer node of the permissionless computing platform to participate by using the peer node.

In some embodiments, the decentralized computing platform 1200 may be private, which may allow a peer computing node of the decentralized computing platform 1200 to authenticate itself to the other computing nodes of the decentralized computing platform 1200 by sending a value based on a private cryptographic key, where the private cryptographic key may be associated with a permissioned tenant of the decentralized computing platform 1200. While FIG. 12 shows five peer computing nodes, commercial embodiments may include more computing nodes. For example, the decentralized computing platform 1200 may include more than 10, more than 100, or more than 1000 peer computing nodes. In some embodiments, the decentralized computing platform 1200 may include a plurality of tenants having authentication credentials, wherein a tenant having authentication credentials may allow authorization of its corresponding peer nodes for participation in the decentralized platform 1200. For example, the plurality of tenants may include than 2, more than 12, more than 10, more than 120, more than 100, or more than 1000 tenants. In some embodiments, the peer computing nodes 1202 may be co-located on a single on-premise location (e.g., being executed on a single computing device or at a single data center). Alternatively, the peer computing nodes 1202 may be geographically distributed. For example, the peer computing nodes 1202 may be executing on devices at different data centers or on devices at different sub-locations of an on-premise location. In some embodiments, distinct subsets of the peer nodes 1202 may have distinct permissions and roles. In some cases, some of the peer nodes 1202 may operate to perform the deserialization operations, graph update operations, or reserialization operations as described in this disclosure.

Figure 13:
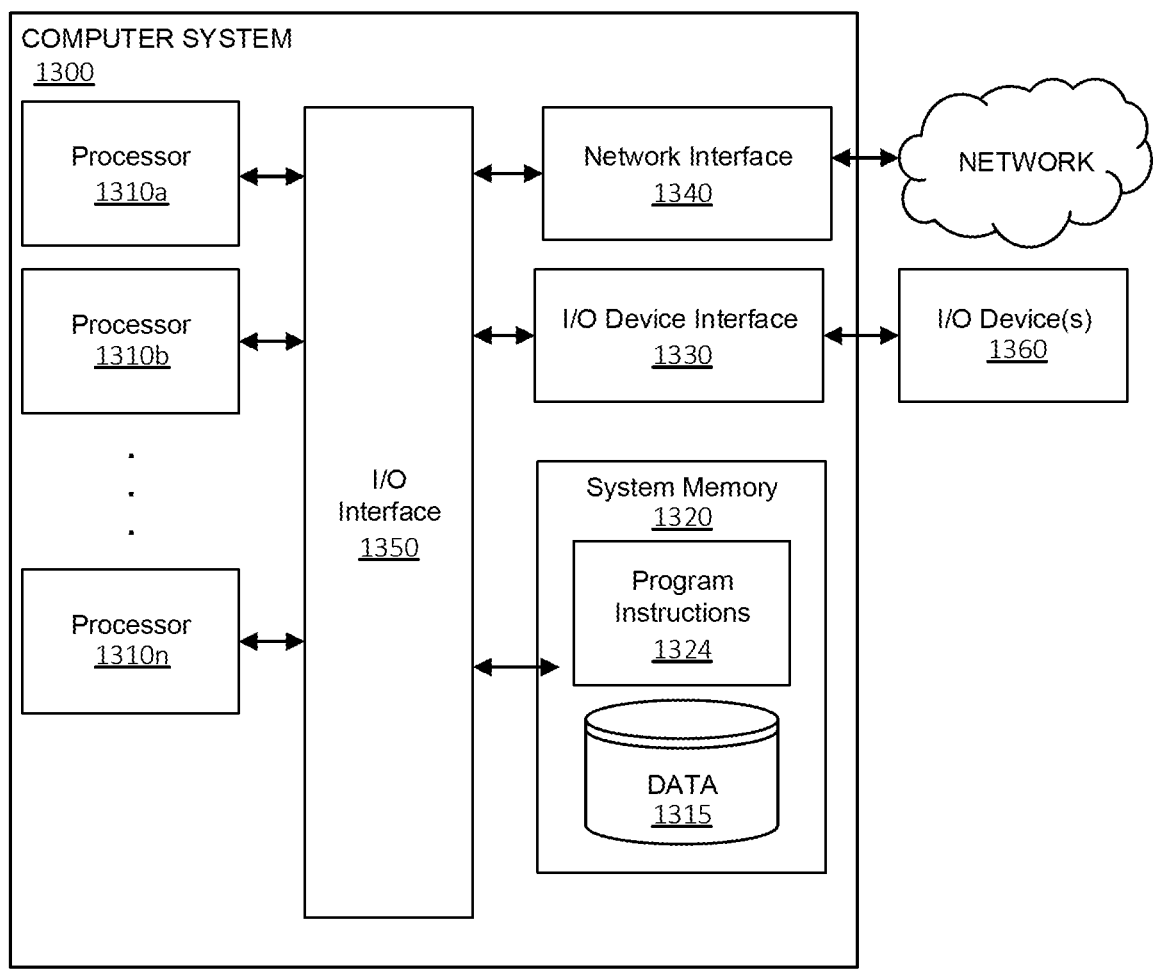
FIG. 13 shows an example of a computer system by which the present techniques may be implemented in accordance with some embodiments.

FIG. 13 shows an example of a computer system by which the present techniques may be implemented in accordance with some embodiments. Various portions of systems and methods described herein, may include or be executed on one or more computer systems similar to computer system 1300. Further, processes (such as those described for FIGS. 1, 3, or other Figures of this disclosure) and modules described herein may be executed by one or more processing systems similar to that of computer system 1300.

Computer system 1300 may include one or more processors (e.g., processors 1310a-1310n) coupled to System memory 1320, an input/output I/O device interface 1330, and a network interface 1340 via an input/output (I/O) interface 1350. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 1300. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may include one or more microcontrollers. A processor may receive instructions and data from a memory (e.g., System memory 1320). Computer system 1300 may be a uni-processor system including one processor (e.g., processor 1310a), or a multi-processor system including any number of suitable processors (e.g., 1310a-1310n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 1300 may include a plurality of computing devices (e.g., distributed computer systems) to implement various processing functions.

I/O device interface 1330 may provide an interface for connection of one or more I/O devices 1360 to computer system 1300. I/O devices may include devices that receive input (e.g., from a user) or output information (e.g., to a user). I/O devices 1360 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1360 may be connected to computer system 1300 through a wired or wireless connection. I/O devices 1360 may be connected to computer system 1300 from a remote location. I/O devices 1360 located on remote computer system, for example, may be connected to computer system 1300 via a network and network interface 1340.

Network interface 1340 may include a network adapter that provides for connection of computer system 1300 to a network. Network interface 1340 may facilitate data exchange between computer system 1300 and other devices connected to the network. Network interface 1340 may support wired or wireless communication. The network may include an electronic communication network, such as the Internet, a local area network (LAN), a wide area network (WAN), a cellular communications network, or the like.

System memory 1320 may be configured to store program instructions 1324 or data 1315. Program instructions 1324 may be executable by a processor (e.g., one or more of processors 1310a-1310n) to implement one or more embodiments of the present techniques. Program instructions 1324 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1320 may include a tangible program carrier having program instructions stored thereon. A tangible program carrier may include a non-transitory, computer-readable storage medium. A non-transitory, computer-readable storage medium may include a machine readable storage device, a machine readable storage substrate, a memory device, or any combination thereof. Non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1320 may include a non-transitory, computer-readable storage medium that may have program instructions stored thereon that are executable by a computer processor (e.g., one or more of processors 1310a-1310n) to cause the subject matter and the functional operations described herein. A memory (e.g., System memory 1320) may include a single memory device and/or a plurality of memory devices (e.g., distributed memory devices). Instructions or other program code to provide the functionality described herein may be stored on a tangible, non-transitory, computer-readable media. In some cases, the entire set of instructions may be stored concurrently on the media, or in some cases, different parts of the instructions may be stored on the same media at different times.

I/O interface 1350 may be configured to coordinate I/O traffic between processors 1310a-1310n, System memory 1320, network interface 1340, I/O devices 1360, and/or other peripheral devices. I/O interface 1350 may perform protocol, timing, or other data transformations to convert data signals from one component (e.g., System memory 1320) into a format suitable for use by another component (e.g., processors 1310a-1310n). I/O interface 1350 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1300 or multiple computer systems 1300 configured to host different portions or instances of embodiments. Multiple computer systems 1300 may provide for parallel or sequential processing/execution of one or more portions of the techniques described herein.

Those skilled in the art will appreciate that computer system 1300 is merely illustrative and is not intended to limit the scope of the techniques described herein. Computer system 1300 may include any combination of devices or software that may perform or otherwise provide for the performance of the techniques described herein. For example, computer system 1300 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a GPS device, or the like. Computer system 1300 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described in this disclosure. In some embodiments, instructions stored on a computer-accessible medium separate from computer system 1300 may be transmitted to computer system 1300 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In some embodiments, additional operations may be performed to determine outcome scores, determine counterparty actions, update a directed graph, or retrieve data from a directed graph. Some embodiments may perform such operations or other operations using methods or systems described in the co-pending PCT application PCT/US2020/049755 titled "GRAPH-MANIPULATION BASED DOMAIN-SPECIFIC EXECUTION ENVIRONMENT," PCT application PCT/US2020/049757 titled "GRAPH OUTCOME DETERMINATION IN DOMAIN-SPECIFIC EXECUTION ENVIRONMENT," PCT application PCT/US2020/049777 titled "MODIFICATION OF IN-EXECUTION SMART CONTRACT PROGRAMS," and PCT application PCT/US2020/049776 titled "GRAPH EVOLUTION AND OUTCOME DETERMINATION FOR GRAPH-DEFINED PROGRAM STATES," which were filed on 2020 Sep. 8 and assigned to the applicant, "Digital Asset Capital, Inc.," and which are herein incorporated by reference. Some embodiments may further perform operations such as scoring entities, using hybrid systems to efficiently query data, determine outcome data based on an event with respect to multiple directed graphs. Some embodiments may perform such operations or other operations using methods or systems described in the co-pending US patent application 17/015,071 titled "EVENT-BASED ENTITY SCORING IN DISTRIBUTED SYSTEMS," US patent application 17/015,073 titled "CONFIDENTIAL GOVERNANCE VERIFICATION FOR GRAPH-BASED SYSTEM," US patent application 17/015,038 titled "HYBRID DECENTRALIZED COMPUTING ENVIRONMENT FOR GRAPH-BASED EXECUTION ENVIRONMENT," and US patent application 17/015,042 titled "MULTIGRAPH VERIFICATION," which were filed on 2020 Sep. 8, and are assigned to the applicant, "Digital Asset Capital, Inc.," and which are herein incorporated by reference. Some embodiments may perform operations such as dimensionally reducing graph data, querying a data structure to obtain data associated with a directed graph, perform transfer learning operations, or efficiently notify entities. Some embodiments may perform such operations or other operations using methods or systems described in the co-pending US patent application 17/015,069 "GRAPH-BASED PROGRAM STATE NOTIFICATION," US patent application 17/015,065 titled "DIMENSIONAL REDUCTION OF CATEGORIZED DIRECTED GRAPHS," and US patent application 17/015,074 titled "ADAPTIVE PARAMETER TRANSFER FOR LEARNING MODELS," which were filed on 2020 Sep. 8, and are assigned to the applicant, "Digital Asset Capital, Inc.," and which are herein incorporated by reference.

As described above, some embodiments may predict an outcome score based on program state data. In addition to obtaining a score associated with an entity, some embodiments may determine other information associated with an entity or events caused by entities using one or more querying operations. Some embodiments may perform operations, such as those described further below, to use a hybrid computing environment to query or process query results with greater efficiency.

Hybrid Decentralized Computing Environment for Graph-Based Execution Environment The use of applications executing on a decentralized computing platform or decentralized, tamper-evident data stores in real-world situations poses technical challenges in areas such as information retrieval speed, analytical capabilities, and data privacy. Such problems may include memory storage issues, speed bottlenecks on data transfer, data update operations, or difficulties in processing complex operations in a distributed computing environment. For example, a query message encoding a graph portion template may require a non-serialized directed graph to match a graph portion with the graph portion template or to satisfy the query otherwise. The deserialization and reserialization operations may cause time delays that last longer than minutes or tens of minutes or cause computing devices to perform redundant computations. Such delays may make real-world operations unmanageable when multiple queries are being concurrently executed in a distributed computing environment. In addition, multi-participant applications executing on a decentralized computing platform may include access permission mechanisms on the type of information accessible to different types of entities. Such access permission mechanisms may often exacerbate the difficulty querying an application executing on a decentralized computing platform.

Some embodiments may use a hybrid computing system capable of concurrently and independently executing operations that change program state for an application executing on a decentralized computing platform and executing query logic to retrieve or update data associated with program state for the application. For example, some embodiments may execute query logic that updates a database entry associated with program state for the application, where the database entry includes a historical record of a transaction that had updated program state. A hybrid computing system may include a set of public peer node computing devices and a set of privately-controlled peer node computing devices to execute one or more operations or applications. For example, a hybrid computing system may include a set of computing devices acting as nodes of a decentralized computing platform capable of executing an application based on events caused by a set of participating entities. The hybrid computing system may also store program state encoding a directed graph on a decentralized, tamper-evident data store. Some embodiments may include operations to serialize the directed graph for storage in a persistent storage of a set of computing devices acting as nodes of a network used to operate a decentralized computing platform.

In addition, the hybrid computing system may include a second data store accessible to one or more computing devices of the network of computing devices. As discussed further below, the second data store may include a local persistent storage of a computing device, a persistent storage of a cloud computing server, a persistent storage of a second decentralized, tamper-evident data store, or the like. In some embodiments, the use of the second data store may increase efficiency when executing query logic to retrieve, analyze, or update historical versions of directed graphs or other data associated with a previous or current program state for an application executing on a decentralized computing platform. Some embodiments may deserialize a directed graph at a second computing device to generate a second instance of the directed graph in a non-serialized format, such as one of the non-serialized formats of a directed graph as described above. Some embodiments may store the second instance of the directed graph with associated data in a second persistent storage accessible to the second computing device. Upon receipt of a message, some embodiments may retrieve, analyze, or otherwise use values stored in the second persistent storage to provide a response value.

In some embodiments, the message to retrieve, analyze, or update values associated with a directed graph may include data specifying specific graph portions such as a graph portion template that includes labels specific to vertices of the directed graph. Some embodiments may match graph portions of a directed graph to the graph portion template to determine a subset of vertices relevant to or otherwise targeted by a message to determine the response value. As further discussed in this disclosure, the response value may be based on the subset of vertices, such as data encoded in the conditional statements of the subset of vertices, events associated with a subset of vertices, a count associated with the subset of vertices, or the like. For example, some embodiments may determine a specific change in a transaction score associated with a vertex, a timestamp indicating when a vertex of the subset of vertices was triggered, a computational result based on data associated with events causing the activation or the triggering of the subset of vertices, or the like. By separating application execution logic and query logic, a hybrid decentralized computing system may provide the transaction stability and trustworthiness of a blockchain system with the speed and analytical capabilities of systems based on data stored in a centralized data store. While some embodiments may be disclosed as including a specified feature or performing a specified operation, some embodiments may enjoy disclosed benefits without including the specified feature or without performing the specified operation.

In some embodiments, a message may include or otherwise be associated with an entity identifier useful for determining whether a set of data retrieval criteria associated with the subset of vertices or their corresponding entities is satisfied. For example, a first entity may not permit certain entities or only permitted certain entities to retrieve data associated with the first entity. In some embodiments, a response value may be modified or stopped from being sent if one or more data retrieval criteria are not satisfied by the message. By using graph vertex-level granularity to determine which criteria of a set of data retrieval criterion are applicable, the analytical capabilities of a hybrid computing system may be largely preserved while maintaining strong data privacy protection for participating entities of a technology-based self-executing protocols (e.g., a smart contract) or other symbolic AI applications.

Figure 14:
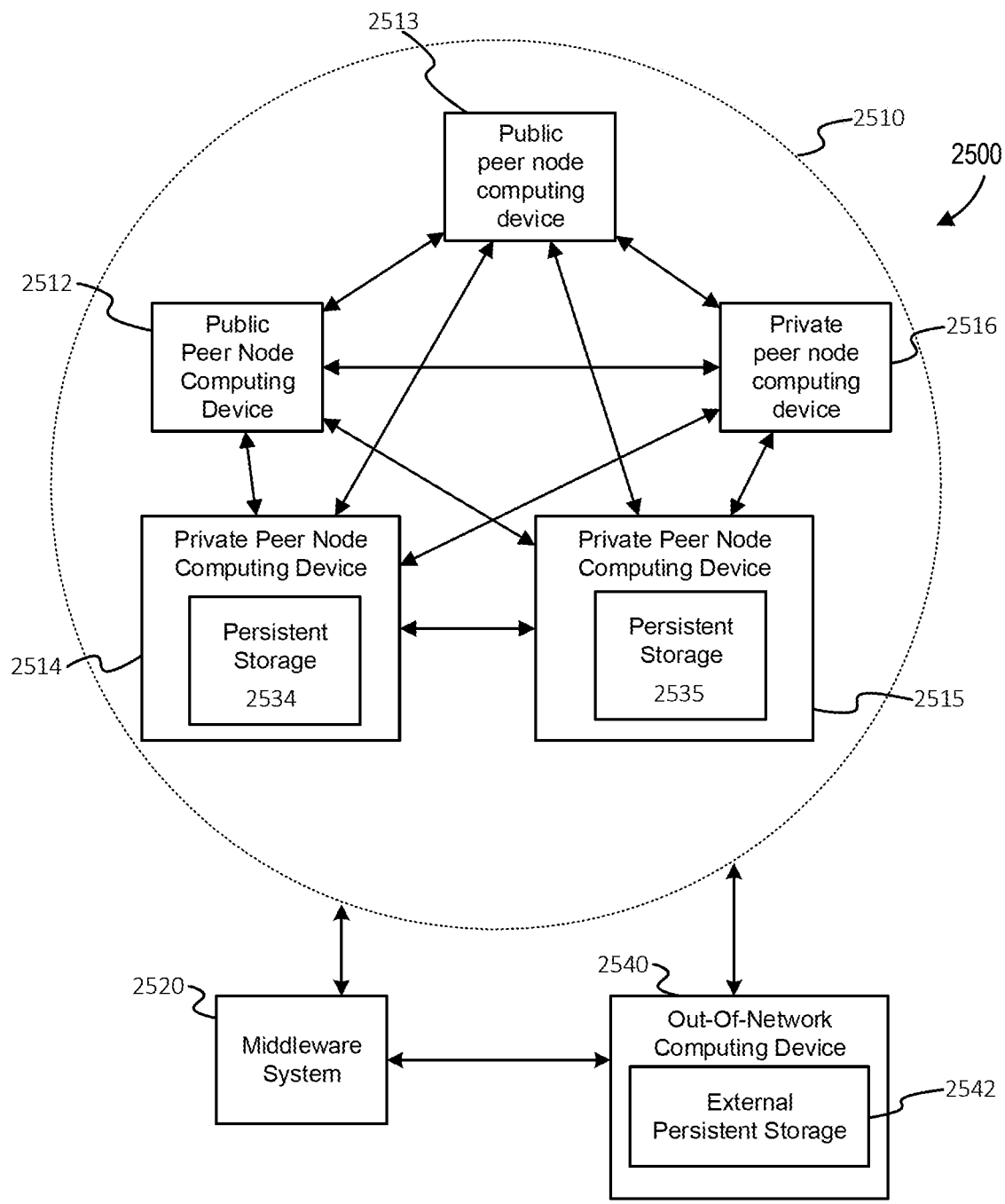
FIG. 14 depicts a diagram of a hybrid decentralized computing system usable for separating application execution logic from query logic, in accordance with some embodiments of the present techniques.

FIG. 14 depicts a diagram of a hybrid decentralized computing system usable for separating application execution logic from query logic, in accordance with some embodiments of the present techniques. The computing environment 2500 may include a hybrid network 2510, where the hybrid network 2510 includes a set of public peer node computing devices 2512 and a set of privately-controlled peer node computing devices 2514-2516. As shown in the hybrid network 2510, the first private peer node computing device 2514 may include a first persistent storage 2534 and the second private peer node computing device 2515 may include a second persistent storage 2535. In some embodiments, the first persistent storage 2534, second persistent storage 2535 or other persistent storage devices of the hybrid network 2510 may include one or more physical components usable as persistent storage. For example, a persistent storage may include a set of solid-state drives, a set of spinning disk hard drives, or the like.

In some embodiments, data based on program state for an application executing on a decentralized computing platform, records of a blockchain (e.g., blocks linked by cryptographic hashes), or other values may be distributed between one or more nodes of the hybrid network 2510. As discussed in this disclosure, program state for an application may include a directed graph, where it should be understood that data in a program state need not be labeled as a graph in program state or program code to constitute as one. Some embodiments may determine that a directed graph is present in program code if one or more characteristics of a directed graph are present in the program code. In some embodiments, characteristics of a directed graph may include having a set of values representing vertices (e.g., numbers, characters, strings, or the like) and directions between the set of vertices. For example, a graph encoded in program state may include a set of arrays, entries in a relational database, objects in an object-oriented programming, or the like.

In some embodiments, program state may be distributed from the public peer node computing device 2512 to other nodes of the hybrid network 2510, such as the first private peer node computing device 2514, and stored in the first persistent storage 2534. Alternatively, or in addition, program state may be distributed from the private peer node computing device 2514 to other nodes of the hybrid network 2510, such as the second private peer node computing device 2515 and stored in the second persistent storage 2535. In some embodiments, different instances of data may be stored in a same persistent storage. For example, the second persistent storage 2535 may include a first instance of the directed graph stored in a serialized data format that is distributed to other nodes of the hybrid network 2510. The second persistent storage 2535 may also include a second instance of the directed graph stored in a non-serialized data format that is used for other computing operations such as data retrieval or data analysis.

In some embodiments, each of the set of private peer node computing devices 2514-2516 may be controlled by or otherwise associated with a different entity and not controllable by other entities. For example, the first private peer node computing device 2514 may be associated with a first entity or be an on-premise server of a first organization, and the second private peer node computing device 2515 may be associated with a second entity or be an on-premise server of a second organization. Furthermore, each device of the set of public peer node computing devices 2512-2513 may be operating as nodes having different permission levels or roles in an implementation of a consensus algorithm, as described further below. For example, the public peer node computing device 2512 may serve as an observer and validator of blocks without the ability to generate new blocks of a blockchain operating on the hybrid network 2510.

In some embodiments, the set of private peer node computing devices 2514-2516 may be able to perform operations that nodes of the set of public peer node computing devices 2512 may not be permitted to perform. Alternatively, or in addition, the set of public peer node computing devices 2512-2513 may be able to perform operations that nodes of the private peer node computing devices 2514-2516 may not be permitted to perform. Some embodiments may update program state for an instance of an application executing on a decentralized computing platform or otherwise update data stored in a first decentralized, tamper-evident data store (e.g., a peer-to-peer data-sharing network) of the application. As used in this disclosure, it should be understood that executing an application on a decentralized computing platform may include executing an instance of the application on a computing device of the decentralized computing platform. Some embodiments may operate across the hybrid network 2510 using the set of public peer node computing devices 2512-2513 and the set of private peer node computing devices 2514-2516. For example, the first decentralized, tamper-evident data store may be used to store a blockchain, where both the set of private peer node computing devices 2514-2516 and the set of public peer node computing devices 2512-2513 may be used to verify the updates to the first decentralized, tamper-evident data store. Some embodiments assign different roles to different subsets of computing devices in a network of computing devices based on various blockchain architectures, such as that used for the Ethereum Delegated Proof of Stake (DPoS) system, Facebook Libra blockchain system, or the like.

In some embodiments, data may be provided to the hybrid network 2510 via a middleware system 2520. The middleware system 2520 may include various middleware systems or services. In some embodiments, the middleware system 2520 may include a centralized oracle system, such as a custom-built subsystem that includes an API of an application executing on a decentralized computing platform to receive data at a node of a network. For example, in some embodiments, external data such as a price, indicator of equipment failure, or environmental parameter change may be provided to the hybrid network 2510 to an API of an application executing on a decentralized computing platform operating across the hybrid network 2510. The external data may be directly received and validated at the first private peer node computing device 2514 before being distributed to other computing devices of the hybrid network 2510. In some embodiments, the middleware system 2520 may include a decentralized oracle network, such as the ChainLink network as described by "ChainLink: A Decentralized Oracle Network" (Ellis, Steve; Juels, Ari; and Nazarov, Sergey; Published 4 Sep. 2017), which is hereby incorporated by reference. For example, some embodiments may use a decentralized oracle network to obtain data from a cloud data warehouse such as Google BigQuery and use the data to update program state for an application executing on the hybrid network 2510. As further described below, in some embodiments, an out-of-network computing device 2540 may send data to the middleware system 2520 to update a system or may receive data from the middleware system 2520.

Alternatively, or in addition, data based on program state, such as an instance of a directed graph indicating state for a smart contract, may be stored in the external persistent storage 2542 of the out-of-network computing device 2540. In some embodiments, the out-of-network computing device 2540 may include an enterprise server that is accessible to one or more computing devices of the hybrid network 2510. For example, the external persistent storage 2542 may be accessible to the hybrid network 2510. Alternatively, or in addition, the out-of-network computing device 2540 may include a cloud server or a component of a cloud server. For example, out-of-network computing device 2540 may include a cloud computing server allocated for use as a part of a cloud computing service such as Amazon AWS server, Microsoft Azure server, Google cloud platform server, or the like. Alternatively, or in addition, the out-of-network computing device 2540 may be operating as a peer node of a second decentralized, tamper-evident data store. For example, the second decentralized, tamper-evident data store may include a network operating under the Interplanetary File System (IPFS) protocol, Swarm protocol, or the like. For example, some embodiments may store a directed graph in a non-serialized format in a persistent storage of a computing device participating in a network operating under the IPFS protocol. Data stored in a peer-to-peer data-sharing network may be distributed to other peers of the data-sharing network, which may increase the security, verifiability, and resiliency to failure of data stored in the external persistent storage 2542. Furthermore, in some embodiments, a computing device may operate as a node of a first network used to execute an application and may also operate as a node of a second network used to operate the second decentralized, tamper-evident data store, where the first network and second network may use different sets of computing devices.

In some embodiments, a message may be received by a computing device of the hybrid network 2510, the middleware system 2520, or the out-of-network computing device 2540 to obtain a response value based on an instance of a directed graph stored in a persistent storage accessible to the hybrid network 2510. Some embodiments may select a non-serialized instance of the directed graph stored in a persistent storage, such as the second persistent storage 2535 or the external persistent storage 2542, to determine the response value based on the directed graph. For example, the message may cause some embodiments to obtain a set of timestamps associated with vertices of the directed graph stored in the second persistent storage 2535 and use the data to compute a response value.

Figure 15:
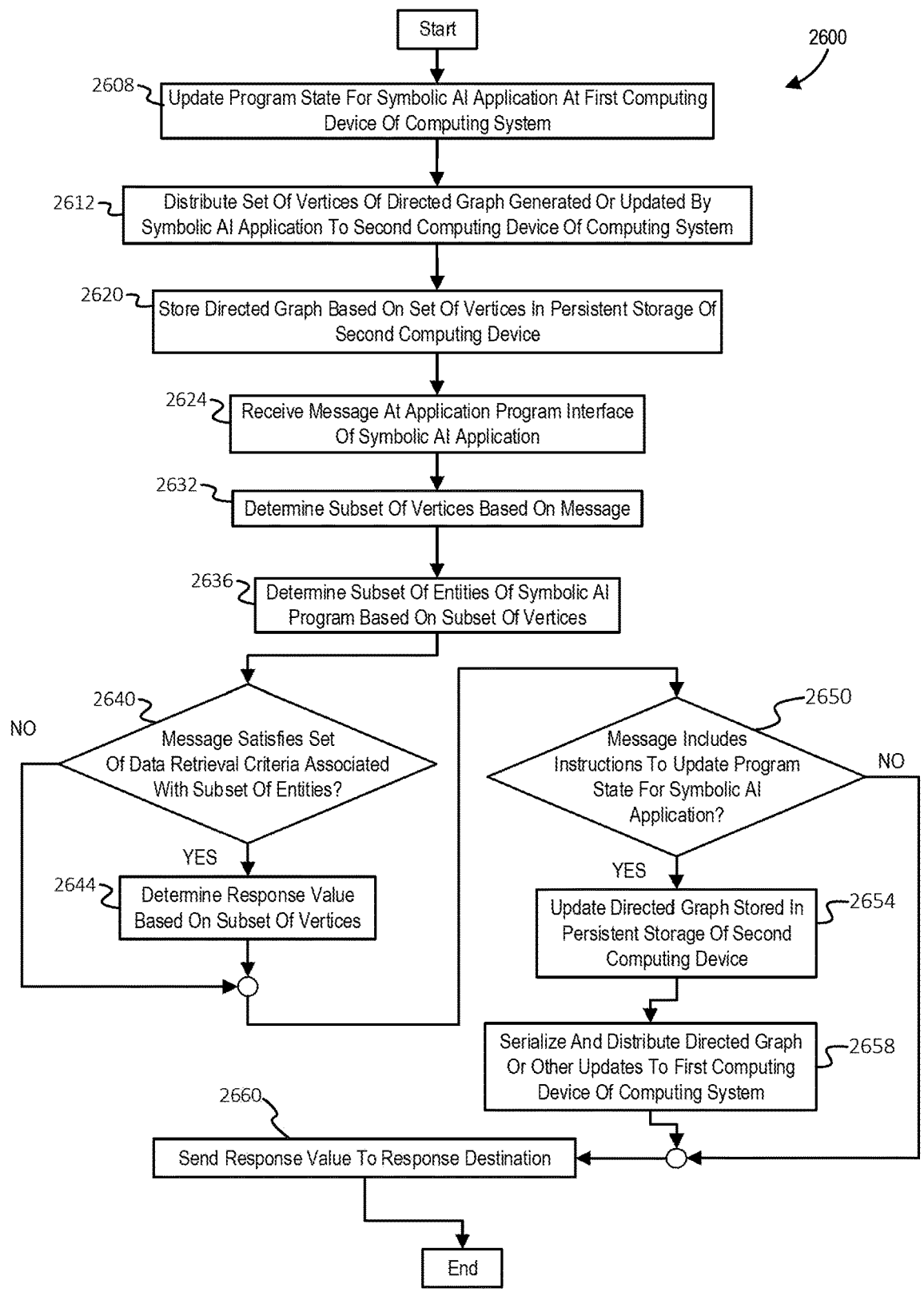
FIG. 15 depicts a flowchart of a process to retrieve a response value from a hybrid decentralized computing system based on a message, in accordance with some embodiments of the present techniques.

FIG. 15 depicts a flowchart of a process to retrieve a response value from a hybrid decentralized computing system based on a message, in accordance with some embodiments of the present techniques. FIG. 26 is a flowchart of processes that may be implemented in the computing environment of FIG. 25 to provide a response value, in accordance with some embodiments. For example, the process may execute one or more routines in the computing environment 2500. In some embodiments, the various operations of the process 2600 may be executed in a different order, operations may be omitted, operations may be replicated, additional operations may be included, some operations may be performed concurrently, some operations may be performed sequentially, and multiple instances of the process 2600 may be executed concurrently, none of which is to suggest that any other description herein is limited to the arrangement described. In some embodiments, the operations of the process 2600 may be effectuated by executing program code stored in one or more instances of a machine-readable non-transitory medium, which in some cases may include storing different subsets of the instructions on different physical embodiments of the medium and executing those different subsets with different processors, an arrangement that is consistent with use of the singular term "medium" herein.

In some embodiments, the process 2600 may include operations to update program state for a symbolic AI application at a first computing device of a computing system, as indicated for block 2608. The first computing device may operate as a node of a network operating executing a smart contract or other symbolic AI application. In some embodiments, the network may communicatively couple some or all of the nodes of the network to each other. For example, the first computing device may update a directed graph encoded in the form of a set of data tables by appending a value to a set of values representing vertices of the directed graph or changing the status of a vertex from "not triggerable" to "triggerable."

In some embodiments, the directed graph may be updated in a non-persistent storage and serialized into a serialized data format as a serialized set of vertices. For example, the directed graph may include a set of vertices and a set of directed graph edges associating pairs of the set of vertices together by including a serialized array, such as the array "[[1,2], [2,3], [3,4]]." As discussed in this disclosure, the directionality indicated by a graph edge may be used to determine which norm vertex is activated (i.e. set to be triggerable) after another norm vertex has been triggered. For example, a directed graph edge may point from a tail vertex to a head vertex. The directionality of the edge may indicate that the conditional statement of the head vertex is set to be triggerable when the conditional statement of the tail vertex has been satisfied or failed. (though this directionality may be arbitrary. Some embodiments may then store the serialized set of vertices in a first persistent storage of the first computing device. The first persistent storage may include a spinning disk hard drive, a solid-state drive, or the like. For example, some embodiments may store the serialized set of vertices in a solid-state drive of the first computing device. In some embodiments, the first persistent storage may be physically attached to other components of the first computing device or be in communication with a processor of the first computing device via a serial or parallel bus.

In some embodiments, the process 2600 may include operations to distribute a set of vertices of a directed graph generated or updated by the symbolic AI application to a second computing device of the computing system, as indicated by block 2612. In some embodiments, the first computing device may distribute data from a program state for a smart contract or other symbolic AI application to a second computing device. In some embodiments, the data may include a serialized set of vertices using a first distributed, tamper-evident data store. For example, the first computing device may be operated as a node of a decentralized computing platform and may update a first distributed, tamper-evident data store with the set of vertices. The second computing device may also be operated as a second node of the decentralized computing platform and obtain the set of vertices from the first distributed, tamper-evident data store.

Some embodiments may use one or more consensus algorithms to reach a consensus regarding a computational result, where the computational result may indicate the validity of a blockchain block (or other record of a decentralized, tamper-evident data store) to communicate, store, or distribute data. Some embodiments may use one or more consensus algorithms to verify or reject a result, such as proof of work consensus algorithm, proof of stake consensus algorithm, proof of burn consensus algorithm, proof of capacity consensus algorithm, proof of elapsed time consensus algorithm, proof of formulation consensus algorithm, or the like. In some embodiments, different sets of nodes may be assigned different roles to fulfill the function of a consensus algorithm.

In some embodiments, each node of a network may be assigned the same role with respect to result generation or validation. Alternatively, in some embodiments, a subset of nodes of a network may be selected to have the authority to perform operations such as generating a blockchain record, validating a blockchain record, modifying a program state of an application, approving transactions, or the like, where other nodes of the network do not have this authority. For example, a subset of nodes may have the authority to validate a transaction, modify program state, or otherwise administer one or more aspects of smart contract operations in a decentralized computing platform.

In some embodiments, the selection of the subset of nodes may be pre-determined or otherwise controlled by a central authority. For example, nodes of a subset of nodes may be pre-determined during an initial set-up of a decentralized computing platform or during a subsequent configuration of the decentralized computing platform by a network administrator. Alternatively, some embodiments may use a consensus voting process such as that used for an implementation of the DPoS algorithm across a plurality of computing devices in a network of computing devices. In a consensus voting process, nodes of a network may vote on a subset of nodes as delegate nodes that will generate or validate results, such as results used to generate new blocks of a blockchain. For example, a second node voted by the node network to act as a delegate node may generate a first new block and, at a later time, validate a second new block generated by another delegate node. Alternatively, a first node that was not voted as a delegate node by a node network may generate a new block, and a second node voted by the node network to act as a delegate node may provide validation for the new block. Various voting schemes may be implemented, such as a weighting votes based on stakes provided by each respective node, probabilistically selecting votes based on a score value assigned to each respective node, or the like.

In some embodiments, operations of the process 2600 may include storing a directed graph based on the set of vertices in a persistent storage of the second computing device, as indicated by block 2620. In some embodiments, a persistent storage of the second computing device may be a local memory storage attached to the second computing device, usable by the second computing device, or otherwise accessible to the second computing device via instructions provided by the second computing device. For example, if the second computing device is the second private peer node computing device 2515, the persistent storage used to store the directed graph instance may include the second persistent storage 2535. Alternatively, or in addition, the persistent storage of the second computing device may include a persistent storage of an external centralized computing system, such as the external persistent storage 2542 of the out-of-network computing device 2540. Alternatively, or in addition, the persistent storage of the second computing device may include a persistent storage used for a distributed, tamper-evident data store. For example, the second computing device may store the directed graph in a distributed, tamper-evident data store such as an IPFS system, Blockstack system, Swarm system, or the like. By storing data in a distributed, tamper-evident data store, some embodiments may increase the visible security of a history of transactions reflected by or otherwise associated with the directed graph.

In some embodiments, the directed graph or other data based on program state for an application executing on a decentralized computing platform may be stored in a record of a data structure such as a relational database. For example, some embodiments may store a directed graph in a database responsive to commands provided in a structured query language (SQL). Alternatively, or in addition, a directed graph or other data based on program state may be stored in a data structure such as a non-relational database (i.e., NoSQL database). For example, some embodiments may store a sequence of values representing a directed graph in a NoSQL database such as MongoDB, Cassandra, Coachbase, HBase, Redis, Hadoop database, Neo4j, or the like. Alternatively, or in addition, the directed graph or other data based on program state for an application may be stored in other data structures. For example, some embodiments may store an instance of the directed graph as a property of an object, value(s) in program state for a second application, a memory image, a tree data structure, a JSON document, or the like.

In some embodiments, an instance of the directed graph may be stored in association with other values, such as values based on events associated with the directed graph. For example, some embodiments may store a set of objects or arrays representing an instance of a directed graph in a record of a database on a persistent storage. In addition, some embodiments may determine that an event caused a program state change for an application and resulted in the transition to a new state of a directed graph from a previous state. In response, some embodiments may store event data associated with the state-updating event in association with an instance of the directed graph indicating the new state. For example, some embodiments may update a record storing directed graph data by storing an event message indicating the occurrence of a state-updating event, a timestamp representing the time at which the event occurred, values parsed from the event message, or the like.

Some embodiments may track the progression of a smart contract directed graph via a historical sequence of records or other sets of values useful for generating a sequence of versions for a version-control system. Some embodiments may update a historical sequence of records by adding a new entry to the historical sequence of records when a change to the smart contract directed graph occurs. For example, some embodiments may determine that a smart contract directed graph has been changed based on a comparison with a previous smart contract directed graph. In response, some embodiments may add another record to a historical sequence of records corresponding to the smart contract directed graph. In some embodiments, the historical sequence of records may include data that is not stored in the smart contract directed graph or may include summarizations of changes to a smart contract directed graph across an interval of time or a set of changes. Some embodiments may store a smart contract directed graph by storing an update to the smart contract directed graph from a previous version of the smart contract directed graph. Furthermore, some embodiments may store data related to a change in the program state of an application. For example, some embodiments may store a score change in a historical sequence of records, where the score change is associated with an event that caused a program state change in an application program state. Alternatively, or in addition, some embodiments may store entity identifiers of the entities associated with a graph-updating event in a historical sequence of records.

Some embodiments may crawl through a set of blocks of a blockchain stored on a decentralized, tamper-evident data store to track a history of a directed graph and determine a sequence of previous versions of the directed. For example, some embodiments may crawl through a sequence of blocks in a blockchain sequence to determine a sequence of program states and their associated versions of a directed graph. Some embodiments may use a block crawling operation to track the evolution of a directed graph through the sequence of blocks from a starting point to a particular time, a particular state of the directed graph, a terminal program state, or the like. As discussed elsewhere in this disclosure, the program state history of an application or the history of a corresponding directed graph may be used as training inputs to determine prediction model parameters. These prediction model parameters may then be used by a prediction model to predict future entity behavior. Furthermore, some embodiments may use a block-crawling operation to provide a means of using one or more operations of this disclosure after an application had already started executing on a decentralized, tamper-evident data store.

In some embodiments, one or more natural language documents may be stored in the second persistent storage in association with the directed graph. A natural language document may include a text document written a human-interpretable language such as English, Spanish, French, Mandarin Chinese, Japanese, Korean, or the like. For example, a smart contract application may be associated with a natural language contract usable to explain terminology, contract operations, or the like. Some embodiments may store a text file of the natural language document in a first record of a database stored on the second persistent storage, where the first record may also store an instance of the directed graph.

In some embodiments, one or more prediction results using one or more operations described in this disclosure may be stored in association with a directed graph in persistent storage. For example, some embodiments may use a machine learning system to determine a predicted directed graph based on a current directed graph and a set of predicted future environmental parameters. The predicted directed graph or another prediction result (e.g., a cumulative score change) may be stored in a persistent storage in association with the directed graph. For example, a predicted directed graph may be stored in the same database record as a first directed graph, where the first directed graph was used as an input to generate the predicted directed graph.

In some embodiments, operations of the process 2600 may include receiving a message at an API of the symbolic AI application, as indicated by block 2624. In some embodiments, the message may be sent by an entity in the set of entities associated with a smart contract or other symbolic AI application. For example, a message sent to a smart contract API may include a query that includes a hashed passkey of a first entity listed as an entity participating in the smart contract. As further discussed below, different entities may be provided with different permissions that allow the respective entity to access different amounts of data or be provided with different types of results based on the data.

In some embodiments, the message may encode a graph portion template as a part of a query. In some embodiments, the graph portion template may represent elements of a graph or labels associated with the graph and may be encoded as a set of strings, characters, numbers, or the like. For example, the message may encode the graph portion template in the two of arrays "[R, O, P]" and "[[0,1],[02]]," where the first array indicates a set of category labels from a set of mutually exclusive category labels for a corresponding set of three vertex templates and the second array indicates a set of edge templates. In some embodiments, the use of category labels selected from a set of mutually exclusive category labels may increase the efficiency of determining matches between a graph portion of a directed graph and a graph portion template and reduce the possibility of a mismatch between a graph portion and a graph portion template.

A graph portion template may be matched with a portion of a directed graph, where a graph portion template may be matched with an entire graph or be matched with a portion of the graph that has fewer vertices or edges than the entire graph. For example, a vertex template may include a vertex that can be matched to a target vertex sharing a category label with the vertex template if the neighboring vertices of the vertex template also share labels with the neighboring vertices of the target vertex. Similarly, an edge template may include an edge that indicates a connection directed from a first vertex template to a second vertex template and may be matched to an edge of the directed graph based on their corresponding vertex templates and edge template direction matching with the vertices an edge direction of the directed graph. For example, the graph portion template in the two of arrays "[R, O, P]" and "[[0,1],[02]]" may the matched to a portion of the directed graph based on the portion including a first, second, and third vertex labeled as a "rights" norm, an "obligation" norm, and a "prohibition" norm, respectively.

In some embodiments, a message may encode a graph portion template by including an index value that references the graph portion template stored in a library of graph portion templates. After receiving a message that includes an index value referencing a graph portion template, some embodiments may search the library of graph portion templates to determine the graph portion template. For example, a message may include a first identifier "x0215," where "x0215" may be an index value in a library of graph portion templates that is associated with a first graph portion template. After receiving the message, some embodiments may search through the library of graph portion templates for the first identifier "x0215" retrieve the first graph portion template.

In some embodiments, the message may encode a graph portion template based on information included in the message that can be converted into a graph portion template. Some embodiments may determine a graph portion template from the set of instructions using a rule-based system or a NLP system, such as the probabilistic identification system described in provisional patent application 63/034,255 titled "Semantic Contract Maps." For example, some embodiments may receive a message that includes the string "rights norms activated by failed obligations" and convert the string into a set of arrays representing a graph portion template such as "["O", "R"] and "[[0,1]]" by parsing the string, isolating terms associated with vertices or category labels of vertices, and isolating terms associated with directed relationships between the vertices.

In some embodiments, a message may encode a category label to determine a result based on vertices having the category label. For example, some embodiments may receive a message that includes the character "R" or the word "right" represent a category label associated with "rights" norm vertices. As discussed further below, some embodiments may then determine a subset of vertices in the directed graph comprising a category label. By searching through a directed graph representing a symbolic AI application using a category label encoded in a message, some embodiments may provide the vertices associated with that category label or scores associated with those vertices. This information may then be used to compute a sum, count, or other summarizing result and include the result in a response value.

In some embodiments, the process 2600 may include determining a subset of vertices based on the message, as indicated by block 2632. A message may include a set of instructions or parameters to determine a subset of vertices of a directed graph. For example, the message may include a graph portion template to determine a subset of vertices. For example, some embodiments may search through a directed graph for the presence of a graph portion that matches a graph portion template encoded in the message. In some embodiments, the subset of vertices may include all of the vertices that matched with the graph portion template. For example, if a graph portion template includes three vertex templates, and if a graph portion includes three vertices that matched with the three vertex templates, some embodiments may select each of the three vertices for inclusion in a subset of vertices. Alternatively, some embodiments may select only one the subset of vertices that matched with a graph portion template, such as the earliest-activated vertex of the subset of vertices, the last-triggered vertex of the subset of vertices, the last-activated vertex of the subset of vertices, or the like.

Alternatively, or in addition, some embodiments may search through a directed graph based on the presence of a set of vertices that include or is otherwise associated with a category label or set of category labels. For example, after receiving a message indicating the category labels "rights" and "triggerable," some embodiments search through a directed graph for all vertices having a "rights" label and "triggerable" label. As discussed further below, this information may be used to determine a summation, a list of active norm vertices, or the like.

Some embodiments may receive a message that does not limit a search to a single instance of an application and may involve searching through a plurality of directed graphs representing a plurality of applications. In response, some embodiments may select a plurality of directed graphs, such as a plurality of directed graphs stored in a persistent storage of the second computing device, and search through each respective directed graph to determine a respective subset of vertices. For example, a message may include instructions to determine a response value for each smart contract that an entity is a participating entity. In response to receiving the message, some embodiments may select a plurality of directed graphs based on graph criteria encoded in the message. In some embodiments, the criteria may be explicitly encoded, such as criteria limiting the number of directed graphs to those associated with applications listing an entity. Each respective directed graph may represent a program state of a different instance of a smart contract application, and some embodiments may select a respective subset of vertices for each of the respective directed graphs of the plurality of directed graphs.

In some embodiments, the process 2600 may include determining a subset of entities of the symbolic AI program based on the subset of vertices, as indicated by block 2636. As discussed in this disclosure, a symbolic AI program may include a set of entities associated with a directed graph of the symbolic AI program, where one or more entities of the set of entities may trigger one or more conditional statements of the norm vertices of the directed graph. For example, a first entity may trigger a first vertex by satisfying a conditional statement of the first vertex, which may activate a second vertex by setting the second vertex to switch from an un-triggerable state to a triggerable state. Some embodiments may determine the subset of entities based on the entities listed as capable of triggering vertex or being affected by an event satisfying the conditional statement of the norm vertex. For example, a vertex may be associated with a first entity and the second entity based on a conditional statement that is triggered when the first entity sends a specified hash value to the second entity.

In some embodiments, a first vertex may be associated with a first entity even if the first vertex itself is not triggered by an event caused by the first entity or causes a transaction to occur involving the first entity. For example, a first vertex may be associated with a first entity if the triggering of the first vertex activates a second vertex that may be triggered by an event caused by the first entity or causes a transaction involving the first entity. In some embodiments, associating entities with vertices based on neighboring vertices may increase the data privacy for each entity listed in a symbolic AI application when determining data access permissions. Additionally, or alternatively, associating entities with vertices based on neighboring vertices may increase data accuracy when determining response values for queries having one or more criteria based on entities.

Some embodiments may associate vertices from the subset of vertices with their corresponding set of entities in a persistent storage, such as in a data structure stored in a persistent storage of the second computing device. For example, some embodiments may generate a data table with entity identifiers as indices and vertex identifiers as values corresponding to those entity identifier indices. Alternatively, or in addition, some embodiments may generate a data table with vertex identifiers as indices and entity identifiers as values corresponding to those vertex identifier indices. As further discussed in this disclosure, some embodiments may use these associations to determine whether or how much data to provide in a response to a message.

In some embodiments, the process 2600 may include determining whether a message satisfies a set of data retrieval criteria associated with the subset of entities, as indicated by block 2640. Various entities may include or otherwise be associated with specific criteria indicating what other entities are capable of accessing information about the entity, or what types of information can be disclosed. For example, a first entity may include criteria that "level I" entities may access information about specific amounts associated with a transaction. The first entity may also include criteria that only "level II entities" may access information regarding whether a specified set of conditional statements associated with the obligation norms were satisfied by the first entity. Some embodiments may use signature values, entity identifiers, or other information encoded in a message or otherwise associated with the message to determine whether the source of the message is authorized to access information associated with an entity.

In some embodiments, a message may satisfy the set of data retrieval criteria even if it fails a criterion of the set of data retrieval criteria. For example, a set of data retrieval criteria may include a first criterion that specifies that all entities of a first type be provided a score range indicating the numeric range of a resource transfer that occurred during a previous transaction. The set of data retrieval criteria may also include a second criterion that specifies that all entities of a second type be provided a score indicating the exact amount of the resource transfer that occurred during the previous transaction. Some embodiments may satisfy the set of data retrieval criteria by failing the second criterion but satisfying the first criterion.

In some embodiments, a message that satisfies the set of data retrieval criteria may include or otherwise be associated with an identifier of a first entity, where the first entity is listed as a permitted entity to access requested data from the subset of entities. For example, a message may include an identifier of a first entity having an entity type of "regulation observer," and a data retrieval criterion of a second entity may include the condition that a transaction score of the second entity may only be obtained by entities having the entity type "regulation observer." In response to receiving the message, some embodiments may determine that the message satisfies the data retrieval criterion of the second entity. Operations of the process 2600 may proceed to operations described for block 2644 in response to the satisfaction of the set of data retrieval criteria. Otherwise, operations of the process 2600 may proceed to block 2650.

In some embodiments, the process 2600 may include determining a response value based on the subset of vertices, as indicated by block 2644. The response value may be determined based on instructions or parameters encoded in the message used to determine the subset of vertices. For example, some embodiments may receive a message requesting a count of vertices associated with a certain label. Alternatively, or in addition, some embodiments may receive a message requesting a sum of values associated with the subset of vertices. Alternatively, or in addition, some embodiments may receive a message encoding a function to apply to values associated with the subset of vertices.

In some embodiments, the response value may be determined as a combination of scores corresponding to conditional statements associated with the subset of vertices. For example, some embodiments may determine a set of outstanding obligation conditions that a first entity must satisfy. Some embodiments may parse the conditional statements associated with each obligation norm vertex of a subset of vertices to determine a score change required to satisfy each obligation norm vertex and compute the sum of the scores. Similar operations may be performed to determine sums of scores associated with vertex outcomes, such as the sum of a set of scores associated with rights norm vertices. While the above describes computations based on sums of scores, some embodiments may compute other response values based on a set of scores, such as a measure of central tendency of a set of scores, a measure of variance of a set of scores, a maximum value of a set of scores, a minimum value of a set of scores, or the like.

Alternatively, or in addition, some embodiments may determine a response value based on events triggering the subset of vertices. Some embodiments may determine an event or a history of events corresponding to the activation or triggering of a set of vertices and use the event or history of events to determine a response value. For example, some embodiments may determine that a sequence of two events including a first event indicating the allocation of a first amount of memory from a first entity to a second entity and a second event indicating the allocation of a second amount of memory from the first entity to the second entity resulted in the triggering of a subset of vertices. Some embodiments may then compute a mean average between the two amounts of allocated memory and include the mean average in a response value. Alternatively, or in addition, some embodiments may determine a count of occurrence as a response value. For example, some embodiments may determine a total number of times that a graph portion matches a graph portion template across five directed graphs representing five concurrently operating smart contracts and include the total number of times in a response value. Alternatively, or in addition, some embodiments may include data associated with the vertices or events causing the activation or triggering of the vertices in a response value, where. For example, some embodiments may include timestamp data, location data, and a total elapsed time between the earliest activation of a vertex in a subset of vertices and the latest triggering of a vertex in the subset of vertices in a response value.

In some embodiments, a message may include instructions to update a record, a directed graph, a label, or other value stored in a persistent storage of the second computing device. For example, a message may include text formatted as a SQL command, such as "UPDATE graph_table SET column1=value1 WHERE EntityID=0035," which may cause some embodiments to update a database storing the directed graph or data associated with the directed graph by setting the "column1" values of records having an entityID of "0035" to be equal to "value1." While a SQL format is used as a part of the message, update instructions in various other formats may be included in a message to cause some embodiments to update data stored in the persistent storage. For example, a message may include a set of instructions in the form of a set of values, where some embodiments may parse the set of values into parameters for those instructions.

Some embodiments may determine an update confirmation value after updating a directed graph or another value associated with an application in the persistent storage. For example, some embodiments may generate a hash value based on the sets of vertices and edges of the directed graph or use as a first update confirmation value. Some embodiments may determine whether a second update confirmation value is received and satisfies a set of storage update criteria based on the first update confirmation value, where the satisfaction of the set of storage update criteria may include determining that the first and second update confirmation values are equal to each other. For example, some embodiments may receive a second update confirmation value equal to "4325" and compare this second update confirmation value to a first update confirmation value (which may be "4325" or may be a different value) to determine whether the second update confirmation value satisfies the first update confirmation value.

In some embodiments, the set of storage update criteria may use an elapsed time threshold within which an update confirmation value must be satisfied in order for an update to the persistent storage to be considered to be valid. For example, a message may cause a second computing device to update an instance of the directed graph to include an additional vertex. In response, the second computing device may determine a first update confirmation value based on the updated directed graph. The second computing device may use a set of storage update criteria that includes instructions for the second computing to wait 30 minutes before undoing the update unless the second computing device receives a second update confirmation value based on an update to program state for an application operating on a decentralized computing platform storing a serialized version of the directed graph. By updating a record in a persistent storage before a program state upon which the record is based is distributed across a network, some embodiments may reduce slowdowns caused by relatively slow data distribution and retrieval operations in a decentralized, tamper-evident data store. For example, an update to a database used to store a history of program state that caused by the message may require less than one minute to finish, where the update may reflect a program state change that would require 15 minutes to propagate through the nodes of a network operating a decentralized, tamper-evident data store and reach the persistent memory.

In some embodiments, operations of the process 2600 may include determining whether the message includes instructions to update program state for the symbolic AI application, as indicated by block 2650. In some embodiments, the message may include instructions to update program state of the application. For example, a message may include instructions to update a program state of an application executing on a decentralized computing platform by including instructions to set the status of a norm vertex labeled as an "obligation" as failed. If the message includes instructions to update program state of the application, operations of the process 2600 may proceed to block 2654. Otherwise, operations of the process 2600 may proceed to block 2660.

In some embodiments, operations of the process 2600 may include updating a directed graph stored in the second persistent storage of the second computing device, as indicated by block 2654. Updating the directed graph stored in the persistent storage may include changing an existing record stored in the persistent storage of the second computing device. For example, some embodiments may update a record storing an instance of a directed graph to replace an existing set of indices representing the vertices of a directed graph with a new set of indices representing the vertices of the directed graph. Alternatively, updating the directed graph stored in the persistent storage may include adding a new entry to a data structure stored in the persistent storage. For example, some embodiments may add a new record to a data structure that includes a new set of values representing a directed graph encoded in the update parameters of a message received by a hybrid computing system.

In some embodiments, operations of the process 2600 may include serializing and distributing the directed graph or other updates to the first computing device of the computing system, as indicated by block 2658. After updating a directed graph in the persistent storage of the second computing device, some embodiments may then use the distribution mechanisms of an application executing on a decentralized computing platform to update other computing devices used to execute the application. For example, some embodiments may serialize, using one or more serialization operations described above, the version of the directed graph updated by the message at a second computing device acting as a node of a node network and distribute the serialized version to other nodes of the node network from the second computing device.

In some embodiments, operations of the process 2600 may include sending the response value to a response destination, as indicated by block 2660. The response value may be sent from a computing device capable of accessing the second persistent memory storing the subsets of vertices. For example, a query response that includes the response value may be sent from the second private peer node computing device 2515 or another computing device of the hybrid network 2510. In some embodiments, the message may indicate that a known entity having a known destination port or address is the source of a message. For example, some embodiments may receive a message indicating that an entity identified as "x345" is the source of the message, where a list of entities and their associated properties may include a response destination for the entity identified as "x345," where the response destination may include an email address, a identifier for a profile of an online messaging service, a phone number, a identifier for an API, or the like. Alternatively, or in addition, the message may encode an explicit response destination to which the response value is sent. For example, the message may include a response destination in the form of an API address that causes some embodiments to send the response value to the API address.

Some embodiments may perform operations to use a hybrid computing environment to perform querying operations or other operations such as entity-scoring with greater efficiency. In addition to scoring entities, some embodiments perform other operations to determine values associated with an entity with respect to one or more conditions. Some embodiments may perform operations, such as those described further below, to determine whether an entity satisfies a set of conditions even in cases where the identity of the entity across smart contract programs may be obfuscated.

Some embodiments may perform operations to use a hybrid computing environment to perform querying operations or other operations such as entity-scoring with greater efficiency. In addition to scoring entities, some embodiments perform other operations to determine values associated with an entity with respect to one or more conditions. Some embodiments may perform operations, such as those described further below, to determine whether an entity satisfies a set of conditions even in cases where the identity of the entity across smart contract programs may be obfuscated.

Confidential Governance Verification for Graph-Based System

Real-world transactions and other interactions between entities often occur in a framework of governing conditions. This framework of governing conditions may be constructed from a variety of governing documents such as internal policies, established protocols, regulations, laws, or the like. These governing conditions may be taken into account when executing a self-executing protocol (e.g., smart contract program) to reduce the risk of significant damage stemming from the violation of one or more governing conditions specific to one or more of the parties. For example, some regulations may include a rule that requires a first entity to verify that each other entity the first entity has had transactions with be known and not part of a prohibited parties list. A violation of a rule in a governing document may result in penalties, a halt to transactions, or other negative outcomes to the violating entity. While an entity may already include processes to account for these types of governing conditions (sometimes known as Know-Your-Customer processes or KYC processes), these processes may be difficult to implement or demonstrate the effectiveness of due to technological limitations and malicious agents. These attempts may be further hampered by the desired or required anonymity of entities taking part in digital transactions with respect to each other or the complex nature of certain transactions. For example, some governing conditions may correspond to a set of actions that may be allowed individually but, when integrated as a combined set of actions, would be prohibited by the governing condition.

Some embodiments may convert or otherwise adapt a governing document into a set of governing conditions, each of which may require or restrict an entity's action(s). For example, a governing condition may require that all entities party to a transaction or type of transaction be authorized by a verification agent or restrict the execution of transactions associated with globally prohibited entities. Some embodiments may address these requirements using a cross-program entity identifier that may be confidential with respect to an entity or set of entities but mapped to the entity across a domain of smart contract programs. For example, an entity that is a party to three different smart contract programs may be listed under three different entity identifiers for each smart contract program, but each of the three entity identifiers may be confidentially mapped to the cross-program entity identifier via a data table, an associative array, or the like. Some embodiments may confirm that the entity satisfies a governing condition without revealing a cross-program identity of the entity.

While some embodiments may determine that a governing condition is violated based on the governing condition being satisfied, it should be understood that other governing conditions may be considered violated based on the governing condition not being satisfied. As discussed further below, some embodiments may determine whether a violation is caused by the satisfaction or failure of a governing condition based on a pre-set default parameter (e.g., not satisfying a governing condition encoded in a program results in a determination that the governing condition is violated). Alternatively, or in addition, some embodiments may refer to a parameter associated with a respective governing condition to determine whether the satisfaction or failure of the respective governing condition results in a violation of the respective governing condition.

As described above, some embodiments may verify entities or entity transactions based a cross-program entity identifier. In response to a verification operation or to retrieve the result of a verification operation, some embodiments may perform querying operations to determine an event record for an event causing the notification. Some embodiments may perform operations, such as those described further below, to query a graph-based model and obtain event records based on the query with greater efficiency.

Querying Graph-Based Models

The rise of applications using tamper-evident, distributed ledgers or other distributed data structures has led to a corresponding increase in decentralized database systems designed to store and retrieve data stored on tamper-evident, distributed ledgers. The Decentralization, Consistency, and Scalability (DCS) theorem indicates that a real-world decentralized data system is challenged to balance the three properties of decentralization, consistency, and scalability to achieve an effective data storage system. An important aspect of meeting this challenge may be in the structures or processes that a decentralized system implements to provide resulting event records after receiving a query about transactions or program states of a self-executing protocol executing on or otherwise using the tamper-evident, distributed ledger. An event record may include transaction data, records of changes to program state, changes in entities or entity roles, or the like. In many cases, some systems may have difficulty retrieving data stored in a blockchain or other tamper-evident, distributed ledger due to the data structure in which blockchain data is stored. Such difficulties may be exacerbated when the query includes searches for data relationships between different categories of conditions in a graph network, which may slow the time required to perform a search or be prone to encouraging user error.

Some embodiments may provide a method of selecting event records based on a query, where the query may be determined or updated based on a set of query parameters. Some embodiments may determine a set of query parameters based on a received message, where the query parameters may include a query or be otherwise used to determine the query. For example, some embodiments may determine a set of callback addresses or callback functions from a query parameter after using the query parameter to look up the callback function with a database management system (DBMS) storing callback values in association with a set of identifiers. The query may be used to determine a target graph portion template that is encoded in the query or determined from the query parameters of the query. Some embodiments may then perform a search through a set of directed graphs to obtain a set of graph portions, where each respective graph portion matches the target graph portion template. Some embodiments may perform the search using a specific peer node of a peer-to-peer network or a computer system that operates independently of the peer-to-peer network (e.g., a private computing device operating independently of the peer-to-peer network, a third-party cloud service, or the like). Some embodiments may then select a set of event records based on the set of graph portions and send data obtained from the selected set of event records to the set of callback addresses associated with the query.

Some embodiments may determine a set of directed graphs on which to perform the search based on a set of entities associated with a first entity associated with the query, where the set of entities may be determined using an entity graph. By using an entity graph, additional entity relationships discussed elsewhere in this disclosure may be accounted for in a search, reducing the need for complex searches. Additionally, some embodiments may store the library of graph portion templates in a graph database, where records of the database may be identified using the structure of a graph portion template, and where the structure may be represented by a set of relationships between vertices and edges. By using a graph database, some embodiments may increase the speed by which graph-based searches may be performed. Additionally, some embodiments may store versions of transactions or program state data in an embedded database of a blockchain, which may provide a method of efficiently retrieving data without activating a cloud-based system.

By determining or updating query messages to provide queries appropriate for graph-based data or updating the structure(s) in which the graph-based data is stored, some embodiments may increase the efficiency and accuracy of the event records obtained from a query of blockchain data. For example, some embodiments may determine a graph portion template from a query and search through a query using the graph portion template, which can reduce the number of join operations that would be used in some types of searches. It should be understood that, while some embodiments may be described as gaining a specific benefit or performing a specific operation described in this disclosure, not all embodiments described in this disclosure must perform that specific operation or provide that specific benefit, and may perform a set of operations that do not include that specific operation for its own corresponding set of benefits.

Figure 16:
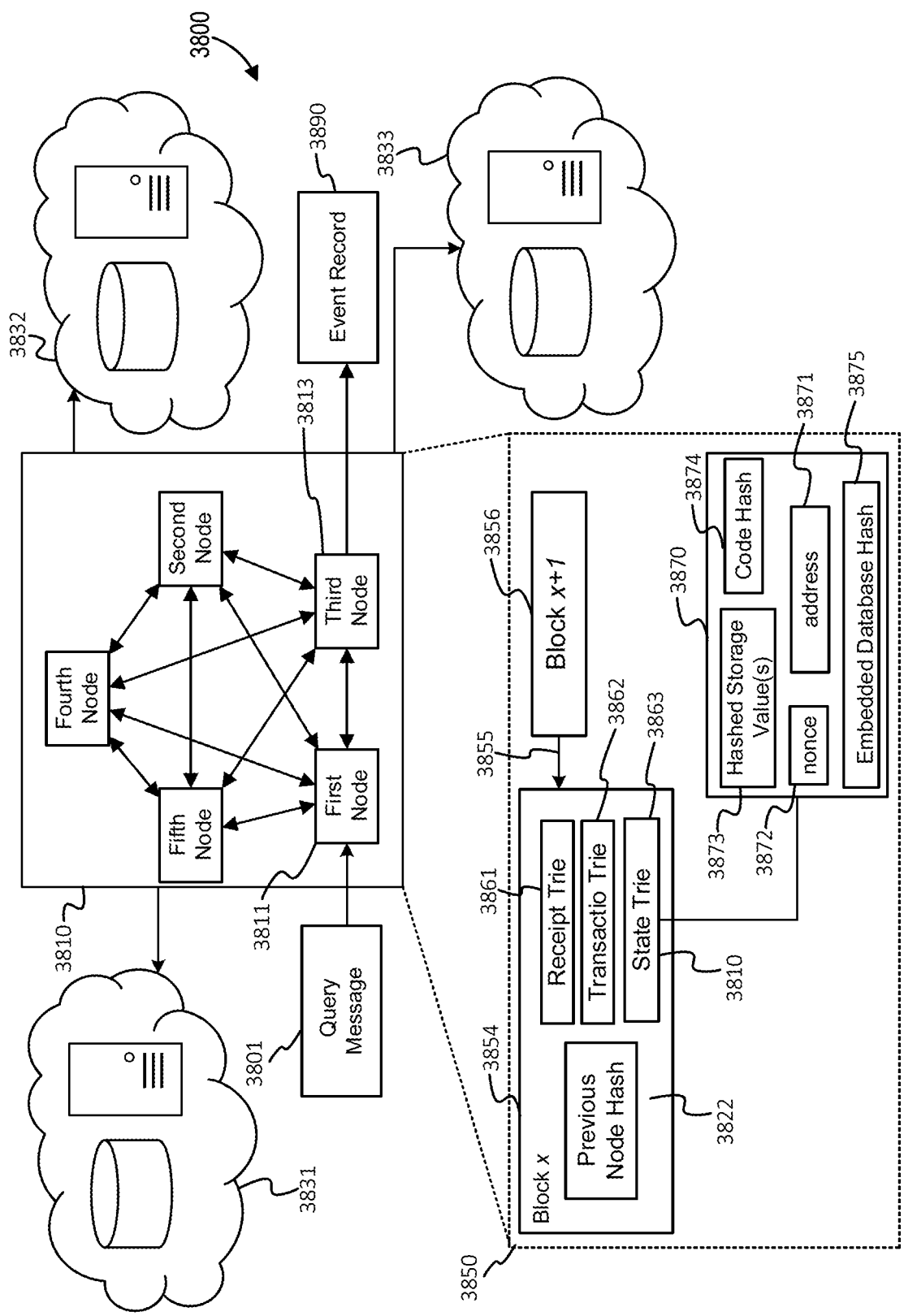
FIG. 16 depicts an architecture diagram usable for retrieving an event record based on a query, in accordance with some embodiments of the present techniques.

FIG. 16 depicts an architecture diagram usable for retrieving an event record based on a query, in accordance with some embodiments of the present techniques. The computing environment 3800 may be used to perform one or more event record retrieval operations or other data retrieval operations based on a query described in this disclosure to obtain an event record 3890. A query message 3801 may be sent to a peer-to-peer network 3810 and receive by a first node 3811. As described further below, in some embodiments, the first node 3811 may directly process the query message 3801 to determine a query from query parameters encoded in the query message 3801. Alternatively, or in addition, some embodiments may send the query message 3801 or data of the query message 3801 to another node such as the third node 3813 for processing. In some embodiments, the query message 3801 may itself be the query or otherwise include the query, and determining the query may include using the query message 3801. Alternatively, or in addition, some embodiments may determine a query based on query parameters of the query message, as further described in this disclosure.

As described elsewhere in this disclosure, self-executing protocol data may be stored in a set of remotely operated resources, such as a set of cloud computing resources. A cloud computing resources may include a set of data centers or other computer devices and may provide processor resources, memory resources, cloud infrastructure resources, or the like. For example, some embodiments may store directed graph information in a first set of cloud computing resources 3831, a second set of cloud computing resources 3832, or a third set of cloud computing resources 3833. For example, the first, second, and third, sets of cloud computing resources 3831-3833 may represent a computing data storage and processing resources provided by Google Cloud, Amazon AWS, and Microsoft Azure, respectively. While pictured as separate cloud computing systems, each of the sets of computing resources may be part of a same cloud system. For example, the first, second, and third, sets of cloud computing resources 3831-3833 may be part of a same Amazon AWS cloud service. As discussed elsewhere in this disclosure, some embodiments may use data stored in one set of cloud computing resources to verify the data in another one. For example, a hashed value from the first set of cloud computing resources 3831 may be used to verify the validity of data in the second set of cloud computing resources 3832 based on a comparison with a hashed value from the second set of cloud computing resources 3832.

Some embodiments may store graph or related transaction data in the records of a tamper-evident, distributed ledger 3850 encoding records of a plurality of previous values in a directed acyclic graph of cryptographic hash pointers. The a tamper-evident, distributed ledger 3850 may be a blockchain and depict a first block 3854 and a second block 3856 linked to the first block 3854, where the second block 3856 may include a previous node identifier has that points to the first block 3854, as indicated by the arrow 3855.

In some embodiments, a directed acyclic graph of cryptographic hash pointers may be used to represent the tamper-evident, distributed ledger 3850, which may store data such as a receipt trie 3861, transaction trie 3862, or state trie 3863. In some embodiments, the state trie 3863 may include an account object 3870. Some or all of the nodes of the directed acyclic graph may be used to form a skip list or linked list in one of the tries, In some embodiments, the block 3854 may be connected to a plurality of tries (e.g., three or more tries) via cryptographic hash pointers. For example, some or all of the nodes of the directed acyclic graph may be used to store the receipt trie 3861, transaction trie 3862, or state trie 3863.

In some embodiments, the state trie 3863 may include multiple levels of cryptographic hash pointers that expand from a root to leaf nodes through 2 or more (e.g. 3, 11, 5, 6, etc.) hierarchical levels of branching. In some embodiments, an account address 3871 of a self-executing protocol or instance of invocation thereof may correspond to a leaf nodes, where the self-executing protocol may be an instance of the self-executing protocol described in one or more operations described in this disclosure. In some embodiments, leaf nodes or paths to the leaf nodes of the state trie 3863 may include the fields in the account object 3870, such as a nonce value 3872 that may be a count of the times that the self-executing protocol was invoked. The account object 3870 may also include a first set of hashed storage values 3873, where the first set of hashed storage values may be accessible via a root value of a trie of cryptographic hash pointers. In some embodiments, the first set of hashed storage values 3873 may store key-value pairs encoding a transient program state of the self-executing protocol that changes or is not needed between invocations of the self-executing protocol.

In some embodiments, the code hash 3874 may be or otherwise include a cryptographic hash of a bytecode representation of a self-executing protocol (or other program based on a symbolic AI model). The bytecode representation may be written using bytecode written in a bytecode language, such as the Ethereum Virtual Machine (EVM) bytecode, Ethereum Web Assembly (Ewasm) bytecode, or the like. In some embodiments, a self-executing protocol may be written in a higher-level distributed programming language, such as Solidity before being converted in a lower-level bytecode form, such as bytecode in the Ewasm language, where one or more intermediate coding languages, such as the LLVM or Yul languages may be used. For example, some embodiments use self-executing protocol code stored in the Ewasm data format, where the code was compiled from code written in the Solidity programming language or Vyper programming language.

In some embodiments, the account object 3870 may include an embedded database hash 3875, where the embedded database hash may include a hash of records stored in the form of a query-accessible data model. The embedded database hash 3875 may include a set of quantitative or categorical data retrievable via an index of the quantitative or categorical values, and may be written in a format interpretable by a DBMS, such as SQL, MongoDB, or the like. As discussed further below, some embodiments may use an embedded database stored within a block to retrieve values without accessing an external cloud server or searching through a set of key-value pairs of a blockchain, which may increase the speed of data retrieval from a blockchain without exposing stored data to third-party cloud service providers.

Figure 17:
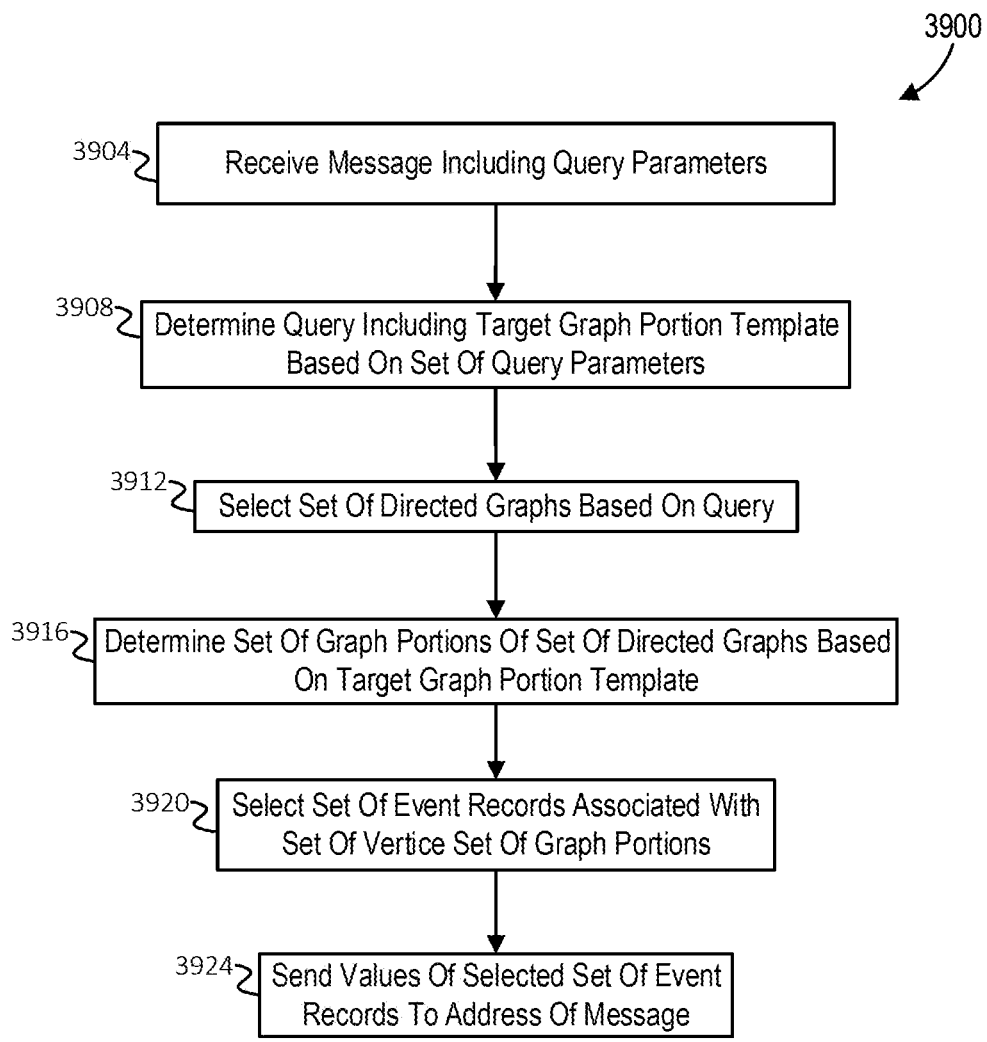
FIG. 17 is a flowchart of a process to select a set of event records based on a query, in accordance with some embodiments of the present techniques.

FIG. 17 is a flowchart of a process to select a set of event records based on a query, in accordance with some embodiments of the present techniques. In some embodiments, the process 3900 may include receiving a message including a set of query parameters, as indicated by block 3904. Query parameters may include any value or other data usable to determine a query, as further described below. In some embodiments, the message may be received at an application program interface (API). For example, some embodiments may receive the message in the form of a web request sent to an API of a self-executing protocol or other distributed application operation on a distributed computing platform.

Some embodiments may provide a program code for a graphical user interface and obtain a message from a computing device executing a version of the graphical user interface. The graphical user interface may allow a user to manipulate shapes on the graphical user interface to generate graph data represent vertices, edges indicating directional relationship between the vertices, and categories (e.g., "right, "obligation," "prohibition," or the like) associated with one or more of the vertices. The message from the computing device may use the graph data to represent a graph portion template and use the graph portion template to perform a search based on the corresponding query, as further described below.

Some embodiments may restrict the results of a query-driven search based on a set of access criteria. Some embodiments may allow results of the search to be sent to permitted addresses and prevent the results from being sent to non-permitted addresses. For example, some embodiments may determine whether a callback address associated with a query can be found in a set of permitted address. In response to a determination that the callback address matches with an address in the set of permitted addresses, some embodiments may allow operations of the process 3900 to proceed. Otherwise, some embodiments may stop or modify operations of the process 3900 such that a query result based on the message is not sent to the callback address.

In some embodiments, the set of access criteria may include a criterion based on an entity or entity role. For example, some embodiments may receive a message that includes or is associated with an entity identifier. Some embodiments may then determine whether the entity identified by the entity identifier is permitted to obtain results of a search based on the criterion. For example, a message may be sent with a first entity identifier to indicate that the message is sent by the first entity. Some embodiments may identify an entity role associated with the first entity and determine that the first entity has permission to receive a query search result based on the entity role and proceed with performing operations of the process 3900 to provide query results such as event record data to a callback address of the message. Alternatively, some embodiments may determine that the first entity does not have permission to receive a query result and, in response, stop or modify operations of the process 3900 such that a query result based on the message is not sent to the callback address.

In some embodiments, the message may include a set of callback addresses that indicates one or more addresses to send a query result. The message may include a server URL as a callback address. For example, the message may include the server URL as input of an API function, where the API function may be a function of a distributed application or otherwise be capable of sending messages to the distributed application. Alternatively, or in addition, some embodiments may determine that the message was sent by an entity and perform a data retrieval operation with a DBMS or other data structure (e.g, a data structure used to store entity profile data) to determine a callback address. For example, some embodiments may receive a web request from a client device, where the web request is sent with an identifier of the first entity. Some embodiments may search through a SQL table to select a callback address associated with the first entity. Alternatively, or in addition, some embodiments may send a query result to a default address, which may then be reported to one or more entities having permission to access data retrieved from the default address.

In some embodiments, a determination may be made of whether message causes some embodiments to perform one or more queries. In response to a determination that the message causes some embodiments to perform one or more queries, some embodiments may route the message or data from the message to a specified node of a peer-to peer network (e.g. an oracle node). Alternatively, or in addition, some embodiments may perform a search on data stored in a cloud computing resource of a cloud computing service, as further described below. By re-routing a query request to a specific node or cloud computing service, some embodiments may reduce a network computing load on a peer-to-peer network.

In some embodiments, the process 3900 may include determining a query including a target graph portion template based on the set of query parameters, as indicated by block 3908. As described above, the set of query parameters may include a set of values usable for generating or otherwise obtaining a query. The set of query parameters may include a date, a date range, a score, a range of scores, another type of quantitative value, or the like. Alternatively, or in addition, the message may include a complete query interpretable by a database language such as a SQL. For example, the message may include the SQL command "SELECT EventType FROM contr153."

In some embodiments, determining a query may include generating a query from a set of query parameters. For example, a message may include a first query parameter indicating a category cat1 and a second query parameter indicating a date1. In response to receiving a message including the first query parameter and the second query parameter, some embodiments may generate a query such as, "SELECT cat1, date1 FROM contr115."

In some embodiments, determining a query may include determining a target graph portion template based on the set of query parameters. In some embodiments, the set of query parameters may include a target graph portion template. A graph portion template may be sent in one or more forms, such as arrays, adjacency lists, hash maps, or the like. Some embodiments may receive a graph portion template in the form of a set of arrays, categories, hash maps, or the like. For example, some embodiments may receive those shown above in the self-executing protocol state data 200, which may include an associative array of conditions 220, an associative array of norms 230, a graph list 240, or the like. In some embodiments, the graph portion template may be obtained from a graphic user interface, where the vertices, their corresponding categories, and the edges associating the vertices together are arranged by a user using the graphic user interface. Alternatively, or in addition, some embodiments may receive a directed graph portion template in the form of an identifier for the directed graph portion template, where the identifier may be used to obtain a graph portion template stored in a library of graph portion templates.

In some embodiments, the query may include an indication of a target type of event record. For example, some embodiments obtain a query that causes a search for each event record for an event indicated to have occurred concurrently with a duration in which vertices of a set of graph portions were active, where each graph portion is determined to have matched with a target graph portion template. Alternatively, or in addition, some embodiments may some embodiments obtain a query that causes a search for each event record for an event indicated to have caused the activation or triggering of a vertex of a graph portion determined to have matched with a target graph portion template. Some embodiments may specify that the target type of event record indicates a transaction between entities. Alternatively, or in addition, some embodiments may specify that the target type of event record indicates a change in an observed global state value or a value correlated with a sensor measurement.

In some embodiments, the set of query parameters may include data that may be converted into a graph portion template. For example, some embodiments may obtain a set of vertices or a set of requirements. Some embodiments may then generate one or more graph portion templates based on the set of vertices or the set of requirements. For example, some embodiments may obtain a message indicating five vertices and, in response, generate a plurality of graph portion templates using the five vertices, where each template of the plurality of graph portion templates may include versions of the five vertices. In some embodiments, the vertices determined from the message may be associated with a specified set of categories in the message, the categories selected from a mutually exclusive set of categories.

Some embodiments may select a set of entities based on a set of query parameters. Some embodiments may determine set of entities based on a first parameter identifying a first entity and a second parameter indicating that a target type of entity are entities having had a transaction with the first entity. For example, some embodiments may receive a query including a first entity identifier, transaction type, and a time period. Some embodiments may select a set of related entities, where each respective entity of the set of related entities were indicated to have had one or more transactions of the transaction type with the first entity, and where each transaction was indicated to have occurred within the time period. In some embodiments, the set of query parameters may indicate a criteria to select entities having an entity score greater than an entity score threshold. By selecting entities Some embodiments may select the set of entities based on an entity graph, such as an entity graph similar to the entity graph 2200 described above. A set of query parameters may be used to select a set of entities having a parameter-specified relationship with a parameter-specified set of entities. For example, some embodiments may select each of a set of entities indicated has having had a type of transaction with a first entity, where the first entity is identified by a first query parameter and the type of transaction is identified by a second query parameter.

In some embodiments, the process 3900 may include selecting a set of directed graphs based on the query, as indicated by block 3912. A directed graph may include a directed graph represented in program state of a self-executing protocol. For example, a distributed computing platform may be concurrently executing a set of 100 self-executing protocols and provide access to a history of 500 completed of self-executing protocol. Some embodiments may then select 13 of the still-in-execution self-executing protocols and 50 of the completed self-executing protocols based on a date range of the query, where the program state of each respective self-executing protocol includes a respective directed graph. Various other filters may be used to select the set of directed graphs based on values of the query, such as categories, associated entities, parent contracts, or the like. For example, some embodiments may receive a query that includes a set of entity identifiers and, in response, select set of directed graphs that have at least one entity identified by the set of entity identifiers listed as a participating entity. In some embodiments, the set of entity identifiers may have been obtained using an entity graph or an entity score associated with each of the respective entities.

In some embodiments, the process 3900 may include determining a set of graph portions of the set of directed graphs based on the target graph portion template, as indicated by block 3916. As disclosed elsewhere in this disclosure, some embodiments may match graph portions of directed graphs with graph portion templates. A match may be confirmed based on a match between the structure of vertices and their associated directed edges of a directed graph portion with the structure of vertices and their associated directed graph edges of a graph portion template. For example, a first graph portion template may include a first vertex, a second vertex, and a third vertex, each categorized as an "obligation," "right," and "prohibition," respectively, where a first directed edge points from the first vertex to the second vertex, and where the second directed edge points from the first vertex to the third vertex. Some embodiments may determine that a first graph portion matches the first graph portion template based on the first graph portion including a fourth, fifth, and six vertex, each categorized as an "obligation," "right," and "prohibition," respectively, where a third directed edge points from the fourth vertex to the fifth vertex, and where the fourth directed edge points from the fourth vertex to the sixth vertex. Various other categories may be used, and some embodiments may associate vertices with categories selected from a set of mutually-exclusive categories.

Some embodiments may determine a set of graph portions by deserializing a serialized array of a directed graph. For example, as discussed elsewhere in this disclosure, some embodiments may have stored some or all of a directed graph in a serialized array in persistent memory. When searching for a graph portion or performing other operations based on a graph portion of a directed graph, some embodiments may deserialize the serialized array into a deserialized directed graph. The deserialized directed graph may be stored in a non-persistent memory during operations to determine whether a graph portion(s) of the directed graph matches a graph portion template. By deserializing a serialized form, some embodiments may increase the accuracy of a query result based on a graph portion template by using data stored directly in a distributed ledger instead of using data stored in a separate data system (e.g., data that is periodically updated and stored on a cloud-computing service).

Some embodiments may search through an embedded database to select one or more graph portions of the set of graph portions. As discussed further below, the embedded database may be a database stored in a record, such as a block, of a tamper-evident, distributed ledger, such as a blockchain, encoding records of a plurality of previous values in a directed acyclic graph of cryptographic hash pointers. The embedded database of the block may be stored in various forms and may include one or more layers, such as a balanced tree (b-tree) layer, where a b-tree may include a data structure arranged such that nodes of the b-tree having m child nodes will have non-leaf child nodes having at least m/2 nodes, where m is an integer. For example, some embodiments may store an embedded database using a method described by Han et al. (Han, J., Kim, H., Eom, H., Coignard, J., Wu, K. and Son, Y., 2019, June. Enabling SQL-Query Processing for Ethereum-based Blockchain Systems. In Proceedings of the 9th International Conference on Web Intelligence, Mining and Semantics (pp. 1-7)), where some embodiments may store an additional set of transactions or a set of graph portions in a blockchain block and may use a set of routines to update an index referencing the set of additional transactions or set of graph portions.

Some embodiments may obtain a query indicating a search for all graph portions matching a target graph portion template, wherein a template identifier of the target graph portion template is associated with a record in an embedded database of a block of a blockchain. Some embodiments may then use an index arranged by quantitative values or categories to retrieve the record, where the record may store a set of vertices identifiers or graph portion identifiers corresponding with one or more graph portions of the set of graph portions. In some embodiments, a record stored in the block may be a record for a relational database that includes a b-tree. For example, some embodiments may store a relational database record having a b-tree, where root values of the b-tree include identifiers associated with vertices of a directed graph or with graph portions of the directed graph. After receiving a query, some embodiments may determine whether the query includes a query parameter indicating a quantity or category associated with the index. In response to a determination that the query includes the query parameter indicating the quantity or category associated with the index, some embodiments may use the b-tree to obtain a set of vertices or set of graph portions referenced by the index.

Some embodiments may implement versions of the embedded database using a private blockchain protocol such as Quroum™, Hyperledger Fabric, or Corda. For example, some embodiments may add a set of routines in Quorum that stores quantitative data or categorical data of transactions or graph portions in a block of the blockchain, where the implementation of the blockchain protocol may include privacy features such as the raft consensus mechanism or an EFT consensus mechanism. The registered data may be stored as a relational database embedded in the block, such as in a SQL or SQLite database, where integration with external commands sent via a HTTP or IPC connections and may be provided. Alternatively, the registered data may be stored in a non-relational database. The registered data may include transaction data stored in multiple forms to conform to different requirements of a distributed application. For example, transaction data or program state data that resulted from a transaction may be stored as both a key-value pair of a key-value database and as an embedded relational database. During a search, some embodiments may receive a query, such as a SQL query, at an API to perform one or more data retrieval operations on the embedded database of the block. For example, some embodiments may receive a query requesting transactions or directed graphs within a specified date range or associated with a numeric range indicating a transaction greater than 50 units or is associated with causing a graph portion matching a target graph portion template. Some embodiments may then call a function of a remote procedure call protocol (RPC), where the function may use the query as an input to then retrieve data from the embedded database based on the query.

Some embodiments may search through a database stored in a centralized repository such as a private server or a cloud-based service. For example, some embodiments may obtain graph portions of directed graphs stored in a set of cloud computing resources such as Microsoft Azure™ Amazon AWS™, Google Cloud™, or the like. As discussed further below, by searching through a centralized repository instead of a distributed data structure such as a blockchain (or other tamper-evident, distributed ledger), some embodiments may increase the speed at which the query result may be returned.

Some embodiments may store previous searches of a self-executing protocol for later use. For example, some embodiments may obtain a first query at a first time point and store the results of performing a search using the first query (first search result) in association with parameters of the first query. Some embodiments may then obtain a second query at a later time point, where one or more parameters of the second query matches with the first query. The first query may include query parameters that indicate the first query causes a search for all graph portions matching a specified graph portion template, and the second query sent at a later date may include query parameters that indicate that the second query also causes a search for all graph portions matching a specified graph portion template. After obtaining the second query, some embodiments may determine a first search time associated with when the last search was performed and, in response, modify the second query such that the second query causes the search to explore records of graph portion templates or transactions indicated to have occurred at a time later than the first search time. Some embodiments may then join the results of the search using the modified second query with the first search result to generate a query result.

In some embodiments, the process 3900 may include selecting a set of event records associated with a set of selected graph portions based on the query, as indicated by block 3920. As disclosed above for block 3908, some embodiments may determine a query indicating a target type of event record to search for based on a selected set of graph portions. Some embodiments may then select the set of event records based the query. For example, some embodiments may obtain a query indicating that the target type of event record to search for are for events that have caused one or more vertices of a directed graph portion to occur. For example, an event record may be associated with a graph portion based on the event record being associated with an event that caused the triggering of a first vertex of the graph portion. Alternatively, or in addition, some embodiments may obtain a query indicating that a target type of event record includes event records for events that have occurred during or between the occurrence of one or more vertices of the graph portion.

In some embodiments, the process 3900 may include sending values of the selected set of event records to the address, as indicated by block 3924. As described elsewhere in this disclosure, some embodiments may send a response to a callback address encoded in the message sent to an API. In some embodiments, the callback address may include a URL of a server. Alternatively, or in addition, the callback address may include a messaging platform identifier, another API address, an e-mail address, or the like. The response message sent to the callback address may include the entirety of a selected set of event records. Alternatively, or in addition, the response message sent to the callback address may include a subset of the data encoded in the selected set of event record. For example, some embodiments may send only the entities responsible for causing an event indicated by the selected set of event records in the response message. Some embodiments may send a computed value based on the data of the selected set of event records. For example, some embodiments may send a response value to a callback address that includes a sum of the transaction scores recorded in a selected set of event records.

Alternatively, or in addition, some embodiments may send a previously-computed value associated with an event, a graph portion, or a graph portion template to a callback address in response to a query. For example, as disclosed above, some embodiments may store a count of occurrences of candidate graph portions matching a graph portion template. Some embodiments may determine that a query requested this parameter and, in response, send a message using the previously-computed count of occurrences. By using a previously-computed value instead of re-computing a value, some embodiments may reduce the computational load on a computing platform and reduce the response time by which a callback address receives query results.

Figure 18:
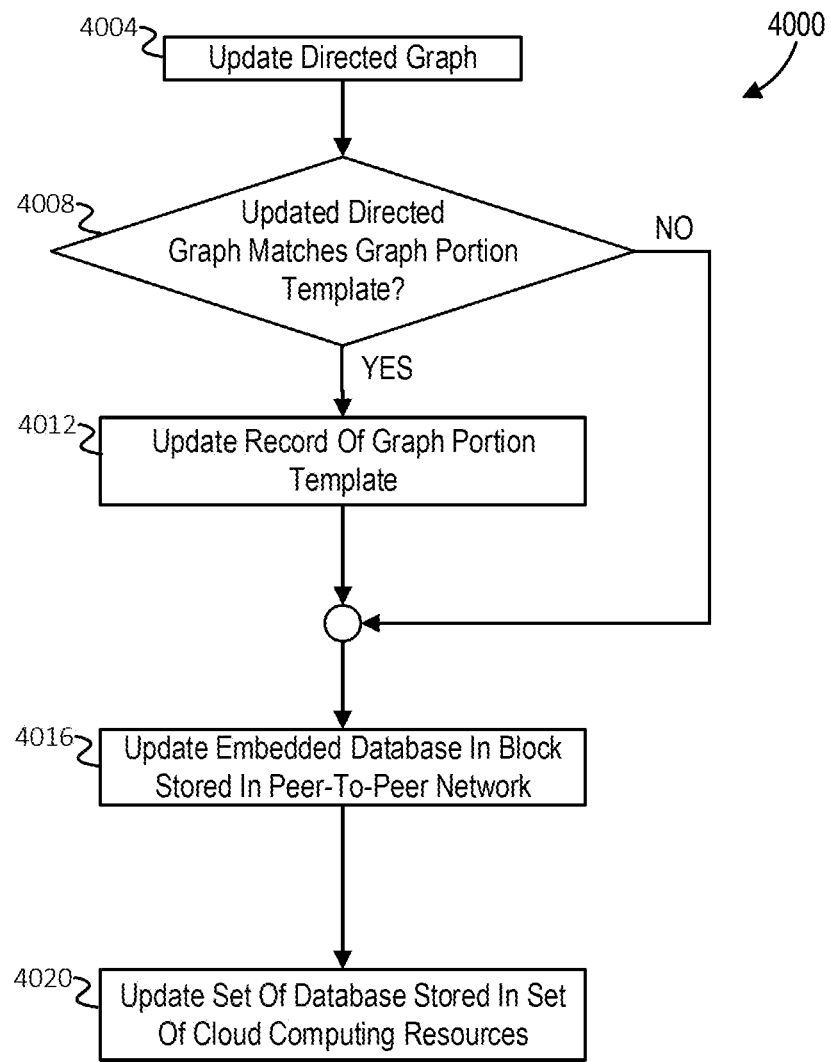
FIG. 18 is a flowchart of a process to store data associated with updates to a directed graph, in accordance with some embodiments of the present techniques.

FIG. 18 is a flowchart of a process to store data associated with updates to a directed graph, in accordance with some embodiments of the present techniques. In some embodiments, operations of the process 4000 may include updating a directed graph, as indicated by block 4004. As described elsewhere in this disclosure, a directed graph may be updated in response to an event message, where the event message may trigger a vertex of the directed graph, activate a vertex of the directed graph, cancel the vertex of the directed graph, or the like. For example, some embodiments may update the directed graph by receiving an event message that causes a first vertex of a directed graph categorized as an "obligation" to trigger and be set to having a vertex status of "failed." Some embodiments may store an event record of the event message or event record of the data from the program state encoding the directed graph. Some embodiments may store the event record in a data structure, such as one or more data structures described further below. If triggering the first vertex causes a second vertex to activate without requiring an additional event message, some embodiments may store a first version of the directed graph in a data structure using one or more of the methods described further below and a second version of the directed graph in the same data structure. The first version may include the first vertex and indicate that the first vertex is triggered without the second vertex being indicated as active, and the second version may include the second vertex and indicate that the second vertex is triggered.

Some embodiments may obtain data from a sharded distributed data structure. As described elsewhere in this disclosure, a sharded distributed data structure may include a data structure in which portions of a data structure is stored on different nodes of a distributed data structure. For example, some embodiments may store a library of graph portion templates or a set of event records using an auto-sharding architecture or a distributed SQL database, such as those described by Li et al. (Li, Y. and Manoharan, S., 2013, August. A performance comparison of SQL and NoSQL databases. In 2013 IEEE Pacific Rim Conference on Communications, Computers and Signal Processing (PACRIM) (pp. 15-19). IEEE), which is hereby incorporated by reference. For example, some embodiments may implement hash-based sharding, where a record's key value is used to generate a hash value. The hash value may then be used to determine the shard that the record will be stored in. In some embodiments, the hashing algorithms used to determine the hash may be a function such as Ketama. Alternatively, or in addition, some embodiments may use range-based sharding, in which some embodiments may divide a record in to ranges of the score value stored in the record and records that are close in proximity with respect to the score value stored in the same shards. For example, a first record may have a first score equal to 10 and a second record may have a second score equal to 11. If a first shard is associated with the range of 1 to 10 and a second shard associated with the range of 11 to 20, some embodiments may store the first record and the second record in the second shard.

Some embodiments may store graph data may sharded graph database. Some embodiments may store sharded graph portion templates by breaking a larger graph portion template into smaller graph portion templates. For example, some embodiments may use the Neo4j fabric feature of the Neo4j graph database management system to sharded a graph portion template indicating a first vertex template associated by a graph edge template to a second vertex template. During sharding, some embodiments may store a version of the first vertex template in a first shard store a second version of the graph portion template in a second shard, where a pointer or other link may associate the first vertex template in the first shard to the second version of the graph portion template in the second shard.

In some embodiments, operations of the process 4000 may include determining whether a directed graph portion of the updated graph matches a graph portion template, as indicted by block 4008. Operations to determine whether a directed graph portion matches a graph portion template may include using one or more operations described above. For example, some embodiments may use operations to determine that a directed graph portion matches a graph portion template using operations described for block 3918 above. If a determination is made that an updated graph portion matches a graph portion template, operations of the process 4000 may proceed to block 4012. Otherwise, operations of the process 4000 may proceed to block 4016.

In some embodiments, operations of the process 4000 may include updating a record associated with the graph portion template, as indicated by block 4012. The record associated with the graph portion template may be stored in a library of graph portion templates. The record may include a representation of the graph portion template, categories associated graph portion template, one or more quantitative score values associated with the graph portion template, or the like. For example, some embodiments may increase a quantitative score associated with the graph portion template, with a quantitative score may represent a number of times that the graph portion template matches with a directed graph portion of a set of directed graphs. Alternatively, or in addition, some embodiments may store an identifier of the directed graph that the graph portion is in.

The library of graph portion templates may be stored in one or more various types of data structures, such as a graph database, a SQL database, a document-based database, an XML database, or the like. In some embodiments, the set of graph portion templates may be stored in a SQL database such as MySQL™, Microsoft SQL Server™, PostgreSQL, or the like. Some embodiments may update a database of records storing data associated with a graph portion template. Each record may include a representation of the graph portion template structure itself, a set of scores, a set of categories associated with the graph portion template or vertices of the graph portion template, or the like.

For example, a record associated with a graph portion template may include a graph database where the graph structure itself may be used as a reference identifier to identify and retrieve properties associated with the graph portion template. For example, some embodiments may store a graph in a graph database using a labeled-property model or a resource description framework (RDF) model. For example, some embodiments may store data in a labeled property graph model, where a graph portion template may be represented by a set of nodes, properties, labels, and relationships between notes, and where data associated with the nodes or their relationships is encoded in a set of key/value pairs. By directly storing a graph in this way, some embodiments may search for or retrieve data associated with a graph portion template or its associated properties with constant-time traversal. This may be especially advantageous in real-world scenarios, where a graph portion template may expand as use of a distributed computing platform storing directed graphs adds to the library of graph portion template over time.

Some embodiments may update a record on a graph portion template using an RDF model, where the record may be stored in a model described by Kovacs et al. (Kovacs, T., Simon, G. and Mezei, G., 2019. Benchmarking Graph Database Backends—What Works Well with Wikidata?. Acta Cybernetica, 24(1), pp. 43-60.), such as one of the models used by Blazegraph, Janus graph, or Neo4j. In some embodiments, using an implementation of an RDF graph model may include adding a node to a graph portion template to include additional information associated with the graph portion template. For example, some embodiments may update a first graph portion template to indicate that a count of occurrences of the first graph portion template is now equal to 193 by adding or otherwise updating a node of the first graph portion template in the Neo4j graph model to store the value "193" in a node titled "occurrenceCount."

As described above, various types of graph databases may be used, such as Neo4j, DEX, Infinite Graph, or others described by Rawat et al. (Rawat, D. S. and Kashyap, N. K., 2017. Graph database: a complete GDBMS survey. Int. J, 3, pp. 217-226). In some embodiments, other implementations of a graph database may be used such as a Janus Graph™, Nebula Graph™, or the like. For example, some embodiments may build a model of a graph portion template by applying a script to convert the graph portion template into a Nebula Graph model, where the script may provide generate a query in the form of a graph-specific query language such as nGQL. As discussed elsewhere in this disclosure, some embodiments may query the graph model using a graph-specific query language such as nGQL or Cypher™.

In some embodiments, operations of the process 4000 may include updating an embedded database in block stored in a peer-to-peer network, as indicated by block 4016. As described above, some embodiments may store a record of events in a directed acyclic graph of cryptographic hash pointers, where the linked list of records may be connected by cryptographic hash pointers. In some embodiments, each record of the blockchain may store a data structure embedded in the record, where the database may be in a form described above. For example, a data structure embedded in a record may include a SQL table. By storing values in an embedded database, some embodiments may retrieve data associated with a directed graph portion without accessing the directed graph itself and instead access the embedded database. For example, some embodiments may receive a query to determine the number of occurrences of a graph portion matching a specified graph portion template and, in response, retrieve a score associated with a count of the times that the graph portions matched with the specified graph portion template.

In some embodiments, operations of the process 4000 may include updating a set of data structures stored in a set of cloud computing resources, as indicated by block 4020. In some embodiments the set of data structures may include an implementation of one or more of the data models described in this disclosure. For example, one or more of the records of a graph portion template may be stored in a graph database stored on a cloud-based data center.

Some embodiments may store versions of the updated directed graph in a plurality of cloud computing resources. For example, some embodiments may store a first version of a directed graph in a first computing resource of a first cloud computing system and store the second version of the directed graph in a second computing resource of a second cloud computing system. Some embodiments may then verify the updates of the version of the directed graph stored in the first cloud computing system with the directed graph stored in the second computing system. Some embodiments may determine whether the two versions match based on various criteria. If the two versions do not match, some embodiments may send an alert to one or more monitoring agents, update one or more versions of the directed graph with a more recent version, or perform another action to reconcile the mismatch.

As described above, some embodiments may use one or more machine learning operations to determine outcome scores, outcome states, or the like. Some embodiments may adaptively transfer parameters from one machine learning model to another to increase the efficiency or accuracy of results obtained from a machine learning model. Some embodiments may perform operations, such as those described further below, to transfer parameters of machine learning models responsive to properties of a directed graph.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The term "set" may indicate a single item or a plurality of items, e.g., "set of widgets" may indicate only one widget or may indicate multiple widgets. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

A-1. A tangible, non-transitory, machine-readable medium storing instructions that when executed by one or more processors effectuate operations comprising: determining, with a computer system, that an event has occurred; selecting, with the computer system, a self-executing protocol among a plurality of self-executing protocols based on the event, wherein: the self-executing protocol comprises a set of conditions, a set of entities, a set of vertices, and a set of directed graph edges connecting the set of vertices, the set of vertices comprise different respective subsets of the conditions, the set of entities are encoded in an associative array, the set of conditions are encoded in an associative array, the set of vertices are encoded as a serialized array of vertices, wherein the serialized array of vertices is in a serialized data format in persistent storage, selecting is based on whether the event satisfies any of the set of conditions; deserializing, with the computer system, the serialized array of vertices to generate a directed graph in a non-persistent memory, wherein the directed graph encodes the set of conditions, set of vertices, set of entities, and set of directed edges; determining, with the computer system, a set of triggerable vertices from the vertices of the directed graph in the non-persistent memory; determining, with the computer system, a set of triggered vertices from the set of triggerable vertices based on which of the set of triggerable vertices are associated with the set of conditions satisfied by the event; updating, with the computer system, the directed graph in the non-persistent memory based on the set of triggered vertices, wherein updating the directed graph comprises, for each respective triggered vertex of the set of triggered vertices: updating a first value associated with the respective triggered vertex based on the event, where the first value indicates whether the respective triggered vertex is triggerable; updating a respective adjacent vertex to indicate that the respective adjacent vertex is triggerable, wherein the respective adjacent vertex is associated with a directed graph edge of the respective triggered vertex; updating, with the computer system, the serialized array of vertices by serializing the directed graph in the non-persistent memory after updating the directed graph in the non-persistent memory based on the set of triggered vertices; and persisting, with the computer system, the serialized array of vertices to the persistent storage after the serialized array of vertices is updated by serialization.

A-2. The medium of embodiment A-1, wherein: a first vertex in the set of vertices is indicated to not be triggerable by a first set of values, wherein each of the first set of values indicate whether a vertex in the set of vertices is triggerable; and the directed graph in the non-persistent memory does not include the first vertex of the serialized array of vertices.

A-3. The medium of any of embodiments A-1 to A-2, wherein the serialized array of vertices comprises an array of subarrays, wherein each subarray comprises a head vertex of a directed graph edge of the set of directed graph edges, a tail vertex of the directed graph edge, a label associated with the directed graph edge, and a valence value indicating a number of other edges associated with the directed graph edge.

A-4. The medium of any of embodiments A-1 to A-3, wherein determining that an event occurred further comprises: receiving an event message from a publisher, wherein the publisher is identified by a publisher identifier; determining whether the publisher is associated with one of a set of authorized publishers based on the publisher identifier; and authorizing the event message based on a determination that the publisher identifier is associated with one of the set of authorized publishers.

A-5. The medium of any of embodiments A-1 to A-4, wherein the operations further comprise: receiving an event message from a publisher, wherein the event message is associated with a signature value and a publisher identifier; retrieving a cryptographic certificate based on the publisher identifier; computing a cryptographic hash value based on the signature value; and authenticating the event message based on the cryptographic hash value and the cryptographic certificate.

A-6. The medium of any of embodiments A-1 to A-5, wherein determining the set of triggered vertices comprises: determining a first set of vertices in the directed graph in the non-persistent memory, wherein each respective vertex of the first set of vertices is indicated as a head vertex by one of the set of directed graph edges; and determining the set of triggerable vertices based on the first set of vertices by filtering out a set of tail vertices from the first set of vertices, wherein each of the set of tail vertices is indicated as a tail vertex by one of the set of directed graph edges.

A-7. The medium of any of embodiments A-1 to A-6, wherein the serialized array of vertices is stored in a tamper-evident data store being executed by a set of peer nodes, wherein the tamper-evident data store comprises a directed acyclic graph of cryptographic hash pointers, and wherein deserializing the serialized array of vertices comprises using a first node of the set of peer nodes to deserialize the serialized array of vertices, and wherein the operations further comprising transmitting the serialized array of vertices from the first node to another node of the set of peer nodes after updating the serialized array of vertices.

A-8. The medium of any of embodiments A-1 to A-7, the operations further comprising receiving an event message, wherein receiving the event message comprises receiving a request that comprises the event message, and wherein the request comprises a method identifier and a host identifier, wherein the method identifier indicates that the request comprises an amount of data to modify data stored by the system, and wherein the host identifier indicates a host of the self-executing protocol.

A-9. The medium of any of embodiments A-1 to A-8, the operations further comprising receiving an event message, wherein the event message comprises a routing key, and wherein a data broker stores the event message in a queue, and wherein a protocol broker transmits the event message to an API associated with the self-executing protocol based on the routing key.

A-10. The medium of any of embodiments A-1 to A-9, wherein determining the set of triggered vertices comprises determining the set of triggered vertices based on a second set of values, wherein each of the second set of values is associated with one of a set of vertices of the directed graph in the non-persistent memory, and wherein one of the second set of values indicate that one of the set of vertices of the directed graph in the non-persistent memory is triggerable.

A-11. The medium of any of embodiments A-1 to A-10, wherein determining that the event has occurred comprises determining that a condition expiration threshold has been satisfied, and wherein the condition expiration threshold is associated with a first condition of a first triggerable vertex, and wherein the event does not satisfy the first condition.

A-12. The medium of any of embodiments A-1 to A-11, the operations further comprising updating an array of previously-triggered vertices based on a vertex identifier associated with the respective triggered vertex.

A-13. The medium of any of embodiments A-1 to A-12, the operations further comprising generating an initial directed graph based on an initial set of vertices, wherein the initial set of vertices is different from the serialized array of vertices.

A-14. The medium of any of embodiments A-1 to A-13, wherein a vertex of the directed graph stored in the non-persistent memory comprises a condition of the set of conditions.

A-15. The medium of any of embodiments A-1 to A-14, the operations further comprising updating a third set of values associated with the serialized array of vertices, wherein the third set of values indicate that the respective triggered vertex is not triggerable.

A-16. The medium of any of embodiments A-1 to A-15, wherein updating the respective adjacent vertex comprises setting a plurality of statuses associated with a plurality of vertices other than the respective triggered vertex as not triggerable.

A-17. The medium of any of embodiments A-1 to A-16, wherein updating the first value comprises updating the first value to indicate that the respective triggered vertex remains triggerable after updating the serialized array of vertices.

A-18. The medium of embodiment A-17, wherein updating the respective adjacent vertex comprises decreasing a second value, wherein the second value indicates a state of the self-executing protocol.

A-19. The medium of any of embodiments A-1 to A-18, the operations further comprising updating a set of previous events based on the event, wherein the set of previous events comprises a plurality of previous events that caused a state change in the self-executing protocol, wherein the set of previous events comprises a time during which the event occurred.

A-20. A tangible, non-transitory, machine-readable medium storing instructions that when executed by one or more processors effectuate operations comprising: determining, with a computer system, that an event has occurred; selecting, with the computer system, a self-executing protocol among a plurality of self-executing protocols based on the event, wherein: the self-executing protocol comprises a set of conditions, a set of entities, a set of vertices, and a set of directed graph edges connecting the set of vertices, the set of vertices comprise different respective subsets of the conditions, the set of entities are encoded in an associative array, the set of conditions are encoded in an associative array, the set of vertices are encoded as a serialized array of vertices, wherein the serialized array of vertices is in a serialized data format in persistent storage, selecting is based on whether the event satisfies any of the set of conditions; deserializing, with the computer system, the serialized array of vertices to generate a directed graph in a non-persistent memory, wherein the directed graph encodes the set of conditions, set of vertices, set of entities, and set of directed edges; determining, with the computer system, a set of triggerable vertices from the vertices of the directed graph in the non-persistent memory; determining, with the computer system, a set of triggered vertices from the set of triggerable vertices based on which of the set of triggerable vertices are associated with the set of conditions satisfied by the event; updating, with the computer system, the directed graph in the non-persistent memory based on the set of triggered vertices, wherein updating the directed graph comprises, for each respective triggered vertex of the set of triggered vertices: updating a first value associated with the respective triggered vertex based on the event, where the first value indicates whether the respective triggered vertex is triggerable; updating a respective adjacent vertex to indicate that the respective adjacent vertex is triggerable, wherein the respective adjacent vertex is associated with a directed graph edge of the respective triggered vertex; updating, with the computer system, the serialized array of vertices by serializing the directed graph in the non-persistent memory after updating the directed graph in the non-persistent memory based on the set of triggered vertices; and persisting, with the computer system, the serialized array of vertices to the persistent storage after the serialized array of vertices is updated by serialization.

A-21. A method to perform the operations of any of the embodiments A-1 to A-19.

A-22. A system, comprising: one or more processors; and memory storing instructions that when executed by the processors cause the processors to effectuate operations comprising: the operations of any one of embodiments A-1 to A-19.

B-1. A tangible, non-transitory, machine-readable medium storing instructions that when executed by one or more processors effectuate operations comprising: obtaining, with a computer system, a set of conditional statements, wherein: a conditional statement of the set of conditional statements is associated with an outcome subroutine that specifies operations in each of one or more branches of the conditional statement, a set of index values index the set of conditional statements, and a first outcome subroutine of a first conditional statement of the set of conditional statements uses a first index value of the set of index values, wherein the first index value is associated with a second conditional statement of the set of conditional statements; executing, with the computer system, a program instance of an application based on the set of conditional statements, wherein program state data of the program instance comprises: a set of vertices and a set of directed graph edges, wherein each of the set of vertices comprises a identifier value and is associated with one of the set of conditional statements, and wherein each of the set of directed graph edges associates a pair of the set of vertices and a direction from a tail vertex of the pair to a head vertex of the pair, a set of statuses, wherein each of the set of statuses is associated with one of the set of vertices, a set of vertex categories, wherein each of the set of vertex categories is a category value and is associated with a respective vertex of the set of vertices and is determined based a respective conditional statement of the respective vertex, and a set of scores, wherein each respective score of the set of scores is associated with a respective vertex and is based a respective conditional statement of the respective vertex; updating, with the computer system, the program state data based on a set of inputs comprising a first input, wherein updating the program state data comprises: modifying a status of a first vertex of the set of vertices based on the first input, updating a vertex adjacent to the first vertex; and determining, with the computer system, an outcome score based on the set of scores after updating the program state data.

B-2. The medium of embodiment B-1, wherein the status is a first status, and wherein updating the program state data comprises updating the program state data based on the first status, and wherein the operations further comprise: modifying a second status of a second vertex of the set of vertices based on a second input; updating a third vertex adjacent to the second vertex, wherein determining the outcome score comprises determining the outcome score after updating the third vertex.

B-3. The medium of embodiment B-2, wherein the operations further comprise determining the first input based on a probability value associated with one of the set of vertex categories.

B-4. The medium of any of embodiments B-2 to B-3, wherein the outcome score is a first outcome score, and wherein the program state data is in a first state before modifying the program state data, and wherein the operations further comprise: updating a neural network parameter after updating the third vertex based on the first outcome score, wherein the neural network parameter comprises a set of probability values assigned to each of a subset of vertices of the set of vertices; determining a third input based on the neural network parameter; updating the program state data that is in the first state based on the third input; and determining a second outcome score after updating the program state data based on the third input.

B-5. The medium of any of embodiments B-1 to B-4, wherein executing the program instance comprises executing the program instance during a first iteration, and wherein the set of inputs is a first set of inputs, and wherein the outcome score is a first outcome score, and wherein the program state data is in a first state before modifying the program state data, and wherein the operations further comprise: executing the program instance during a second iteration by updating the program state data based on a second set of inputs, wherein the program state data is in the first state before updating the program state data based on the second set of inputs; determining a second outcome score based on the second set of inputs; and determining a multi-iteration score based on the first outcome score and the second outcome score.

B-6. The medium of embodiment B-5, wherein the operations further comprise: acquiring a third score; and determining a possible event based the third score using a probability distribution, wherein the probability distribution is based on the multi-iteration score.

B-7. The medium of embodiment B-6, wherein determining the possible event comprises using a neural network that is trained using inputs based on the first outcome score and the second outcome score, and wherein the neural network is trained using a training output based on the first set of inputs and the second set of inputs.

B-8. The medium of any of embodiments B-5 to B-7, wherein: the first set of inputs is associated with a first weighting value; the second set of inputs is associated with a second weighting value; and determining the multi-iteration score is based on the first weighting value and the second weighting value.

B-9. The medium of any of embodiments B-5 to B-8, the operations further comprising determining a probability distribution function based on the multi-iteration score.

B-10. The medium of any of embodiments B-1 to B-9, wherein modifying the status of the first vertex comprises determining a set of events, wherein each of the set of events satisfies a condition of the set of conditional statements.

B-11. The medium of any of embodiments B-1 to B-10, wherein acquiring the set of conditional statements comprises: acquiring an event; for a respective self-executing protocol of a plurality of self-executing protocols, determining whether the event satisfies a condition associated with the respective self-executing protocol; and acquiring the set of conditional statements associated with the respective self-executing protocol in response to the event satisfying the condition associated with the respective self-executing protocol.

B-12. The medium of any of embodiments B-1 to B-11, wherein acquiring the set of conditional statements comprises: acquiring an entity identifier; for a respective self-executing protocol of a plurality of self-executing protocols, determining whether the entity identifier is in a respective set of entities associated with the respective self-executing protocol; and acquiring the set of conditional statements associated with the respective self-executing protocol in response to the entity identifier being in the respective set of entities associated with the respective self-executing protocol.

B-13. The medium of any of embodiments B-1 to B-12, the operations further comprising: acquiring a first entity identifier and a second entity identifier; selecting a first set of self-executing protocols from a plurality of self-executing protocols, wherein each of the first set of self-executing protocols comprises a first set of entities that comprises the first entity identifier; determining a second set of self-executing protocols from the plurality of self-executing protocols, wherein each of the second set of self-executing protocols comprises a second set of entities that comprises the second entity identifier; and determining a set of intermediary entities, wherein each of the set of intermediary entities is in a set of entities of the first set of self-executing protocols, and wherein each of the set of intermediary entities is in a set of entities of the second set of self-executing protocols.

B-14. The medium of any of embodiments B-1 to B-13, wherein modifying the status of the first vertex comprises setting a first status to indicate that a first entity fails to transfer a score to a second entity.

B-15. The medium of any of embodiments B-1 to B-14, the operations further comprising: detecting a pattern based on a plurality of the set of vertices and a plurality of the set of directed graph edges; and sending a message indicating that the pattern is detected.

B-16. The medium of any of embodiments B-1 to B-15, the operations further comprising determining a measure of central tendency based on the outcome score.

B-17. The medium of any of embodiments B-1 to B-16, the operations further comprising determining a kurtosis value based on the outcome score, wherein the kurtosis value correlates with a ratio of a first value and a second value, wherein the first value is based on a measure of central tendency, and wherein the second value is based on a measure of dispersion.

B-18. The medium of any of embodiments B-1 to B-17, the operations further comprising: acquiring an event message via an application protocol interface; determining a first set of events based on the event message, wherein the set of inputs does not include the first set of events; and updating the program state data based on the first set of events, wherein the program state data is updated based on the set of inputs after the program state data is updated with the first set of events.

B-19. The medium of any of embodiments B-1 to B-18, the operations further comprising: modifying a first status of a first vertex of the set of vertices to indicate that the first vertex is triggered; modifying a second status of a second vertex of the set of vertices to indicate that the second vertex is triggered; and in response to the first status and the second status being modified to indicate they are triggered, triggering a third vertex that is adjacent to the first vertex and the second vertex.

B-20. A method comprising: acquiring a set of conditional statements, wherein: a conditional statement of the set of conditional statements is associated with an outcome subroutine and an index value of a set of index values, and a first outcome subroutine of a first conditional statement of the set of conditional statements uses a first index value of the set of index values, wherein the first index value is associated with a second conditional statement of the set of conditional statements; executing a program instance of an application based on the set of conditional statements, wherein program state data of the program instance comprises: a set of vertices and a set of directed graph edges, wherein each of the set of vertices comprises a identifier value and is associated with one of the set of conditional statements, and wherein each of the set of directed graph edges associates a pair of the set of vertices and a direction from a tail vertex of the pair to a head vertex of the pair, a set of statuses, wherein each of the set of statuses is associated with one of the set of vertices, and a set of vertex categories, wherein each of the set of vertex categories is a category value and is associated with a respective vertex of the set of vertices and is determined based a respective conditional statement of the respective vertex, a set of scores, wherein each respective score of the set of scores is associated with a respective vertex and is based a respective conditional statement of the respective vertex; updating the program state data based on a set of inputs comprising a first input, wherein updating the program state data comprises: modifying a status of a first vertex of the set of vertices based on the first input, updating a vertex adjacent to the first vertex; and determining an outcome score based on the set of scores after updating the program state data.

B-21. A tangible, non-transitory, machine-readable medium storing instructions that when executed by one or more processors effectuate operations comprising: obtaining, with one or more processors, identifiers of a plurality of entities; obtaining, with one or more processors, a plurality of symbolic artificial intelligence (AI) models, wherein: each of the plurality of symbolic AI models is configured to produce outputs responsive to inputs based on events caused by at least one of the plurality of entities, at least some of the plurality of entities are associated with outputs of respective symbolic AI models, and at least some of the plurality of entities have respective scores corresponding to the respective outputs of the symbolic AI models; obtaining, with one or more processors, a plurality of scenarios, wherein: each scenario comprises simulated inputs corresponding to one or more simulated events, and at least some scenarios comprise a plurality of simulated inputs; determining, with one or more processors, a population of scores of a given entity among the plurality of entities, wherein respective members of the population of scores correspond to respective outputs of the plurality of symbolic AI models, and wherein the respective outputs correspond to respective scenarios among the plurality of scenarios; and storing, with one or more processors, the population of scores in memory.

B-22. The medium of embodiment B-21, wherein at least one of the plurality of symbolic AI models comprises: a set of vertices and a set of directed graph edges, wherein each of the set of vertices comprises a identifier value and is associated with one of a set of conditional statements, and wherein each of the set of directed graph edges associates a pair of the set of vertices and a direction from a tail vertex of the pair to a head vertex of the pair; a set of statuses, wherein each of the set of statuses is associated with one of the set of vertices; a set of vertex categories, wherein each of the set of vertex categories is a category value and is associated with a respective vertex of the set of vertices and is determined based a respective conditional statement of the respective vertex; and a set of scores, wherein each respective score of the set of scores is associated with a respective vertex and is based a respective conditional statement of the respective vertex.

B-23. The medium of any of embodiments B-21 to B-22, wherein obtaining the plurality of scenarios comprises: determining a first simulated input for a first model of the plurality of symbolic AI models based on a multi-iteration score associated with the first model, wherein the first model is in a first state before updating the first model based on the first simulated input; update the first model based on the first simulated input to advance the first model to a second state, wherein the second state is different from the first state; determine a second input, wherein the second input may be selected based on scores associated with each of a set of possible states associated with the first state; update the first model when it is in the second state based on the second input to advance the second model to a third state, wherein the third state is different from the first state and the second state, and wherein the third state satisfies a terminal state criterion, and wherein a terminal state value is associated with the third state; and update the score associated with the first model based on the terminal state value; and determining a scenario of the plurality of scenarios based on the score.

B-24. The medium of embodiment B-23, wherein determining a first set of simulated inputs comprises determining the first set of inputs based on a first term and a second term, wherein the first term is based on a count of simulations executed that started from the first state and the second term is based on a score value associated with the third state.

B-25. The medium of any of embodiments B-21 to B-24, wherein determining the population of scores comprises using a convolutional neural network to determine a respective score based on values in a respective model of the symbolic AI models.

B-26. The medium of any of embodiments B-21 to B-25, the operations further comprising: fuzzifying the population of scores to provide a set of fuzzified inputs, wherein fuzzifying the outputs comprises using a membership function to determine a degree of membership, and wherein the fuzzified inputs comprises the degree of membership; determine a fuzzified outcome score based on the degree of membership using an inference engine, wherein the inference comprises a set of executable rules that may be matched to the fuzzified inputs; and determine a label associated with a smart contract based on the fuzzified outcome score.

B-27. The medium of any of embodiments B-21 to B-26, wherein obtaining the plurality of scenarios comprises: determining a first scenario for a first symbolic AI model of the plurality of AI models based on a first set of weights corresponding to each of a set of categories, wherein the first symbolic AI model comprises a first plurality of the set of categories; and determining a second scenario for a second symbolic AI model of the plurality of AI models based on the first set of weights, wherein the second symbolic AI model comprises a second plurality of the set of categories.

B-28. The medium of any of embodiments B-21 to B-27, wherein determining the simulated input comprises using a decision tree, wherein the decision tree comprises a first tree node and a second tree node, and wherein the first tree node is associated with a first score, and wherein the first tree node is associated with a second score and wherein the operations further comprise: determining whether the first score is greater than a second score; and in response to the first score being greater than the second score, determining the simulated input based on a value associated with the first tree node.

B-29. The medium of any of embodiments B-21 to B-28, the operations further comprising updating a set of parameters of a neural network based on the population of scores, wherein the neural network provides a weighting value associated with a decision to cancel a self-executing protocol.

B-30. The medium of embodiment B-29, wherein determining the population of scores of a given entity among the plurality of entities comprises determining a sum of the scores.

B-31. A method to perform any of the operations of embodiments B-21 to B-30.

B-32. A method to perform any of the operations of embodiments B-1 to B-19.

B-33. A system, comprising: one or more processors; and memory storing instructions that when executed by the processors cause the processors to effectuate operations comprising: the operations of any one of embodiments B-1 to B-19.

B-34. A system, comprising: one or more processors; and memory storing instructions that when executed by the processors cause the processors to effectuate operations comprising: the operations of any one of embodiments B-21 to B-30.

C-1. A tangible, non-transitory, machine-readable medium storing instructions that, when executed by a computing system, effectuate operations comprising: obtaining, with a computing system, program state of a smart contract, wherein the program state encodes a directed graph, the directed graph comprising: a set of vertices, and a set of directed edges connecting respective pairs of vertices among the set of vertices, wherein the program state includes a set of conditional statements and a set of entities; obtaining, with the computing system, a request encoding a set of conditional statement parameters corresponding to an amendment to the smart contract; determining, with the computing system, a first subset of vertices in the directed graph, wherein each respective vertex of the first subset causes a state change of the program state in response to a respective conditional statement associated with the respective vertex being satisfied; selecting, with the computing system, a second subset of the first subset based on the set of conditional statement parameters encoded in the request; determining, with the computing system, a set of selected entities based on the second subset; determining, with the computing system, whether a set of criteria associated with the set of selected entities is satisfied; updating, with the computing system, the set of conditional statement parameters based on the set of conditional statements in response to a determination that the set of criteria associated with the set of selected entities is satisfied; updating, with the computing system, the second subset based on the updated set of conditional statements; and storing, with the computing system, the program state in storage memory after updating the second subset.

C-2. The medium of embodiment C-1, wherein: the vertices are norm vertices; the first subset is a set of active vertices; the second subset is a set of target vertices; the set of entities include parties to the smart contract; and updating the set of conditional statements comprises: determining an affected conditional statement based on the request, wherein the set of target vertices comprises a reference that is associated with the affected conditional statement; setting an indicator associated with the affected conditional statement to indicate that the affected conditional statement is deprecated; generating a new conditional statement based on the set of conditional statement parameters; and setting the reference to be associated with the new conditional statement.

C-3. The medium of any of embodiments C-1 to C-2, wherein: the directed graph of the program state is stored in persistent memory and comprises a first serialized array of vertices and a second serialized array of vertices; a target vertex of the set of target vertices is a vertex of the first serialized array of vertices and not a vertex of the second serialized array of vertices; and updating the set of target vertices comprises: deserializing the first serialized array of vertices to generate a first deserialized directed graph in a non-persistent memory, wherein the first serialized array of vertices comprises an identifier of the target vertex, and wherein the first deserialized directed graph comprises an adjacency matrix or an adjacency list, and wherein the second serialized array of vertices is not concurrently deserialized, and serializing the first deserialized directed graph in the non-persistent memory to determine an updated first serialized array of vertices, and storing the updated first serialized array of vertices in the persistent memory.

C-4. The medium of any of embodiments C-1 to C-3, wherein the request comprises an entity identifier, and wherein the operations further comprises adding the entity identifier to a set of entities associated with the program state.

C-5. The medium of any of embodiments C-1 to C-4, wherein: the request comprises a first entity identifier associated with a first entity; a first conditional statement of the set of conditional statements comprises a condition that a second entity allocate a resource to a third entity, wherein a second entity identifier is associated with the second entity; and the operations further comprises: determining an entity field used by the first conditional statement, wherein the entity field comprises the second entity identifier, and updating the entity field to comprise the first entity identifier.

C-6. The medium of any of embodiments C-1 to C-5, wherein updating the set of target vertices comprises deleting a first directed edge from the set of directed edges, wherein the first directed edge associates a target vertex of the set of target vertices with a second vertex of the directed graph.

C-7. The medium of any of embodiments C-1 to C-6, the operations further comprising: obtaining a set of confirmation messages from each entity of the set of selected entities, wherein the set of confirmation messages comprises a set of passkey values, and wherein each respective passkey value of the set of passkey values is associated with a respective entity of the set of selected entities; and wherein determining that the set of criteria associated with the set of selected entities is satisfied comprises determining that each respective passkey value of the set of passkey values matches with a respective stored passkey value of a set of stored passkey values.

C-8. The medium of any of embodiments C-1 to C-7, wherein the operations further comprise: determining a first graph structure based on the request, wherein the first graph structure comprises the set of directed edges and a set of logical categories associated with each vertex of the first graph structure; determining whether the first graph structure is identical to a second graph structure of the directed graph; and in response to a determination that the first graph structure is different from the second graph structure with respect to a number of vertices or number of edges, adding a new vertex to the set of vertices based on the request in persistent memory.

C-9. The medium of any of embodiments C-1 to C-8, the operations further comprising: determining a simulated modified program state, wherein determining the simulated modified program state comprises updating a version of the set of conditional statements, and wherein the simulated modified program state comprises the version of the set of conditional statements; determining a set of simulated events, wherein the set of simulated events are determined occur in sequence based on an associated set of occurrence times; and determining a set of outcome program states based on the simulated modified program state and the set of simulated events.

F-1. A tangible, non-transitory, machine-readable medium storing instructions that, when executed by a computing system, effectuate operations comprising: obtaining, with a computing system, a set of conditions; obtaining, with the computing system, a first cross-program entity identifier of a first entity, wherein the first cross-program entity identifier is unique amongst a set of cross-program entity identifiers of a decentralized computing platform; obtaining, with the computing system, a set of directed graphs of a set of self-executing protocols comprising a first self-executing protocol and a second self-executing protocol that are executed on the decentralized computing platform, wherein: each respective self-executing protocol of the set of self-executing protocols comprises data of a respective directed graph of the respective self-executing protocol, and the first cross-program entity identifier is associated with a first program-specific entity identifier of the first self-executing protocol and a second program-specific entity identifier of the second self-executing protocol; determining, with the computing system, that the set of conditions is applicable to the first entity based on the first cross-program entity identifier; determining, with the computing system, whether the set of conditions are satisfied based on whether a graph portion associated with the set of directed graphs corresponds to a graph portion template of the set of conditions; and in response to a determination that the graph portion corresponds to the graph portion template, storing, with the computing system, an indication that the first entity violated the set of conditions in a profile of the first entity using the first cross-program entity identifier.

F-2. The medium of embodiment F-1, the operations further comprising: determining a first set of geographic locations associated with the first entity based on the first cross-program entity identifier; and determining whether the first set of geographic locations satisfies a first condition of the set of conditions based on whether the first set of geographic locations is within a geofence indicated by the first condition, wherein the indication indicates that the first entity violated the set of conditions based on whether the first set of geographic locations satisfies the first condition.

F-3. The medium of any of embodiments F-1 to F-2, the operations further comprising determining a second set of counterparty entities based on the set of self-executing protocols, wherein each counterparty entity of the set of counterparty entities is associated with a transaction with the first entity.

F-4. The medium of any of embodiments F-1 to F-3, wherein obtaining the set of conditions comprises: obtaining a governing document; determining a set of entity categories using a natural language processing model based on governing document; and determining a condition of the set of conditions based on the set of entity categories.

F-5. The medium of any of embodiments F-1 to F-4, the operations further comprising: obtaining a governing document; selecting a section of the governing document based on a text header indicated by a set of text sizes or text spacings; and determining a condition of the set of conditions based on the section of the governing document.

F-6. The medium of any of embodiments F-1 to F-5, the operations further comprising: obtaining a first profile associated with the first cross-program entity identifier; obtaining a natural language document, wherein the natural language document comprises a verifying agent identifier and an entity name associated with the first cross-program entity identifier; using a natural language processing model to parse the natural language document to determine the verifying agent identifier and the entity name; sending a first message comprising the entity name to an application program interface (API) of a third-party entity based on the verifying agent identifier; and obtaining a second message from the third-party entity indicating that the entity name is valid and, in response, setting the first profile associated with the first cross-program entity identifier as a verified profile.

F-7. The medium of any of embodiments F-1 to F-6, the operations further comprising sending a notification message to a second entity indicating that the first entity failed the set of conditions.

F-8. The medium of any of embodiments F-1 to F-7, the operations further comprising: sending a first message comprising data of a pending transaction to a third entity, wherein a participant of the pending transaction is associated with the first cross-program entity identifier; obtaining a second message from the third entity, wherein the second message indicates that the third entity has verified the pending transaction; and in response to receiving the second message, storing a value indicating that the transaction was verified by the third entity on a distributed, tamper-evident data structure.

F-9. The medium of any of embodiments F-1 to F-8, the operations further comprising: determining, after a threshold duration of time after determining whether the set of conditions are satisfied, whether the set of conditions are satisfied a second time; and in response to a determination that the set of conditions are satisfied, setting a value to indicate that a resource transfer or allocation of a pending transaction is permitted, wherein a participant of the pending transaction is associated with the first cross-program entity identifier.

F-10. The medium of any of embodiments F-1 to F-9, the operations further comprising: determining that a variable of the set of conditions is not stored in data of a smart self-executing protocol; compute a value for the variable using a function encoded in the set of conditions; determining whether a the value satisfies a threshold value of a first condition; and in response to a determination that the value satisfies the threshold value, storing a value indicating that the first entity satisfies the first condition to a persistent storage.

F-11. The medium of any of embodiments F-1 to F-10, the operations further comprising: obtaining an additional governing document; updating the set of conditions based on the additional governing document; and determining whether the updated set of conditions is satisfied.

F-12. The medium of any of embodiments F-1 to F-11, wherein determining whether the set of conditions is satisfied further comprises: determining a first score change of the first self-executing protocol; determining that the first score change is associated with the first entity based on an association between the first program-specific entity identifier and the first cross-program entity identifier; determining a second score change of the second self-executing protocol; determining that the second score change is associated with the first entity based on an association between the second program-specific entity identifier and the first cross-program entity identifier; and determining whether the first entity satisfies the set of conditions based on the first score change and the second score change.

F-13. The medium of any of embodiments F-1 to F-12, the operations further comprising: determine a summation based on the first score change and the second score change, wherein determining whether the set of conditions is satisfied comprises determining whether the summation satisfies a threshold value.

F-14. The medium of any of embodiments F-1 to F-13, wherein a set of entities participating in the first self-executing protocol do not have permission to view the first cross-program entity identifier and the computer system prevents such viewing responsive to the lack of permission.

F-15. The medium of any of embodiments F-1 to F-14, the operations further comprising: determining whether a first value of a transaction satisfies a warning threshold, wherein the warning threshold is based on a condition of the set of conditions; and sending a message indicating that the warning threshold has been satisfied to the first entity.

F-16. The medium of any of embodiments F-1 to F-15, the operations further comprising: determining a hierarchy of conditions based on a set of precedence values associated with the set of conditions; determining a pair of conflicting conditions based on the set of conditions and a difference in labels between category labels of the set of conditions, wherein each category label of a respective condition of the set of conditions is one of a set of mutually exclusive category labels; and determining an overriding condition based on the hierarchy of governing conditions, wherein the overriding condition is one of the pair of conflicting conditions, and wherein the overriding condition is indicated to take precedence over the other condition of the pair of conflicting conditions.

F-17. The medium of any of embodiments F-1 to F-16, the operations further comprising: determining that a second cross-program entity identifier is associated with the first entity; determining that a condition is associated with the second cross-program entity identifier; generating an association between the first cross-program entity identifier and the second cross-program entity identifier in a database of cross-program entity identifiers; and persisting the database of cross-program entity identifiers to a persistent storage of the computing system.

F-18. The medium of embodiment F-17, the operations further comprising steps for obtaining the set of conditions.

F-19. The medium of any of embodiments F-1 to F-18, the operations further comprising steps for determining whether the set of conditions is violated.

F-20. A method to perform the operations of any of the embodiments F-1 to F-19.

F-21. A system, comprising: one or more processors; and memory storing instructions that when executed by the processors cause the processors to effectuate operations comprising: the operations of any one of embodiments F-1 to F-19.

G-1. A tangible, non-transitory, machine-readable medium storing instructions that, when executed by a computing system, effectuate operations comprising: executing, with one or more processors, an instance of an application, wherein: program state of the instance of the application comprises a set of vertices and a set of directed graph edges, each vertex of the set of vertices comprises an identifier and a category label of a set of mutually exclusive category labels, and each of the set of directed graph edges associates a pair of the set of vertices and a direction from a tail vertex of the pair to a head vertex of the pair; serializing, with one or more processors, the set of vertices in a serialized data format and storing a record comprising the serialized set of vertices in a first persistent storage of a first computing device of a plurality of computing devices communicatively coupled to each other via a network; distributing, with one or more processors, the serialized set of vertices to a second computing device of the plurality of computing devices; deserializing, with one or more processors, the serialized set of vertices with the second computing device to generate a second instance of a directed graph, wherein the second instance of the directed graph encodes the set of vertices and the set of directed graph edges in non-serialized data format; storing, with one or more processors, the second instance of the directed graph in a second persistent storage, wherein the second persistent storage is a local persistent storage of the second computing device; receiving, with one or more processors, a message encoding a graph portion template, wherein the graph portion template comprises a first vertex template and an edge template, and wherein the first vertex template is associated with a first category label of the set of mutually exclusive category labels, and wherein the edge template specifies an edge direction to or from a vertex matching the first vertex template; querying, with one or more processors, a data structure of the second persistent storage based on the graph portion template to retrieve a subset of vertices encoded in the second instance of the directed graph; computing, with one or more processors, a response value based on the subset of vertices; and sending, with one or more processors, a response comprising the response value from the second computing device to a response destination indicated by the message.

G-2. The medium of embodiment G-1, wherein the computing the response value comprises: determining a set of entities based on the subset of vertices; determining whether a data retrieval criterion of the set of entities is satisfied; and wherein computing the response value comprises computing the response value in response to a determination that the data retrieval criterion is satisfied.

G-3. The medium of any of embodiments G-1 to G-2, wherein the message comprises instructions to update the directed graph, the operations comprising: storing an updated directed graph in the second persistent storage based on the message; determining a first update confirmation value associated with the updated directed graph; receiving a second update confirmation value at the second computing device; determining whether the first update confirmation value satisfies a set of storage update criteria based on the second update confirmation value; and in response to a determination that the first update confirmation value satisfies the set of storage update criteria, set an indicator to indicate that the updated directed graph is valid in the second persistent storage.

G-4. The medium of any of embodiments G-1 to G-3, the operations further comprising: determining whether a graph portion of the directed graph matches a graph portion template of a library of graph portion templates; and in response to a determination that the graph portion of the directed graph matches the graph portion template, associate an index value with a first vertex of the graph portion, wherein the first vertex is retrievable with the index value.

G-5. The medium of any of embodiments G-1 to G-4, the operations further comprising: selecting a plurality of directed graphs stored in the second persistent storage based on the message; for each respective directed graph of the plurality of directed graphs, determining a respective subset of vertices associated with the respective directed graph; and wherein determining the response value based on the respective subsets of vertices of the plurality of directed graphs.

G-6. The medium of any of embodiments G-1 to G-5, the operations further comprising: detecting a state-updating event associated with an update to program state, wherein the state-updating event causes a change in the set of vertices or a status associated with the set of vertices; updating a historical sequence of records based on the state-updating event, wherein each respective vertex of the historical sequence of records is associated with a respective state-updating event; and storing the historical sequence of records in the second persistent storage, wherein each vertex of the historical sequence of records is associated with a respective version of the directed graph.

G-7. The medium of any of embodiments G-1 to G-6, wherein the graph portion template comprises a plurality of vertex templates and a plurality of directed graph edges associating the plurality of vertex templates with each other.

G-8. The medium of any of embodiments G-1 to G-7, wherein the plurality of computing devices is a first plurality of computing devices, the operations further comprising: selecting a subset of nodes from the plurality of computing devices, where each respective node of the subset of nodes corresponds with a respective computing device of the plurality of computing devices, wherein the subset of nodes is fewer in number than the total number of nodes of the plurality of computing devices; and generating, with at least one the subset of nodes, a block of a sequence of blocks stored in the first persistent storage.

G-9. The medium of any of embodiments G-1 to G-8, wherein the first computing device validates an update to program state based on a consensus voting process involving other computing devices in the plurality of computing devices.

G-10. The medium of any of embodiments G-1 to G-9, wherein the directed graph is a first directed graph, the operation further comprising: determining a predicted directed graph based on the first directed graph; and storing the predicted directed graph in association with the first directed graph.

G-11. The medium of any of embodiments G-1 to G-10, the operations further comprising validating the directed graph at the second computing device based on a signature value provided by the first computing device.

G-12. The medium of any of embodiments G-1 to G-11, the operations further comprising storing a third instance of the directed graph in a third persistent storage, wherein the third persistent storage is a persistent storage of a cloud computing server.

G-13. The medium of any of embodiments G-1 to G-12, wherein the second persistent storage is a persistent storage of a peer-to-peer data-sharing network comprising a second plurality of computing devices, wherein data stored on a first peer of the second plurality of computing devices is distributed to other peers of the second plurality of computing devices.

G-14. The medium of any of embodiments G-1 to G-13, the operations further comprising storing a natural language document in association with the directed graph in the data structure of the second persistent storage.

G-15. The medium of any of embodiments G-1 to G-14, the operations comprising steps for serializing, steps for storing, and steps for deserializing the directed graph.

G-16. The medium of any of embodiments G-1 to G-15, the operations comprising steps for updating program state of the application.

G-17. The medium of any of embodiments G-1 to G-16, the operations further comprising: generating a plurality of previous versions of the directed graph based on a sequence of blocks stored in the first persistent storage; and storing the plurality of previous versions in the second persistent storage.

G-18. The medium of any of embodiments G-1 to G-17, wherein storing the second instance of the directed graph in the second persistent storage further comprises: determining an updated vertex of the second instance of the directed graph; and storing a score change or a set of entities associated with the updated vertex in the data structure of the second persistent storage.

G-19. The medium of any of embodiments G-1 to G-18, wherein computing the response value based on the subset of vertices comprises: determining a set of conditional statements associated with the subset of vertices; determining a set of scores based on the set of conditional statements; and determining the response value based on a sum of the set of scores.

G-20. A method to perform the operations of any of the embodiments G-1 to G-19.

G-21. A system, comprising: one or more processors; and memory storing instructions that when executed by the processors cause the processors to effectuate operations comprising: the operations of any one of embodiments G-1 to G-19.

J-1. A tangible, non-transitory, machine-readable medium storing instructions that, when executed by a computer system, effectuate operations comprising: obtaining, with a computer system, program state of a self-executing protocol, wherein the program state comprises: a set of conditional statements; a first identifier of a first entity; and a directed graph, the directed graph comprising a set of vertices and a set of directed edges connecting respective pairs of vertices among the set of vertices, wherein each respective vertex of the set of vertices is associated with a respective category label of a set of mutually exclusive categories; receiving, at an application program interface of the computer system, an event message comprising a set of parameters; selecting, with the computer system, a first subset of vertices triggered by the event message based on the set of parameters; selecting, with the computer system, a second subset of vertices based on the first subset of vertices, wherein the second subset of vertices is associated with the first subset of vertices via the set of directed edges; determining, with the computer system, an aggregated parameter based on a subset of conditional statements, wherein each respective conditional statement of the subset of conditional statements is associated with a respective vertex of the second subset of vertices, and wherein the respective vertex is associated with a first category label of the set of mutually exclusive categories that is associated to each of the other vertices associated with the subset of conditional statements; and storing, with the computer system, the aggregated parameter in memory.

J-2. The medium of embodiment J-1, the operations further comprising: determining whether the event message is valid using a set of validator nodes of a peer-to-peer network, wherein each node of the peer-to-peer network is communicatively coupled to at least one other node of the peer-to-peer network; in response to a determination that the event message is valid, distributing a validation message indicating that the event message is valid; and storing a value based on the event message on a tamper-evident, distributed ledger encoding records of a plurality of previous values in a directed acyclic graph of cryptographic hash pointers, wherein the tamper-evident, distributed ledger is stored on the peer-to-peer network.

J-3. The medium of embodiment J-2, wherein determining the first subset of vertices comprises determining the first subset of vertices at a first node of the peer-to-peer network before the validation message is received by the first node.

J-4. The medium of any of embodiments J-1 to J-3, wherein the program state further comprises a first identifier of a first entity, the operations further comprising: determining whether the event message is valid using a set of validator nodes of a peer-to-peer network; based on a determination that the event message is not valid, sending an issue notification to a node of the peer-to-peer network associated with the first entity, wherein the issue notification comprises an identifier of the event message.

J-5. The medium of any of embodiments J-1 to J-4, wherein the program state further comprises a first identifier of a first entity, the operations further comprising: determining a network path from a first node of a peer-to-peer network to a second node of the peer-to-peer network using a breadth first search, wherein: the first node received the event message before the second node, the second node is associated with the first entity, and the network path comprises a plurality of nodes of the peer-to-peer network; and sending data of the event message to the second node from the first node via the network path.

J-6. The medium of any of embodiments J-1 to J-5, wherein the event message is a first event message, the operations further comprising: receiving a second event message within a duration threshold before or after receiving the first event message; determining whether the second event message causes a vertex of the first subset of vertices to trigger; in response to a determination that the second event message causes the vertex of the first subset of vertices to trigger, obtaining a set of triggering parameters of the second event message, wherein the set of triggering parameters comprise values that satisfy a condition of the vertex; determining whether a first value of the first event message and a second value of the second event message differ with respect to the set of triggering parameters; and based on a determination that the first value matches the second value, updating a parameter associated with the second event message to indicate that the second event message is a duplicate event message.

J-7. The medium of any of embodiments J-1 to J-6, wherein the program state further comprises a first identifier of a first entity and an second identifier of a second entity, the operations further comprising: retrieving a private conditional statement associated with the first entity, wherein the private conditional statement is not stored in program state accessible to the second entity; and determining whether the private conditional statement is satisfied based on the first subset of vertices or the second subset of vertices.

J-8. The medium of any of embodiments J-1 to J-7, wherein a first stored value of the self-executing protocol is stored on a peer-to-peer network, and wherein a first node of the peer-to-peer network is permitted to access the first stored value of the program state, and wherein a second node of the peer-to-peer network is not permitted to access the first stored value.

J-9. The medium of any of embodiments J-1 to J-8, wherein determining the aggregated parameter comprises: determining that triggering a first vertex of a pair of vertices of the directed graph causes the cancellation of a second vertex of the pair of vertices of the directed graph, wherein the first vertex is associated with a first conditional statement and the second vertex is associated with a second conditional statement; selecting one of the pair parameters, the pair of parameters comprising a first parameter of the first conditional statement and a second parameter of the second conditional statement; and determining the aggregated parameter based on the first parameter.

J-10. The medium of any of embodiments J-1 to J-9, wherein the program state further comprises a first identifier of a first entity, and wherein the first entity is associated with an entity role, the operations further comprising selecting the first entity, wherein selecting the first entity comprises: selecting a vertex of the first subset of vertices based on the set of parameters; and selecting the first entity based on the entity role being associated with the vertex.

J-11. The medium of embodiment J-10, wherein a second entity is associated the entity role, the operations further comprising sending a second message to the second entity based on the second entity being associated with the entity role.

J-12. The medium of any of embodiments J-1 to J-11, wherein the program state further comprises a first identifier of a first entity, the operations further comprising: determining that the first entity is associated with an entity role; in response to a determination that the first entity is associated with the entity role, selecting a previous message from a history of messages based on the entity role; and sending the previous message to the first entity.

J-13. The medium of any of embodiments J-1 to J-12, the operations further comprising providing a user interface (UI), wherein vertices displayed in the UI are colored based on color associations with category labels associated with the vertices, and wherein each respective category label of the set of mutually exclusive categories is associated with a different color.

J-14. The medium of any of embodiments J-1 to J-13, wherein the program state further comprises a first identifier of a first entity, the operations further comprising: determining whether a first confirmation key associated with a first representative of the first entity is received; determining whether a second confirmation key associated with a second representative the first entity is received; and in response to a determination that the first confirmation key and the second confirmation key is received, storing the first confirmation key and the second confirmation key in data storage in association with a record of a transaction between a pair entities comprising the first entity.

J-15. The medium of any of embodiments J-1 to J-14, wherein the program state further comprises a first identifier of a first entity, the operations further comprising; obtaining a score associated with the first entity, wherein the score is associated with a resource type; and updating the score based on the set of parameters, wherein the set of parameters comprises the resource type.

J-16. The medium of any of embodiments J-1 to J-15, wherein determining the aggregated parameter comprises determining a sum of values, wherein each respective value used to determine the sum of values is encoded in a respective conditional statement of the subset of conditional statements.

J-17. The medium of any of embodiments J-1 to J-16, the operations further comprising providing a user interface (UI), wherein the UI visually indicates the second subset of vertices based on a difference in color, difference in size, or difference in animation between the second subset of vertices and other vertices of the set of vertices.

J-18. The medium of any of embodiments J-1 to J-17, wherein determining the first subset of vertices comprises steps for determining the first subset of vertices.

J-19. The medium of any of embodiments J-1 to J-18, wherein determining the aggregated parameter comprises steps for determining the aggregated parameter.

J-20. A method to perform the operations of any of the embodiments J-1 to J-19.

J-21. A system comprising: one or more processors; and memory storing instructions that, when executed by at least one of the one or more processors, causes at least one of the one or more processors to effectuate any of the operations of embodiments J-1 to J-19.

K-1. A tangible, non-transitory, machine-readable medium storing instructions that, when executed by a computer system, effectuate operations comprising: receiving, with a computer system, a request via an application program interface (API), wherein the request comprises a callback address; determining, with the computer system, a query based on a set of query parameters; determining, with the computer system, a target graph portion template based on the query; searching, with the computer system, a set of directed graphs to determine a set of graph portions based on the query, where each of the set of graph portions match the target graph portion template, and wherein each respective directed graph of the set of directed graphs comprises: a set of vertices, wherein each respective vertex of the set of vertices is associated with a respective category label of a set of mutually exclusive categories, and a set of directed edges connecting respective pairs of vertices among the set of vertices; selecting, with the computer system, a set of event records, wherein each respective event records of the set of event records is indicated to occur before or during a vertex of a respective graph portion matching the target graph portion template; and sending, with the computer system, a value of the set of event records to the callback address.

K-2. The medium of embodiment K-1, wherein the query is associated with a first entity, the operations further comprising determining the set of related entities of the first entity, wherein each respective entity of the set of related entities is indicated to have had a transaction with the first entity.

K-3. The medium of any of embodiments K-1 to K-2, the operations further comprising determining whether the target graph portion template is stored in a library of graph portion templates, wherein: the library of graph portion templates comprises a graph database; a respective record of the graph database is associated with a respective graph portion template, and a respective identifier of the respective record comprises a respective set of vertices and a respective set of edges associating the respective set of vertices.

K-4. The medium of any of embodiments K-1 to K-3, the operations further comprising: determining whether a candidate graph portion matches with a graph portion template; updating a count associated with the graph portion template in a database based a determination that the candidate graph portion satisfies the graph portion template.

K-5. The medium of any of embodiments K-1 to K-4, the operations further comprising: determining whether the target graph portion template matches with a graph portion template stored in a library of graph portion templates; and in response to a determination that the target graph portion template does not matches the graph portion template stored in the library of graph portion templates, update the library of graph portion templates based on the target graph portion template.

K-6. The medium of any of embodiments K-1 to K-5, wherein the query is a first query, the operations further comprising: determining whether results of a set of previous searches based on a preceding query have been made, where the first query occurs after the preceding query; determining a first search time based on the preceding query, wherein the first search time indicates a time of occurrence for the set of previous searches; and modifying the query based on the first search time.

K-7. The medium of any of embodiments K-1 to K-6, wherein the set of vertices are encoded as a serialized array of vertices, and wherein determining a set of graph portions comprises: deserializing the serialized array of vertices to generate a first directed graph in a non-persistent memory, wherein the first directed graph encodes the set of vertices, set of entities, and set of directed edges; determining a first graph portion based on the first directed graph, wherein selecting the set of graph portions comprises selecting the first graph portion.

K-8. The medium of any of embodiments K-1 to K-7, wherein: a directed graph of the set of directed graphs is stored on a tamper-evident, distributed ledger encoding records of a plurality of previous values in a directed acyclic graph of cryptographic hash pointers, wherein the tamper-evident, distributed ledger is stored on a peer-to-peer network; each record comprises a relational database record, the relational database record comprising a balanced search tree (b-tree); and a set of root values of the b-tree comprise identifiers associated with vertices of the directed graph or graph portions of the directed graph.

K-9. The medium of embodiment K-8, the operations further comprising determining whether the query comprises at least one of a first set of query parameters, wherein searching through the set of directed graphs comprises using the b-tree in response to a determination that the query comprises at least one of the first set of query parameters.

K-10. The medium of any of embodiments K-1 to K-9, the operations further comprising: wherein each respective directed graph of the set of directed graphs is stored on a respective tamper-evident, distributed ledger encoding records of a plurality of previous values in a directed acyclic graph of cryptographic hash pointers, wherein the tamper-evident, distributed ledger is stored on a peer-to-peer network; storing a first version of a first directed graph of the set of directed graphs on a set of data centers, wherein the set of data centers does not use at least one peer node of the peer-to-peer network; and wherein searching through the set of directed graphs comprises searching through the first version of the first directed graph stored on the set of data centers.

K-11. The medium of embodiment K-10, wherein the set of data centers is a first set of data centers, the operation further comprising: storing a second version of the first directed graph on a second set of data centers, wherein the second set of data centers is different from the first set of data centers; and determining whether the first version of the first directed graph is valid based on the second version of the first directed graph.

K-12. The medium of any of embodiments K-1 to K-11, wherein determining the query comprises: determining whether an entity satisfies an access criteria, wherein the request is received from the entity; and based on a determination that the entity satisfies the access criteria, update the entity.

K-13. The medium of any of embodiments K-1 to K-12, wherein determining the query comprises: determining whether the set of query parameters comprises a command; and incorporating the command into the query.

K-14. The medium of any of embodiments K-1 to K-13, wherein the request is a first request, the operations further comprising: receiving a second request; determining whether the second request is valid; and in response to a determination that the second request is not valid, sending a message indicating that the second request is invalid.

K-15. The medium of any of embodiments K-1 to K-14, the operations further comprising: wherein each respective directed graph of the set of directed graphs is stored on a respective tamper-evident, distributed ledger encoding records of a plurality of previous values in a directed acyclic graph of cryptographic hash pointers, wherein the tamper-evident, distributed ledger is stored on a peer-to-peer network; receiving the request at a first node of the peer-to-peer network; determining whether the request causes a database search; in response to a determination that the request causes a database search, sending the request to a second node; wherein searching through the set of directed graphs comprises performing the database search using the second node.

K-16. The medium of any of embodiments K-1 to K-15, wherein searching through the set of directed graphs comprises searching through a set of binary trees associated with the set of directed graphs.

K-17. The medium of any of embodiments K-1 to K-16, the operations further comprising determining whether the callback address is valid based on a set of permitted addresses.

K-18. The medium of any of embodiments K-1 to K-17, wherein searching through the set of directed graphs comprises steps for searching through the set of directed graphs.

K-19. The medium of any of embodiments K-1 to K-18, wherein determining the query comprises steps for determining the query.

K-20. A method to perform the operations of any of the embodiments K-1 to K-19.

K-21. A system comprising: one or more processors; and memory storing instructions that, when executed by at least one of the one or more processors, causes at least one of the one or more processors to effectuate any of the operations of embodiments K-1 to K-19.

What is claimed is:

1. A tangible, non-transitory, machine-readable medium storing instructions that, when executed by a computer system, effectuate operations comprising:
receiving, with a computer system, a request via an application program interface (API), wherein the request comprises a callback address;
determining, with the computer system, a query based on a set of query parameters, wherein determining the query comprises steps for determining the query;

determining, with the computer system, a target graph portion template based on the query;

searching, with the computer system, a set of directed graphs to determine a set of graph portions based on the query, where each of the set of graph portions match the target graph portion template, and wherein each respective directed graph of the set of directed graphs comprises:

a set of vertices, wherein each respective vertex of the set of vertices is associated with a respective category label of a set of mutually exclusive categories, and a set of directed edges connecting respective pairs of vertices among the set of vertices;

selecting, with the computer system, a set of event records, wherein each respective event records of the set of event records is indicated to occur before or during a vertex of a respective graph portion matching the target graph portion template; and sending, with the computer system, a value of the set of event records to the callback address, wherein:

the set of vertices are encoded as a serialized array of vertices, and wherein determining a set of graph portions comprises:

deserializing the serialized array of vertices to generate a first directed graph in a non-persistent memory, wherein the first directed graph encodes the set of vertices, set of entities, and set of directed edges; and determining a first graph portion based on the first directed graph, wherein selecting the set of graph portions comprises selecting the first graph portion; and a directed graph of the set of directed graphs is stored on a tamper-evident, distributed ledger encoding records of a plurality of previous values in a directed acyclic graph of cryptographic hash pointers, wherein the tamper-evident, distributed ledger is stored on a peer-to-peer network.

2. The medium of claim 1, wherein the query is associated with a first entity, the operations further comprising determining the set of related entities of the first entity, wherein each respective entity of the set of related entities is indicated to have had a transaction with the first entity.

3. The medium of claim 1, the operations further comprising determining whether the target graph portion template is stored in a library of graph portion templates, wherein:

the library of graph portion templates comprises a graph database;

a respective record of the graph database is associated with a respective graph portion template, and a respective identifier of the respective record comprises a respective set of vertices and a respective set of edges associating the respective set of vertices.

4. The medium of claim 1, the operations further comprising:

determining whether a candidate graph portion matches with a graph portion template;

updating a count associated with the graph portion template in a database based a determination that the candidate graph portion satisfies the graph portion template.

5. The medium of claim 1, the operations further comprising:

determining whether the target graph portion template matches with a graph portion template stored in a library of graph portion templates; and in response to a determination that the target graph portion template does not matches the graph portion template stored in the library of graph portion templates, update the library of graph portion templates based on the target graph portion template.

6. The medium of claim 1, wherein the query is a first query, the operations further comprising:

determining whether results of a set of previous searches based on a preceding query have been made, where the first query occurs after the preceding query;

determining a first search time based on the preceding query, wherein the first search time indicates a time of occurrence for the set of previous searches; and modifying the query based on the first search time.

7. The medium of claim 1, wherein:

each record comprises a relational database record, the relational database record comprising a balanced search tree (b-tree); and a set of root values of the b-tree comprise identifiers associated with vertices of the directed graph or graph portions of the directed graph.

8. The medium of claim 1, the operations further comprising:

storing a first version of a first directed graph of the set of directed graphs on a set of data centers, wherein the set of data centers does not use at least one peer node of the peer-to-peer network; and wherein searching through the set of directed graphs comprises searching through the first version of the first directed graph stored on the set of data centers.

9. The medium of claim 8, wherein the set of data centers is a first set of data centers, the operation further comprising:

storing a second version of the first directed graph on a second set of data centers, wherein the second set of data centers is different from the first set of data centers; and determining whether the first version of the first directed graph is valid based on the second version of the first directed graph.

10. The medium of claim 1, wherein determining the query comprises:

determining whether an entity satisfies an access criteria, wherein the request is received from the entity; and based on a determination that the entity satisfies the access criteria, update the entity.

11. The medium of claim 1, wherein determining the query comprises:

determining whether the set of query parameters comprises a command; and incorporating the command into the query.

12. The medium of claim 1, wherein the request is a first request, the operations further comprising:

receiving a second request;

determining whether the second request is valid; and in response to a determination that the second request is not valid, sending a message indicating that the second request is invalid.

13. The medium of claim 1, the operations further comprising:

receiving the request at a first node of the peer-to-peer network;

determining whether the request causes a database search;

in response to a determination that the request causes a database search, sending the request to a second node;

wherein searching through the set of directed graphs comprises performing the database search using the second node.

14. The medium of claim 1, wherein searching through the set of directed graphs comprises searching through a set of binary trees associated with the set of directed graphs.

15. The medium of claim 1, the operations further comprising determining whether the callback address is valid based on a set of permitted addresses.

16. The medium of claim 1, wherein searching through the set of directed graphs comprises steps for searching through the set of directed graphs.

17. A method comprising:
- receiving, with a computer system, a request via an application program interface (API), wherein the request comprises a callback address;
- determining, with the computer system, a query based on a set of query parameters, wherein determining the query comprises steps for determining the query;
- determining, with the computer system, a target graph portion template based on the query;
- searching, with the computer system, a set of directed graphs to determine a set of graph portions based on the query, where each of the set of graph portions match the target graph portion template, and wherein each respective directed graph of the set of directed graphs comprises:
  - a set of vertices, wherein each respective vertex of the set of vertices is associated with a respective category label of a set of mutually exclusive categories, and
  - a set of directed edges connecting respective pairs of vertices among the set of vertices;
- selecting, with the computer system, a set of event records, wherein each respective event records of the set of event records is indicated to occur before or during a vertex of a respective graph portion matching the target graph portion template; and
- sending, with the computer system, a value of the set of event records to the callback address, wherein:
  - the set of vertices are encoded as a serialized array of vertices, and wherein determining a set of graph portions comprises:
    - deserializing the serialized array of vertices to generate a first directed graph in a non-persistent memory, wherein the first directed graph encodes the set of vertices, set of entities, and set of directed edges; and
    - determining a first graph portion based on the first directed graph, wherein selecting the set of graph portions comprises selecting the first graph portion; and
  - a directed graph of the set of directed graphs is stored on a tamper-evident, distributed ledger encoding records of a plurality of previous values in a directed acyclic graph of cryptographic hash pointers, wherein the tamper-evident, distributed ledger is stored on a peer-to-peer network.

* * * * *